United States Patent
Matsuyama et al.

(10) Patent No.: US 6,574,611 B1
(45) Date of Patent: Jun. 3, 2003

(54) INFORMATION PROCESSING APPARATUS AND METHOD, INFORMATION MANAGEMENT APPARATUS AND METHOD, AND INFORMATION PROVIDING MEDIUM

(75) Inventors: Shinako Matsuyama, Tokyo (JP); Yoshihito Ishibashi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/544,070

(22) Filed: Apr. 6, 2000

(30) Foreign Application Priority Data

Apr. 9, 1999 (JP) .......................................... 11-103414

(51) Int. Cl.[7] .............................................. G06F 11/30
(52) U.S. Cl. ...................... 705/57; 713/187; 713/200; 713/201; 380/30; 369/32; 705/57
(58) Field of Search ........................... 705/57; 713/190, 713/187; 380/30, 202, 203; 369/32

(56) References Cited

U.S. PATENT DOCUMENTS

| 6,243,330 | B1 | * | 6/2001 | Oshima ..................... 369/47.1 |
| 2001/0014155 | A1 | * | 8/2001 | Sugahara et al. ........... 380/277 |
| 2001/0042209 | A1 | * | 11/2001 | Sato ........................... 713/190 |
| 2001/0055387 | A1 | * | 12/2001 | Suzuki et al. ................ 380/30 |

FOREIGN PATENT DOCUMENTS

| EP | 1103964 A2 | * | 5/2001 | ........... G11B/15/05 |
| WO | WO 99/12310 | * | 3/1999 | |

OTHER PUBLICATIONS

Anonymous, Security anonymous and digital currencies, Oct. 1996, Telecommunications (international Edition), v30n10, p. 90.*

Sylvia Dennis, McAfee Unviels PC Crypto Desktop Encyrption Software, Jan. 14, 1997, Newsbytes Network.*

Eoin Licken Encryption and digital key to net security, Apr. 24, 1998, Irish Times, p. 59.*

Paul Desmond, A Guide to e–commerce security, Sep. 1999, Software Magazine, v19, n2, p. 34.*

Arvind Krisna, Protect Yourself, Nov. 1998, Inform, v12, No. 10, p. 10–12.*

Alan, Stewart, The key to building trust in ecommerce: information technology internet security: Public ley infracttures will give potential online customers the confidence they demand, Dec. 1998, Financial Times, London Edition, p. 9.*

* cited by examiner

*Primary Examiner*—James P. Trammell
*Assistant Examiner*—Firmin Backer
(74) *Attorney, Agent, or Firm*—Frommer Lawrence & Haug LLP; William S. Frommer

(57) ABSTRACT

An information processing apparatus managed by a management apparatus to decrypt encrypted information and use resultant decrypted information. An efficient scheme is implemented for registering users of the system.

11 Claims, 79 Drawing Sheets

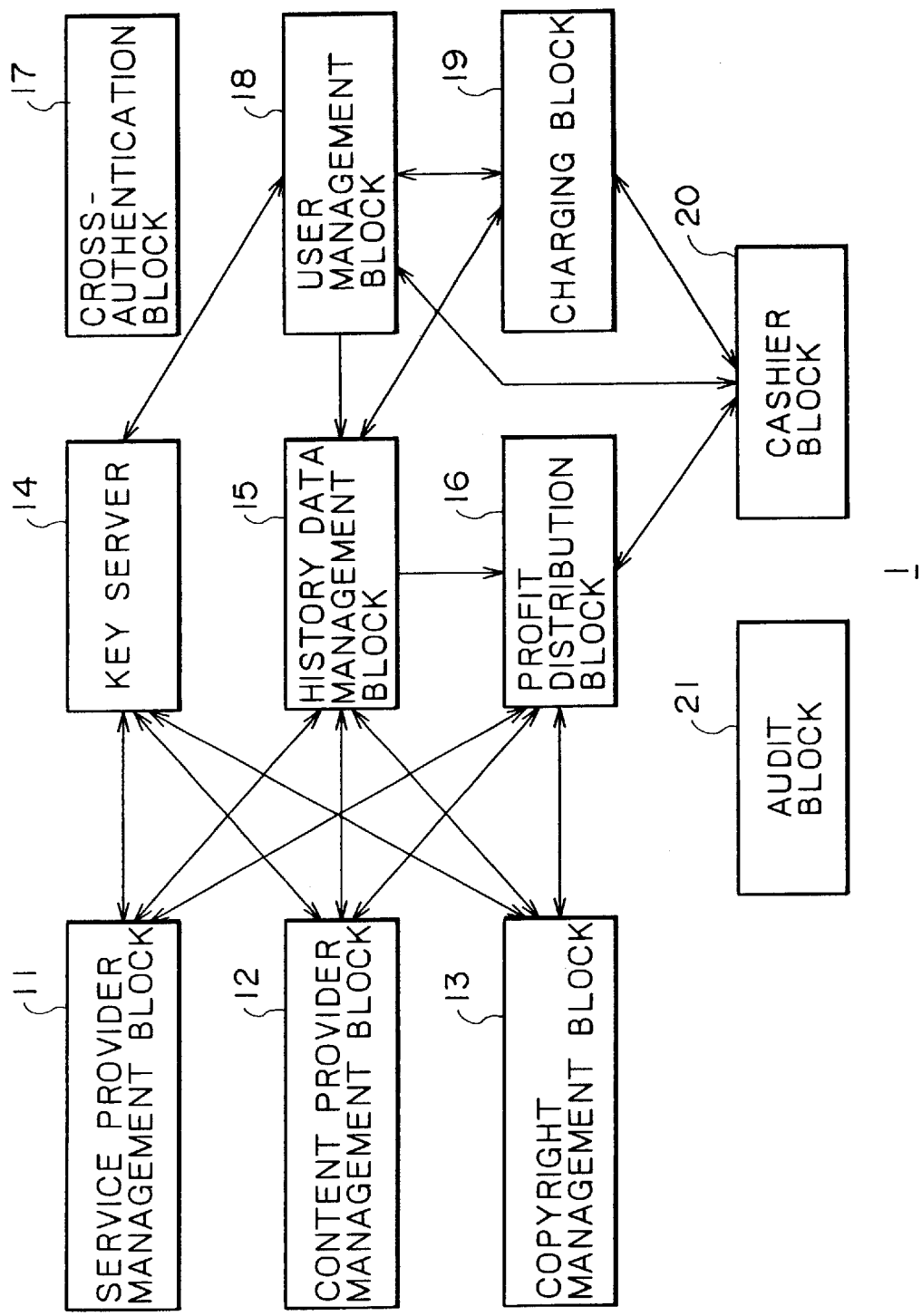

FIG. 4

DELIVERY KEYS HELD BY CONTENT PROVIDER

| DELIVERY KEY | DELIVERY KEY VERSION | VALID PERIOD START | END |
|---|---|---|---|
| aaaaaaaa | 1 | 1998/1/1 | 1998/1/31 |
| bbbbbbbb | 2 | 1998/2/1 | 1998/2/28 |
| cccccccc | 3 | 1998/3/1 | 1998/3/31 |
| dddddddd | 4 | 1998/4/1 | 1998/4/30 |
| eeeeeeee | 5 | 1998/5/1 | 1998/5/31 |
| ffffffff | 6 | 1998/6/1 | 1998/6/30 |

DELIVERY KEY TO BE USED → aaaaaaaa

SEND DELIVERY KEY ⇩

DELIVERY KEYS HELD BY EMD SERVICE CENTER

| DELIVERY KEY | DELIVERY KEY VERSION | VALID PERIOD START | END |
|---|---|---|---|
| aaaaaaaa | 1 | 1998/1/1 | 1998/1/31 |
| bbbbbbbb | 2 | 1998/2/1 | 1998/2/28 |
| cccccccc | 3 | 1998/3/1 | 1998/3/31 |
| dddddddd | 4 | 1998/4/1 | 1998/4/30 |
| eeeeeeee | 5 | 1998/5/1 | 1998/5/31 |
| ffffffff | 6 | 1998/6/1 | 1998/6/30 |

DELIVERY KEY TO BE USED → aaaaaaaa

SEND DELIVERY KEY ⇒

DELIVERY KEYS HELD BY RECEIVER

| DELIVERY KEY | DELIVERY KEY VERSION | VALID PERIOD START | END |
|---|---|---|---|
| aaaaaaaa | 1 | 1998/1/1 | 1998/1/31 |
| bbbbbbbb | 2 | 1998/2/1 | 1998/2/28 |
| cccccccc | 3 | 1998/3/1 | 1998/3/31 |

DELIVERY KEY TO BE USED → aaaaaaaa

FIG. 5

DELIVERY KEYS HELD BY EMD SERVICE CENTER

| DELIVERY KEY | DELIVERY KEY VERSION | VALID PERIOD START | VALID PERIOD END |
|---|---|---|---|
| aaaaaaaa | 1 | 1998/1/1 | 1998/1/31 |
| bbbbbbbb | 2 | 1998/2/1 | 1998/2/28 |
| cccccccc | 3 | 1998/3/1 | 1998/3/31 |
| dddddddd | 4 | 1998/4/1 | 1998/4/30 |
| eeeeeeee | 5 | 1998/5/1 | 1998/5/31 |
| ffffffff | 6 | 1998/6/1 | 1998/6/30 |
| gggggggg | 7 | 1998/7/1 | 1998/7/31 |

DELIVERY KEY TO BE USED → (row 2)

SEND DELIVERY KEY ↓

DELIVERY KEYS HELD BY CONTENT PROVIDER

| DELIVERY KEY | DELIVERY KEY VERSION | VALID PERIOD START | VALID PERIOD END |
|---|---|---|---|
| bbbbbbbb | 2 | 1998/2/1 | 1998/2/28 |
| cccccccc | 3 | 1998/3/1 | 1998/3/31 |
| dddddddd | 4 | 1998/4/1 | 1998/4/30 |
| eeeeeeee | 5 | 1998/5/1 | 1998/5/31 |
| ffffffff | 6 | 1998/6/1 | 1998/6/30 |
| gggggggg | 7 | 1998/7/1 | 1998/7/31 |

DELIVERY KEY TO BE USED → (row 1)

SEND DELIVERY KEY →

DELIVERY KEYS HELD BY RECEIVER

| DELIVERY KEY | DELIVERY KEY VERSION | VALID PERIOD START | VALID PERIOD END |
|---|---|---|---|
| bbbbbbbb | 2 | 1998/2/1 | 1998/2/28 |
| cccccccc | 3 | 1998/3/1 | 1998/3/31 |
| dddddddd | 4 | 1998/4/1 | 1998/4/30 |

DELIVERY KEY TO BE USED → (row 1)

FIG. 6

DELIVERY KEYS HELD BY EMD SERVICE CENTER

| DELIVERY KEY | DELIVERY KEY VERSION | VALID PERIOD START | VALID PERIOD END |
|---|---|---|---|
| aaaaaaaa | 1 | 1998/1/1 | 1998/1/31 |
| bbbbbbbb | 2 | 1998/2/1 | 1998/2/28 |
| cccccccc | 3 | 1998/3/1 | 1998/3/31 |
| dddddddd | 4 | 1998/4/1 | 1998/4/30 |
| eeeeeeee | 5 | 1998/5/1 | 1998/5/31 |
| ffffffff | 6 | 1998/6/1 | 1998/6/30 |
| gggggggg | 7 | 1998/7/1 | 1998/7/31 |
| hhhhhhhh | 8 | 1998/8/1 | 1998/8/31 |

SEND DELIVERY KEY →

DELIVERY KEYS HELD BY RECEIVER

| DELIVERY KEY | DELIVERY KEY VERSION | VALID PERIOD START | VALID PERIOD END |
|---|---|---|---|
| cccccccc | 3 | 1998/3/1 | 1998/3/31 |
| dddddddd | 4 | 1998/4/1 | 1998/4/30 |
| eeeeeeee | 5 | 1998/5/1 | 1998/5/31 |

← DELIVERY KEY TO BE USED

↓ SEND DELIVERY KEY

DELIVERY KEYS HELD BY CONTENT PROVIDER

| DELIVERY KEY | DELIVERY KEY VERSION | VALID PERIOD START | VALID PERIOD END |
|---|---|---|---|
| cccccccc | 3 | 1998/3/1 | 1998/3/31 |
| dddddddd | 4 | 1998/4/1 | 1998/4/30 |
| eeeeeeee | 5 | 1998/5/1 | 1998/5/31 |
| ffffffff | 6 | 1998/6/1 | 1998/6/30 |
| gggggggg | 7 | 1998/7/1 | 1998/7/31 |
| hhhhhhhh | 8 | 1998/8/1 | 1998/8/31 |

DELIVERY KEY TO BE USED →

FIG. 7

DELIVERY KEYS HELD BY EMD SERVICE CENTER

| DELIVERY KEY | DELIVERY KEY VERSION | VALID PERIOD START | VALID PERIOD END |
|---|---|---|---|
| aaaaaaaa | 1 | 1998/1/1 | 1998/1/31 |
| bbbbbbbb | 2 | 1998/2/1 | 1998/2/28 |
| cccccccc | 3 | 1998/3/1 | 1998/3/31 |
| dddddddd | 4 | 1998/4/1 | 1998/4/30 |
| eeeeeeee | 5 | 1998/5/1 | 1998/5/31 |
| ffffffff | 6 | 1998/6/1 | 1998/6/30 |
| gggggggg | 7 | 1998/7/1 | 1998/7/31 |
| hhhhhhhh | 8 | 1998/8/1 | 1998/8/31 |
| iiiiiiii | 9 | 1998/9/1 | 1998/9/30 |

DELIVERY KEY TO BE USED → dddddddd

SEND DELIVERY KEY ↓

DELIVERY KEYS HELD BY CONTENT PROVIDER

| DELIVERY KEY | DELIVERY KEY VERSION | VALID PERIOD START | VALID PERIOD END |
|---|---|---|---|
| dddddddd | 4 | 1998/4/1 | 1998/4/30 |
| eeeeeeee | 5 | 1998/5/1 | 1998/5/31 |
| ffffffff | 6 | 1998/6/1 | 1998/6/30 |
| gggggggg | 7 | 1998/7/1 | 1998/7/31 |
| hhhhhhhh | 8 | 1998/8/1 | 1998/8/31 |
| iiiiiiii | 9 | 1998/9/1 | 1998/9/30 |

DELIVERY KEY TO BE USED → dddddddd

SEND DELIVERY KEY →

DELIVERY KEYS HELD BY RECEIVER

| DELIVERY KEY | DELIVERY KEY VERSION | VALID PERIOD START | VALID PERIOD END |
|---|---|---|---|
| dddddddd | 4 | 1998/4/1 | 1998/4/30 |
| eeeeeeee | 5 | 1998/5/1 | 1998/5/31 |
| ffffffff | 6 | 1998/6/1 | 1998/6/30 |

DELIVERY KEY TO BE USED → dddddddd

FIG. 8

| DELIVERY KEY | DELIVERY KEY VERSION | VALID PERIOD START   END |
|---|---|---|
| aaaaaaaa | 1 | 1998/1/1  1998/1/31 |

PROVISIONAL DELIVERY KEY Kd

FIG. 9

| SAM ID | ID OF SAM 62 | ID OF SAM 212 |
|---|---|---|
| DEVICE NUMBER | DEVICE NUMBER (100) OF RECEIVER 51 | DEVICE NUMBER (100) OF RECEIVER 201 |
| SETTLEMENT ID | SETTLEMENT ID OF USER F | |
| SETTLEMENT INFORMATION USER / NAME | NAME OF USER F | |
| ADDRESS | ADDRESS OF USER F | |
| TELEPHONE NO. | TELEPHONE NO. OF USER F | |
| SETTLEMENT ORGANIZATION INFORMATION | SETTLEMENT ORGANIZATION INFORMATION OF USER F | |
| BIRTHDAY | BIRTHDAY OF USER F | |
| AGE | AGE OF USER F (21 YEARS OLD) | |
| GENDER | GENDER OF USER F (MALE) | |
| USER ID | ID OF USER F | |
| PASSWORD | PASSWORD OF USER F | |
| SUBORDINATE INFORMATION USER / NAME | | |
| ADDRESS | | |
| TELEPHONE NO. | | |
| BIRTHDAY | | |
| GENDER | | |
| USER ID | | |
| PASSWORD | | |
| ⋮ | ⋮ | |
| USAGE POINT INFORMATION | USAGE POINT INFORMATION OF RECEIVER 51 | |

SYSTEM REGISTRATION INFORMATION

| USER | PROVIDER | USAGE POINT |
|---|---|---|
| SETTLEMENT USER | CONTENT PROVIDER 2-1 | 222 POINTS |
| | CONTENT PROVIDER 2-2 | 123 POINTS |
| | SERVICE PROVIDER 3-1 | 345 POINTS |
| | SERVICE PROVIDER 3-2 | 0 POINTS |

USAGE POINT INFORMATION 2-1

FIG.12A

| CONTENT ID | ID OF CONTENT A | |
|---|---|---|
| CONTENT PROVIDER ID | ID OF CONTENT PROVIDER 2-1 | |
| UCP ID | ID OF UCP A | |
| VALID PERIOD OF UCP | VALID PERIOD OF UCP A | |
| USAGE CONDITION 10 | USER CONDITION 10 | 200 POINTS OR HIGHER |
| | DEVICE CONDITION 10 | NO CONDITION |
| USAGE DESCRIPTION 11 | ID 11 | ID OF USAGE DESCRIPTION 11 |
| | FORM 11 | REPRODUCTION BY PURCHASE |
| | PARAMETER 11 | ×××× |
| | MANAGEMENT SHIFT PERMIT INFORMATION 11 | PERMITTED |
| USAGE DESCRIPTION 12 | ID 12 | ID OF USAGE DESCRIPTION 12 |
| | FORM 12 | FIRST-GENERATION DUPLICATION |
| | PARAMETER 12 | ×××× |
| | MANAGEMENT SHIFT PERMIT INFORMATION 12 | NOT PERMITTED |
| USAGE DESCRIPTION 13 | ID 13 | ID OF USAGE DESCRIPTION 13 |
| | FORM 13 | TIME-LIMITED REPRODUCTION |
| | PARAMETER 13 | ×××× |
| | MANAGEMENT SHIFT PERMIT INFORMATION 13 | NOT PERMITTED |
| USAGE DESCRIPTION 14 | ID 14 | ID OF USAGE DESCRIPTION 14 |
| | FORM 14 | Pay Per Copy 5 |
| | PARAMETER 14 | DUPLICATED 5 TIMES |
| | MANAGEMENT SHIFT PERMIT INFORMATION 14 | NOT PERMITTED |

UCP A

FIG. 12B

| CONTENT ID | | ID OF CONTENT A |
|---|---|---|
| CONTENT PROVIDER ID | | ID OF CONTENT PROVIDER 2-1 |
| UCP ID | | ID OF UCP B |
| VALID PERIOD OF UCP | | VALID PERIOD OF UCP B |
| USAGE DESCRIPTION 20 | USER CONDITION 20 | LESS THAN 200 POINTS |
| | DEVICE CONDITION 20 | NO CONDITION |
| USAGE DESCRIPTION 21 | ID 21 | ID OF USAGE DESCRIPTION 21 |
| | FORM 21 | Pay Per Play 4 |
| | PARAMETER 21 | REPRODUCED 4 TIMES |
| | MANAGEMENT SHIFT PERMIT INFORMATION 21 | NOT PERMITTED |
| USAGE DESCRIPTION 22 | ID 22 | ID OF USAGE DESCRIPTION 22 |
| | FORM 22 | Pay Per Copy |
| | PARAMETER 22 | DUPLICATED 2 TIMES |
| | MANAGEMENT SHIFT PERMIT INFORMATION 22 | NOT PERMITTED |

UCP B

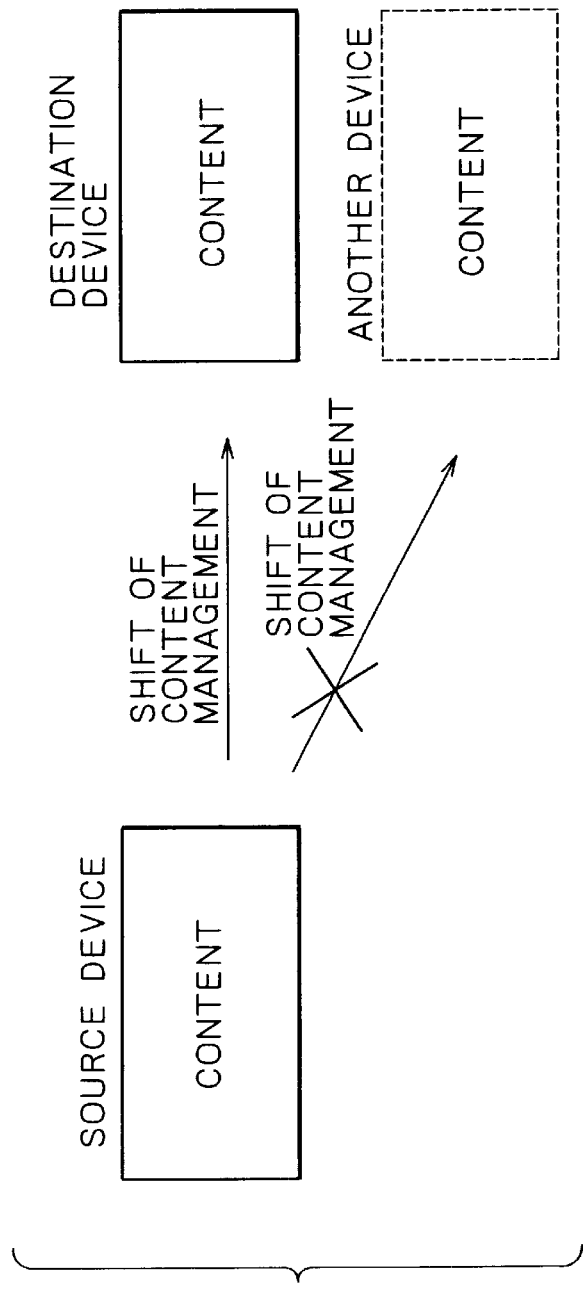
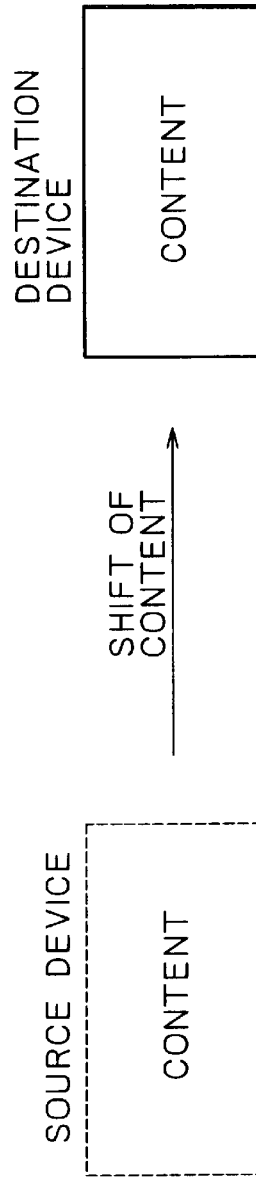
FIG.13A
FIG.13B

FIG.15A

| SERVICE CODE | MEANING |
| --- | --- |
| 0000h | NO CONDITION |
| 0001h-00FFh | DEVICE CONDITION PRESENT |
| 0100h-01FFh | GENDER CONDITION PRESENT |
| 0200h-02FFh | AGE CONDITION PRESENT |
| 0300h-7FFFh | OTHER CONDITIONS PRESENT |
| 8000h-FFFFh | USAGE POINT CONDITION PRESENT |

FIG.15B

| CONDITION CODE | MEANING |
| --- | --- |
| 00h | NO CONDITION |
| 01h | = |
| 02h | ≠ |
| 03h | <(LESS THAN) |
| 04h | >(MORE THAN) |
| 05h | ≦(EQUAL TO OR LESS THAN) |
| 06h | ≧(EQUAL TO OR MORE THAN) |
| 07h-FFh | RESERVED |

FIG. 16A

| USER CONDITION 10 | SERVICE CODE | VALUE CODE | CONDITION CODE |
|---|---|---|---|
| | 80 × Xh | 0000C8h | 06h |
| DEVICE CONDITION 10 | SERVICE CODE | VALUE CODE | CONDITION CODE |
| | 0000h | FFFFFFh | 00h |

USAGE CONDITION 10 OF UCP A

FIG. 16B

| USER CONDITION 20 | SERVICE CODE | VALUE CODE | CONDITION CODE |
|---|---|---|---|
| | 80 × Xh | 0000C8h | 03h |
| DEVICE CONDITION 20 | SERVICE CODE | VALUE CODE | CONDITION CODE |
| | 0000h | FFFFFFh | 00h |

USAGE CONDITION 10 OF UCP B

F I G. 18
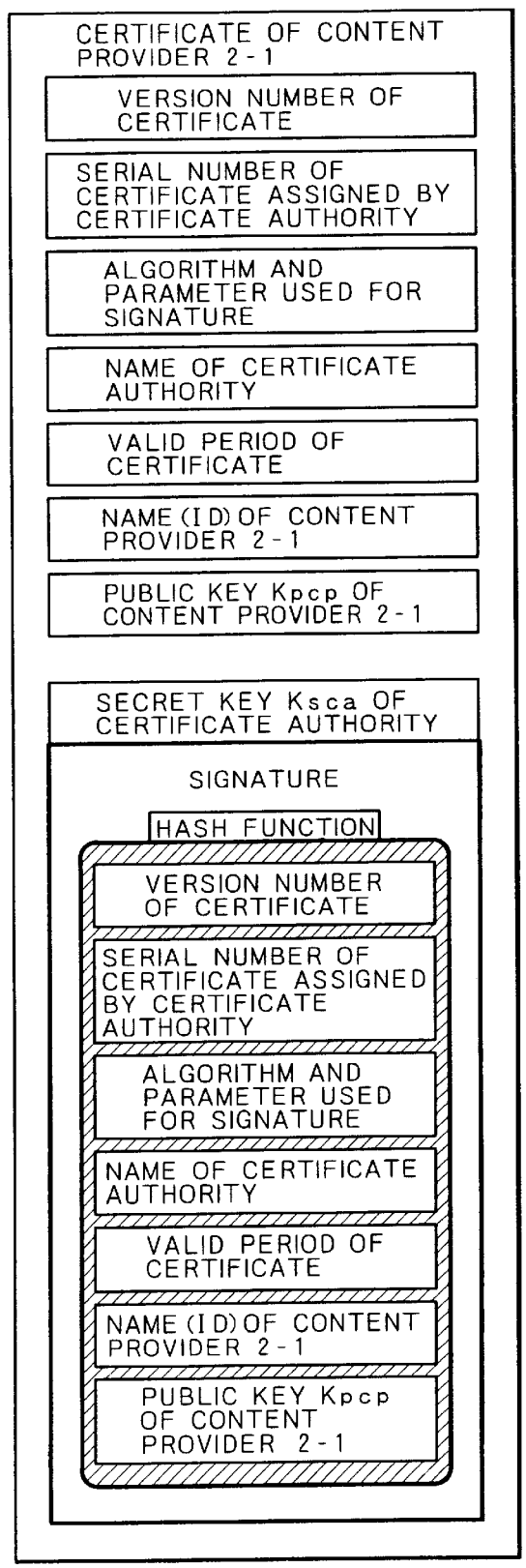

FIG. 20A

| CONTENT ID | ID OF CONTENT A | |
|---|---|---|
| CONTENT PROVIDER ID | ID OF CONTENT PROVIDER 2-1 | |
| UCP ID | ID OF UCP A | |
| SERVICE PROVIDER ID | ID OF SERVICE PROVIDER 3-1 | |
| PT ID | ID OF PT A-1 | |
| VALID PERIOD OF PT | VALID PERIOD OF PT A-1 | |
| PRICE CONDITION 10 | USER CONDITION 10 | MALE |
| | DEVICE CONDITION 10 | NO CONDITION |
| PRICE DESCRIPTION 11 | 2000 YEN | |
| PRICE DESCRIPTION 12 | 600 YEN | |
| PRICE DESCRIPTION 13 | 100 YEN | |
| PRICE DESCRIPTION 14 | 300 YEN | |

| CONTENT ID | ID OF CONTENT A | |
|---|---|---|
| CONTENT PROVIDER ID | ID OF CONTENT PROVIDER 2-1 | |
| UCP ID | ID OF UCP A | |
| SERVICE PROVIDER ID | ID OF SERVICE PROVIDER 3-1 | |
| PT ID | ID OF PT A-2 | |
| VALID PERIOD OF PT | VALID PERIOD OF PT A-2 | |
| PRICE CONDITION 20 | USER CONDITION 20 | FEMALE |
| | DEVICE CONDITION 20 | NO CONDITION |
| PRICE DESCRIPTION 21 | 1000 YEN | |
| PRICE DESCRIPTION 22 | 300 YEN | |
| PRICE DESCRIPTION 23 | 50 YEN | |
| PRICE DESCRIPTION 24 | 150 YEN | |

| USER CONDITION 10 | SERVICE CODE | VALUE CODE | CONDITION CODE |
|---|---|---|---|
| | 01×Xh | 000000h | 01h |
| DEVICE CONDITION 10 | SERVICE CODE | VALUE CODE | CONDITION CODE |
| | 0000h | FFFFFFh | 00h |

PRICE CONDITION 10 OF PT A-1

FIG. 21B

| USER CONDITION 20 | SERVICE CODE | VALUE CODE | CONDITION CODE |
|---|---|---|---|
| | 01×Xh | 000001h | 01h |
| DEVICE CONDITION 20 | SERVICE CODE | VALUE CODE | CONDITION CODE |
| | 0000h | FFFFFFh | 00h |

PRICE CONDITION 20 OF PT A-2

FIG. 22A

| CONTENT ID | ID OF CONTENT A | |
|---|---|---|
| CONTENT PROVIDER ID | ID OF CONTENT PROVIDER 2-1 | |
| UCP ID | ID OF UCP B | |
| SERVICE PROVIDER ID | ID OF SERVICE PROVIDER 3-1 ID | |
| PT ID | ID OF PT B-1 | |
| VALID PERIOD OF PT | VALID PERIOD OF PT B-1 | |
| PRICE CONDITION 30 | USER CONDITION 30 | NO CONDITION |
| | DEVICE CONDITION 30 | SUBORDINATE DEVICE |
| PRICE DESCRIPTION 31 | 100 YEN | |
| PRICE DESCRIPTION 32 | 300 YEN | |

| CONTENT ID | ID OF CONTENT A | |
|---|---|---|
| CONTENT PROVIDER ID | ID OF CONTENT PROVIDER 2-1 | |
| UCP ID | ID OF UCP B | |
| SERVICE PROVIDER ID | ID OF SERVICE PROVIDER 3-1 | |
| PT ID | ID OF PT B-2 | |
| VALID PERIOD OF PT | VALID PERIOD OF PT B-2 | |
| PRICE CONDITION 40 | USER CONDITION 40 | NO CONDITION |
| | DEVICE CONDITION 40 | SUBORDINATE DEVICE |
| PRICE DESCRIPTION 41 | 50 YEN | |
| PRICE DESCRIPTION 42 | 150 YEN | |

| USER CONDITION 30 | SERVICE CODE | VALUE CODE | CONDITION CODE |
|---|---|---|---|
| | 0000h | FFFFFFh | 00h |
| DEVICE CONDITION 30 | SERVICE CODE | VALUE CODE | CONDITION CODE |
| | 00XXh | 000064h | 03h |

PRICE CONDITION 30 OF PT B-1

FIG. 23B

| USER CONDITION 40 | SERVICE CODE | VALUE CODE | CONDITION CODE |
|---|---|---|---|
| | 0000h | FFFFFFh | 00h |
| DEVICE CONDITION 40 | SERVICE CODE | VALUE CODE | CONDITION CODE |
| | 00XXh | 000064h | 06h |

PRICE CONDITION 40 OF PT B-2

FIG. 28

| | | |
|---|---|---|
| CONTENT ID | | ID OF CONTENT A |
| CONTENT PROVIDER ID | | ID OF CONTENT PROVIDER 2-1 |
| UCP ID | | ID OF UCP A |
| VALID PERIOD OF UCP | | VALID PERIOD OF UCP A |
| SERVICE PROVIDER ID | | ID OF SERVICE PROVIDER 3-1 |
| PT ID | | ID OF PT A-1 |
| VALID PERIOD OF PT | | VALID PERIOD OF PT A-1 |
| UCS ID | | ID OF UCS A |
| SAM ID | | ID OF SAM 62 |
| USER ID | | ID OF USER F |
| USAGE DESCRIPTION | ID | ID OF USAGE DESCRIPTION 11 |
| | FORM | REPRODUCTION BY PURCHASE |
| | PARAMETER | ××× |
| | MANAGEMENT SHIFT STATE INFORMATION | SOURCE OF SHIFT: ID OF SAM 62 DESTINATION OF SHIFT: ID OF SAM 62 |
| USAGE HISTORY | | ××× |

UCS A

FIG. 30

| | | |
|---|---|---|
| | CONTENT ID | ID OF CONTENT A |
| | CONTENT PROVIDER ID | ID OF CONTENT PROVIDER 2-1 |
| | UCP ID | ID OF UCP A |
| | VALID PERIOD OF UCP | VALID PERIOD OF UCP A |
| | SERVICE PROVIDER ID | ID OF SERVICE PROVIDER 3-1 |
| | PT ID | ID OF PT A-1 |
| | VALID PERIOD OF PT | VALID PERIOD OF PT A-1 |
| | UCS ID | ID OF UCS A |
| | SAM ID | ID OF SAM 62 |
| | USER ID | ID OF USER F |
| USAGE DESCRIPTION | ID | ID OF USAGE DESCRIPTION 11 |
| | FORM | REPRODUCTION BY PURCHASE |
| | PARAMETER | ×××  |
| | MANAGEMENT SHIFT STATE INFORMATION | SOURCE OF SHIFT: ID OF SAM 62 DESTINATION OF SHIFT: ID OF SAM 62 |
| | CHARGING HISTORY | ××× |

INFORMATION ON CHARGES

FIG. 32

| SAM ID | ID OF SAM 62 |
|---|---|
| DEVICE NUMBER | DEVICE NUMBER (100) OF RECEIVER 51 |
| SETTLEMENT ID | SETTLEMENT ID OF USER F |
| UPPER LIMIT AMOUNT OF CHARGING | UPPER LIMIT AMOUNT FOR OFFICIAL REGISTRATION |
| SETTLEMENT USER INFORMATION — NAME | NAME OF USER F |
| ADDRESS | ADDRESS OF USER F |
| TELEPHONE NUMBER | TELEPHONE NUMBER OF USER F |
| SETTLEMENT ORGANIZATION INFORMATION | SETTLEMENT ORGANIZATION INFORMATION OF USER F |
| BIRTHDAY | BIRTHDAY OF USER F |
| AGE | AGE OF USER F (21 YEARS OLD) |
| GENDER | GENDER OF USER F (MALE) |
| USER ID | ID OF USER F |
| PASSWORD | PASSWORD OF USER F |
| SUBORDINATE USER INFORMATION — NAME | |
| ADDRESS | |
| TELEPHONE NUMBER | |
| BIRTHDAY | |
| GENDER | |
| USER ID | |
| PASSWORD | |
| USAGE POINT INFORMATION | USAGE POINT INFORMATION OF RECEIVER 51 |

REFERENCE INFORMATION 51

FIG. 33

| USER | PROVIDER | USAGE POINT |
|------|----------|-------------|
| SETTLEMENT USER | CONTENT PROVIDER 2-1 | 222 POINTS |
| | CONTENT PROVIDER 2-2 | 123 POINTS |
| | SERVICE PROVIDER 3-1 | 345 POINTS |
| | SERVICE PROVIDER 3-2 | 0 POINT |

USAGE POINT INFORMATION OF REFERENCE INFORMATION 51

FIG. 37

| SAM ID | ID OF SAM 212 |
|---|---|
| DEVICE NUMBER | DEVICE NUMBER (100) OF RECEIVER 201 |
| SETTLEMENT ID | |
| UPPER LIMIT AMOUNT OF CHARGING | |
| SETTLEMENT USER INFORMATION — NAME | |
| ADDRESS | |
| TELEPHONE NUMBER | |
| SETTLEMENT ORGANIZATION INFORMATION | |
| BIRTHDAY | |
| AGE | |
| GENDER | |
| USER ID | |
| PASSWORD | |
| SUBORDINATE USER INFORMATION — NAME | |
| ADDRESS | |
| TELEPHONE NUMBER | |
| BIRTHDAY | |
| GENDER | |
| USER ID | |
| PASSWORD | |
| USAGE POINT INFORMATION | |

REFERENCE INFORMATION 201

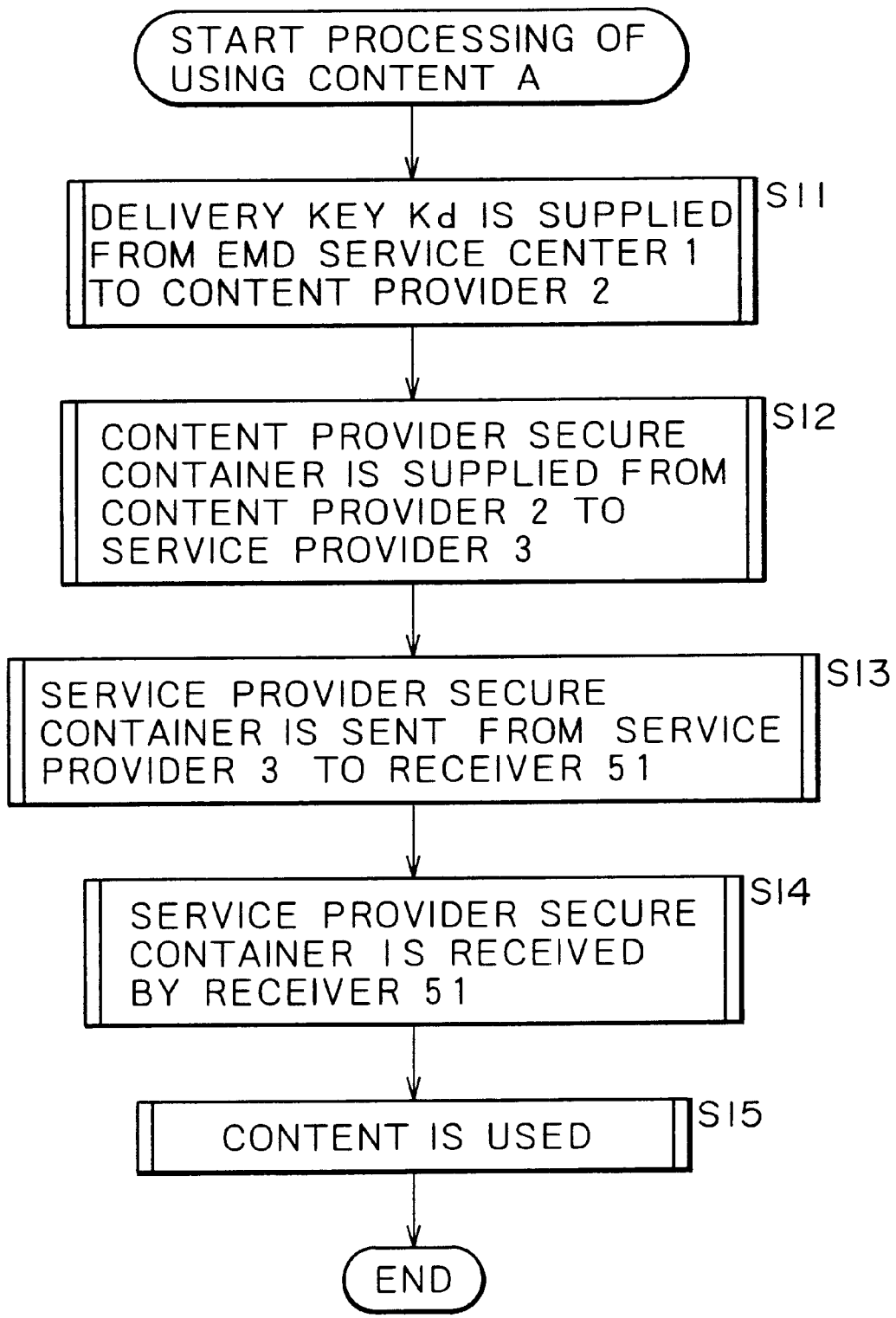

FIG. 49

ID OF SAM 212

NAME — NAME OF USER A
ADDRESS — ADDRESS OF USER A
TELEPHONE NUMBER — TELEPHONE NUMBER OF USER A
INFORMATION OF SETTLEMENT ORGANIZATION — CREDIT CARD NUMBER OF USER A

BIRTHDAY — BIRTHDAY OF USER A
AGE — 35
GENDER — MALE
PASSWORD —
USER ID —
SETTLEMENT ID —

REGISTRATION FORM OF RECEIVER 201

FIG. 51

| SAM ID | ID OF SAM 212 |
|---|---|
| DEVICE NUMBER | DEVICE NUMBER (100) OF RECEIVER 201 |
| SETTLEMENT ID | |
| UPPER LIMIT AMOUNT OF CHARGING | UPPER LIMIT AMOUNT FOR PROVISIONAL REGISTRATION |
| SETTLEMENT USER / INFORMATION — NAME | NAME OF USER A |
| ADDRESS | ADDRESS OF USER A |
| TELEPHONE NUMBER | TELEPHONE NUMBER OF USER A |
| SETTLEMENT ORGANIZATION INFORMATION | SETTLEMENT ORGANIZATION INFORMATION OF USER A |
| BIRTHDAY | BIRTHDAY OF USER A |
| AGE | AGE OF USER A |
| GENDER | GENDER OF USER A |
| USER ID | ID OF USER A |
| PASSWORD | PASSWORD OF USER A |
| SUBORDINATE USER / INFORMATION — NAME | |
| ADDRESS | |
| TELEPHONE NUMBER | |
| BIRTHDAY | |
| GENDER | |
| USER ID | |
| PASSWORD | |
| USAGE POINT INFORMATION | |

REFERENCE INFORMATION 201

FIG.53

| SAM ID | ID OF SAM 212 |
|---|---|
| DEVICE NUMBER | DEVICE NUMBER (100) OF RECEIVER 201 |
| SETTLEMENT ID | SETTLEMENT ID OF USER A |
| UPPER LIMIT AMOUNT OF CHARGING | UPPER LIMIT AMOUNT FOR OFFICIAL REGISTRATION |
| SETTLEMENT USER INFORMATION | NAME | NAME OF USER A |
| | ADDRESS | ADDRESS OF USER A |
| | TELEPHONE NUMBER | TELEPHONE NUMBER OF USER A |
| | SETTLEMENT ORGANIZATION INFORMATION | SETTLEMENT ORGANIZATION INFORMATION OF USER A |
| | BIRTHDAY | BIRTHDAY OF USER A |
| | AGE | AGE OF USER A |
| | GENDER | GENDER OF USER A |
| | USER ID | ID OF USER A |
| | PASSWORD | PASSWORD OF USER A |
| SUBORDINATE USER INFORMATION | NAME | |
| | ADDRESS | |
| | TELEPHONE NUMBER | |
| | BIRTHDAY | |
| | GENDER | |
| | USER ID | |
| | PASSWORD | |
| ⋮ | | |
| USAGE POINT INFORMATION | |

REFERENCE INFORMATION 201

FIG.55

| SAM ID | | ID OF SAM 62 | ID OF SAM 212 |
|---|---|---|---|
| DEVICE NUMBER | | DEVICE NUMBER (100) OF RECEIVER 51 | DEVICE NUMBER (100) OF RECEIVER 201 |
| SETTLEMENT ID | | SETTLEMENT ID OF USER F | |
| SETTLEMENT USER INFORMATION | NAME | NAME OF USER F | NAME OF USER A |
| | ADDRESS | ADDRESS OF USER F | ADDRESS OF USER A |
| | TELEPHONE NUMBER | TELEPHONE NUMBER OF USER F | TELEPHONE NUMBER OF USER A |
| | SETTLEMENT ORGANIZATION INFORMATION | SETTLEMENT ORGANIZATION INFORMATION OF USER F | SETTLEMENT ORGANIZATION INFORMATION OF USER A |
| | BIRTHDAY | BIRTHDAY OF USER F | BIRTHDAY OF USER A |
| | AGE | AGE OF USER F (21 YEARS OLD) | AGE OF USER A (35 YEARS OLD) |
| | GENDER | GENDER OF USER F (MALE) | GENDER OF USER A (MALE) |
| | USER ID | ID OF USER F | |
| | PASSWORD | PASSWORD OF USER F | |
| SUBORDINATE USER INFORMATION | NAME | | |
| | ADDRESS | | |
| | TELEPHONE NUMBER | | |
| | BIRTHDAY | | |
| | GENDER | | |
| | USER ID | | |
| | PASSWORD | | |
| USAGE POINT INFORMATION | | USAGE POINT INFORMATION OF RECEIVER 51 | |

SYSTEM REGISTRATION INFORMATION

FIG. 57

| SAM ID | ID OF SAM 62 | ID OF SAM 212 |
|---|---|---|
| DEVICE NUMBER | DEVICE NUMBER (100) OF RECEIVER 51 | DEVICE NUMBER (100) OF RECEIVER 201 |
| SETTLEMENT ID | SETTLEMENT ID OF USER F | |
| SETTLEMENT USER INFORMATION — NAME | NAME OF USER F | NAME OF USER A |
| ADDRESS | ADDRESS OF USER F | ADDRESS OF USER A |
| TELEPHONE NUMBER | TELEPHONE NUMBER OF USER F | TELEPHONE NUMBER OF USER A |
| SETTLEMENT ORGANIZATION INFORMATION | SETTLEMENT ORGANIZATION INFORMATION OF USER F | SETTLEMENT ORGANIZATION INFORMATION OF USER A |
| BIRTHDAY | BIRTHDAY OF USER F | BIRTHDAY OF USER A |
| AGE | AGE OF USER F (21 YEARS OLD) | AGE OF USER A (35 YEARS OLD) |
| GENDER | GENDER OF USER F (MALE) | GENDER OF USER A (MALE) |
| USER ID | ID OF USER F | ID OF USER A |
| PASSWORD | PASSWORD OF USER F | PASSWORD OF USER A |
| SUBORDINATE USER INFORMATION — NAME | | |
| ADDRESS | | |
| TELEPHONE NUMBER | | |
| BIRTHDAY | | |
| GENDER | | |
| USER ID | | |
| PASSWORD | | |
| USAGE POINT INFORMATION | USAGE POINT INFORMATION OF RECEIVER 51 | |

SYSTEM REGISTRATION INFORMATION

FIG. 58

| | SAM ID | ID OF SAM 62 | ID OF SAM 212 |
|---|---|---|---|
| | DEVICE NUMBER | DEVICE NUMBER (100) OF RECEIVER 51 | DEVICE NUMBER (100) OF RECEIVER 201 |
| | SETTLEMENT ID | SETTLEMENT ID OF USER F | SETTLEMENT ID OF USER A |
| SETTLEMENT USER INFORMATION | NAME | NAME OF USER F | NAME OF USER A |
| | ADDRESS | ADDRESS OF USER F | ADDRESS OF USER A |
| | TELEPHONE NUMBER | TELEPHONE NUMBER OF USER F | TELEPHONE NUMBER OF USER A |
| | SETTLEMENT ORGANIZATION INFORMATION | SETTLEMENT ORGANIZATION INFORMATION OF USER F | SETTLEMENT ORGANIZATION INFORMATION OF USER A |
| | BIRTHDAY | BIRTHDAY OF USER F | BIRTHDAY OF USER A |
| | AGE | AGE OF USER F (21 YEARS OLD) | AGE OF USER A (35 YEARS OLD) |
| | GENDER | GENDER OF USER F (MALE) | GENDER OF USER A (MALE) |
| | USER ID | ID OF USER F | ID OF USER A |
| | PASSWORD | PASSWORD OF USER F | PASSWORD OF USER A |
| SUBORDINATION USER INFORMATION | NAME | | |
| | ADDRESS | | |
| | TELEPHONE NUMBER | | |
| | BIRTHDAY | | |
| | GENDER | | |
| | USER ID | | |
| | PASSWORD | | |
| | USAGE POINT INFORMATION | USAGE POINT INFORMATION OF RECEIVER 51 | |

SYSTEM REGISTRATION INFORMATION

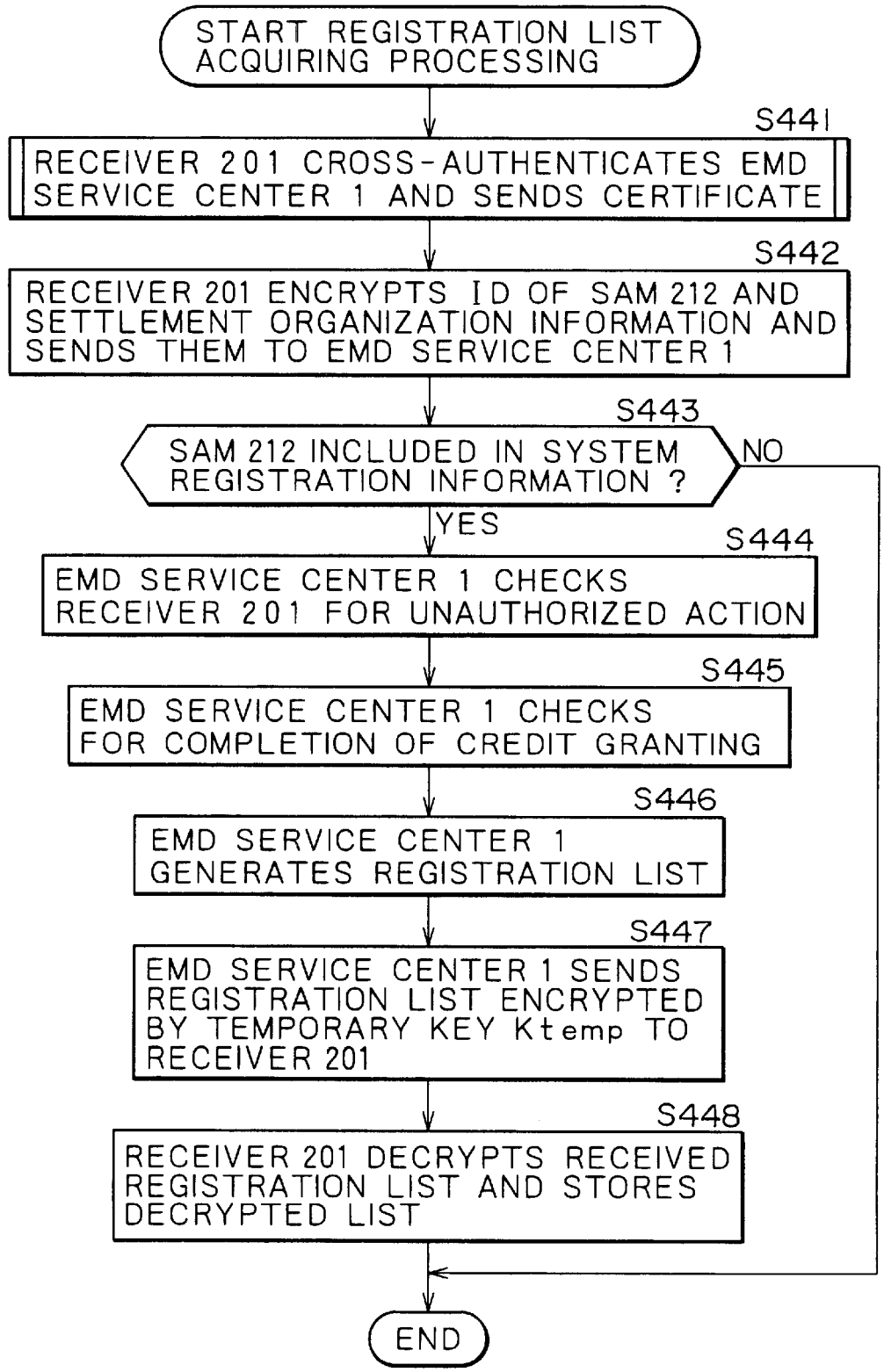

FIG. 60

REGISTRATION CONDITION OF RECEIVER 201

| SAM ID | USER ID | PURCHASE PROCESSING | CHARGING PROCESSING | CHARGING DEVICE | CONTENT SUPPLY DEVICE | STATUS FLAG | REGISTRATION CONDITION SIGNATURE | REGISTRATION LIST SIGNATURE |
|---|---|---|---|---|---|---|---|---|
| ID OF SAM 212 | ID OF USER A | PERMITTED | PERMITTED | ID OF SAM 212 | NO | NOT LIMITED | xxxx | xxxx |

{ REGISTRATION CONDITION SIGNATURE, REGISTRATION LIST SIGNATURE } = LIST PORTION

| OBJECT SAM ID | ID OF SAM 212 |
|---|---|
| VALID PERIOD | xxxx |
| VERSION NUMBER | xxxx |
| CONNECTED DEVICE COUNT | 1 |

} OBJECT SAM INFORMATION PORTION

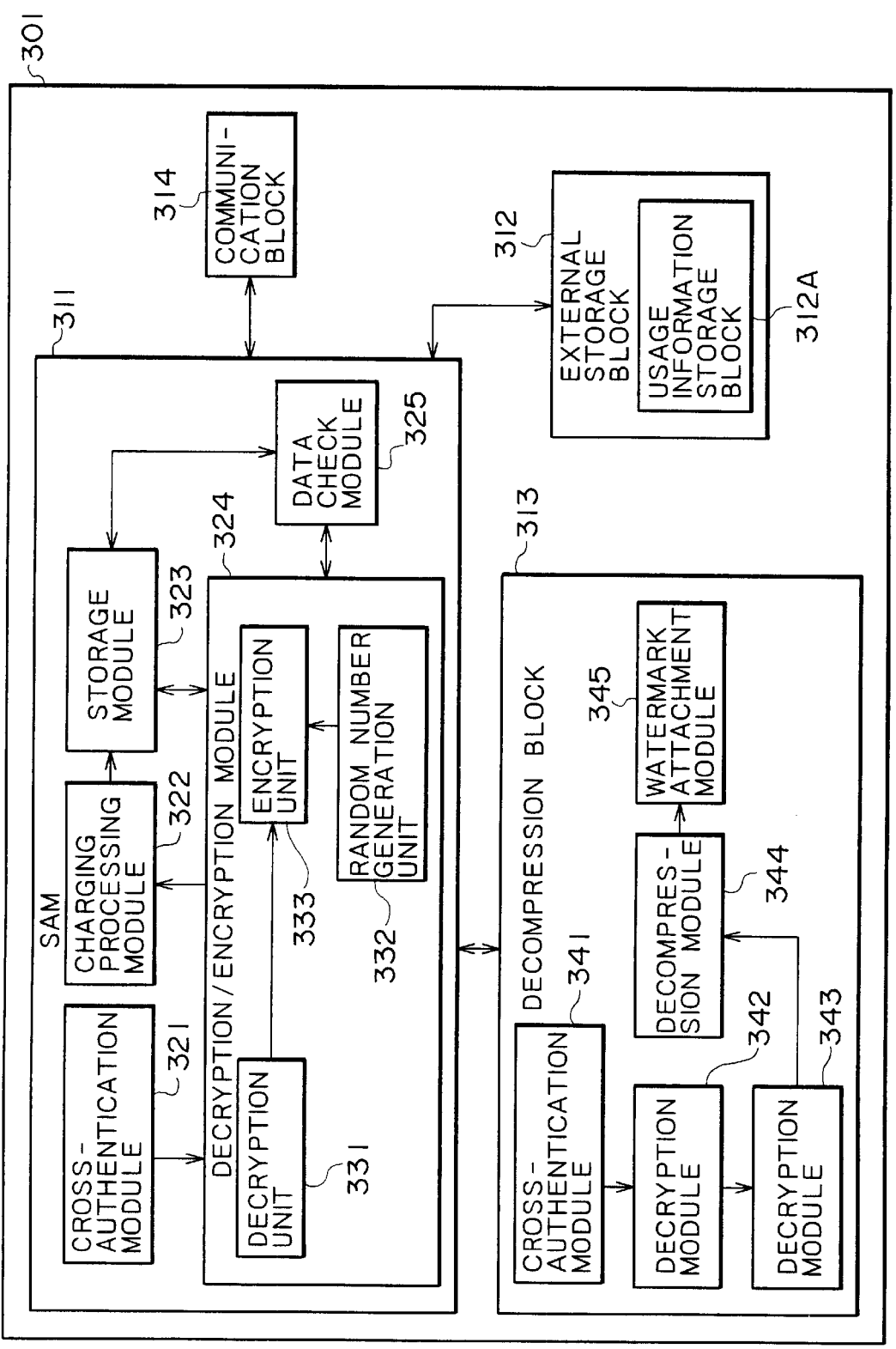

FIG. 63

| SAM ID | ID OF SAM 311 |
|---|---|
| DEVICE NUMBER | DEVICE NUMBER (25) OF RECEIVER 301 |
| SETTLEMENT ID | |
| UPPER LIMIT AMOUNT OF CHARGING | |
| SETTLEMENT USER SITE INFORMATION — NAME | |
| ADDRESS | |
| TELEPHONE NUMBER | |
| SETTLEMENT ORGANIZATION INFORMATION | |
| BIRTHDAY | |
| AGE | |
| GENDER | |
| USER ID | |
| PASSWORD | |
| SUBORDINATE USER SITE INFORMATION — NAME | |
| ADDRESS | |
| TELEPHONE NUMBER | |
| BIRTHDAY | |
| GENDER | |
| USER ID | |
| PASSWORD | |

REFERENCE INFORMATION 301

FIG.65

| SAM ID | ID OF SAM 62 | ID OF SAM 212 | ID OF SAM 311 |
|---|---|---|---|
| DEVICE NUMBER | DEVICE NUMBER (100) OF RECEIVER 51 | DEVICE NUMBER (100) OF RECEIVER 201 | DEVICE NUMBER (25) OF RECEIVER 301 |
| SETTLEMENT ID | SETTLEMENT ID OF USER F | SETTLEMENT ID OF USER A | |
| SETTLEMENT USER INFORMATION / NAME | NAME OF USER F | NAME OF USER A | |
| ADDRESS | ADDRESS OF USER F | ADDRESS OF USER A | |
| TELEPHONE NUMBER | TELEPHONE NUMBER OF USER F | TELEPHONE NUMBER OF USER A | |
| SETTLEMENT ORGANIZATION INFORMATION | SETTLEMENT ORGANIZATION INFORMATION OF USER F | SETTLEMENT ORGANIZATION INFORMATION OF USER A | |
| BIRTHDAY | BIRTHDAY OF USER F | BIRTHDAY OF USER A | |
| AGE | AGE OF USER F (21 YEARS OLD) | AGE OF USER A (35 YEARS OLD) | |
| GENDER | GENDER OF USER F (MALE) | GENDER OF USER A (MALE) | |
| USER ID | ID OF USER F | ID OF USER A | |
| PASSWORD | PASSWORD OF USER F | PASSWORD OF USER A | |
| SUBORDINATION USER INFORMATION / NAME | | | |
| ADDRESS | | | |
| TELEPHONE NUMBER | | | |
| BIRTHDAY | | | |
| GENDER | | | |
| USER ID | | | |
| PASSWORD | | | |
| ⋮ | | | |
| USAGE POINT INFORMATION | USAGE POINT INFORMATION OF RECEIVER 51 | | |

SYSTEM REGISTRATION INFORMATION

FIG. 67

ID OF SAM 311

NAME _____

ADDRESS _____

TELEPHONE
NUMBER _____

SETTLEMENT
ORGANIZATION
INFORMATION _____

BIRTHDAY _____

AGE _____

GENDER _____

PASSWORD _____

USER ID    ID OF USER A

SETTLEMENT ID    x x x x

REGISTRATION FORM OF RECEIVER 301

FIG. 69

| | | |
|---|---|---|
| | SAM ID | ID OF SAM 311 |
| | DEVICE NUMBER | DEVICE NUMBER (25) OF RECEIVER 301 |
| | SETTLEMENT ID | SETTLEMENT ID OF USER A |
| | UPPER LIMIT AMOUNT OF CHARGING | UPPER LIMIT AMOUNT FOR OFFICIAL REGISTRATION |
| SETTLEMENT USER INFORMATION | NAME | NAME OF USER A |
| | ADDRESS | ADDRESS OF USER A |
| | TELEPHONE NUMBER | TELEPHONE NUMBER OF USER A |
| | SETTLEMENT ORGANIZATION INFORMATION | SETTLEMENT ORGANIZATION INFORMATION OF USER A |
| | BIRTHDAY | BIRTHDAY OF USER A |
| | AGE | 35 |
| | GENDER | MALE |
| | USER ID | ID OF USER A |
| | PASSWORD | PASSWORD OF USER A |
| SUBORDINATE USER INFORMATION | NAME | |
| | ADDRESS | |
| | TELEPHONE NUMBER | |
| | BIRTHDAY | |
| | GENDER | |
| | USER ID | |
| | PASSWORD | |
| | ⋮ | |
| | USAGE POINT INFORMATION | |

REFERENCE INFORMATION 301

FIG. 71

| SAM ID | ID OF SAM 62 | ID OF SAM 212 | ID OF SAM 311 |
|---|---|---|---|
| DEVICE NUMBER | DEVICE NUMBER (100) OF RECEIVER 51 | DEVICE NUMBER (100) OF RECEIVER 201 | DEVICE NUMBER (25) OF RECEIVER 301 |
| SETTLEMENT ID | SETTLEMENT ID OF USER F | SETTLEMENT ID OF USER A | |
| SETTLEMENT USER INFORMATION — NAME | NAME OF USER F | NAME OF USER A | NAME OF USER A |
| ADDRESS | ADDRESS OF USER F | ADDRESS OF USER A | ADDRESS OF USER A |
| TELEPHONE NUMBER | TELEPHONE NUMBER OF USER F | TELEPHONE NUMBER OF USER A | TELEPHONE NUMBER OF USER A |
| SETTLEMENT ORGANIZATION INFORMATION | SETTLEMENT ORGANIZATION INFORMATION OF USER F | SETTLEMENT ORGANIZATION INFORMATION OF USER A | SETTLEMENT ORGANIZATION INFORMATION OF USER A |
| BIRTHDAY | BIRTHDAY OF USER F | BIRTHDAY OF USER A | BIRTHDAY OF USER A |
| AGE | AGE OF USER F | AGE OF USER A (35 YEARS OLD) | AGE OF USER A (35 YEARS OLD) |
| GENDER | GENDER OF USER F (MALE) | GENDER OF USER A (MALE) | GENDER OF USER A (MALE) |
| USER ID | ID OF USER F | ID OF USER A | ID OF USER A |
| PASSWORD | PASSWORD OF USER F | PASSWORD OF USER A | PASSWORD OF USER A |
| SUBORDINATION USER INFORMATION — NAME | | | |
| ADDRESS | | | |
| TELEPHONE NUMBER | | | |
| BIRTHDAY | | | |
| GENDER | | | |
| USER ID | | | |
| PASSWORD | | | |
| USAGE POINT INFORMATION | USAGE POINT INFORMATION OF RECEIVER 51 | | |

SYSTEM REGISTRATION INFORMATION

FIG. 72

| SAM ID | ID OF SAM 62 | ID OF SAM 212 | ID OF SAM 311 |
|---|---|---|---|
| DEVICE NUMBER | DEVICE NUMBER (100) OF RECEIVER 51 | DEVICE NUMBER (100) OF RECEIVER 201 | DEVICE NUMBER (25) OF RECEIVER 301 |
| SETTLEMENT ID | SETTLEMENT ID OF USER F | SETTLEMENT ID OF USER A | SETTLEMENT ID OF USER A |
| SETTLEMENT USER INFORMATION — NAME | NAME OF USER F | NAME OF USER A | NAME OF USER A |
| ADDRESS | ADDRESS OF USER F | ADDRESS OF USER A | ADDRESS OF USER A |
| TELEPHONE NUMBER | TELEPHONE NUMBER OF USER F | TELEPHONE NUMBER OF USER A | TELEPHONE NUMBER OF USER A |
| SETTLEMENT ORGANIZATION INFORMATION | SETTLEMENT ORGANIZATION INFORMATION OF USER F | SETTLEMENT ORGANIZATION INFORMATION OF USER A | SETTLEMENT ORGANIZATION INFORMATION OF USER A |
| BIRTHDAY | BIRTHDAY OF USER F | BIRTHDAY OF USER A | BIRTHDAY OF USER A |
| AGE | AGE OF USER F | AGE OF USER A (35 YEARS OLD) | AGE OF USER A (35 YEARS OLD) |
| GENDER | GENDER OF USER F (MALE) | GENDER OF USER A (MALE) | GENDER OF USER A (MALE) |
| USER ID | ID OF USER F | ID OF USER A | ID OF USER A |
| PASSWORD | PASSWORD OF USER F | PASSWORD OF USER A | PASSWORD OF USER A |
| SUBORDINATION USER INFORMATION — NAME | | | |
| ADDRESS | | | |
| TELEPHONE NUMBER | | | |
| BIRTHDAY | | | |
| GENDER | | | |
| USER ID | | | |
| PASSWORD | | | |
| USAGE POINT INFORMATION | USAGE POINT INFORMATION OF RECEIVER 51 | | |

SYSTEM REGISTRATION INFORMATION

FIG.74

| SAM ID | ID OF SAM 212 |
|---|---|
| DEVICE NUMBER | DEVICE NUMBER (100) OF RECEIVER 201 |
| SETTLEMENT ID | SETTLEMENT ID OF USER A |
| UPPER LIMIT AMOUNT OF CHARGING | UPPER LIMIT AMOUNT FOR OFFICIAL REGISTRATION |
| SETTLEMENT USER / SETTLEMENT INFORMATION — NAME | NAME OF USER A |
| ADDRESS | ADDRESS OF USER A |
| TELEPHONE NUMBER | TELEPHONE NUMBER OF USER A |
| SETTLEMENT ORGANIZATION INFORMATION | SETTLEMENT ORGANIZATION INFORMATION OF USER A |
| BIRTHDAY | BIRTHDAY OF USER A |
| AGE | 35 |
| GENDER | MALE |
| USER ID | ID OF USER A |
| PASSWORD | PASSWORD OF USER A |
| SUBORDINATE USER / SUB INFORMATION — NAME | NAME OF USER B |
| ADDRESS | ADDRESS OF USER B |
| TELEPHONE NUMBER | TELEPHONE NUMBER OF USER B |
| BIRTHDAY | BIRTHDAY OF USER B |
| GENDER | GENDER OF USER B |
| USER ID | ID OF USER B |
| PASSWORD | PASSWORD OF USER B |
| USAGE POINT INFORMATION | |

REFERENCE INFORMATION 201

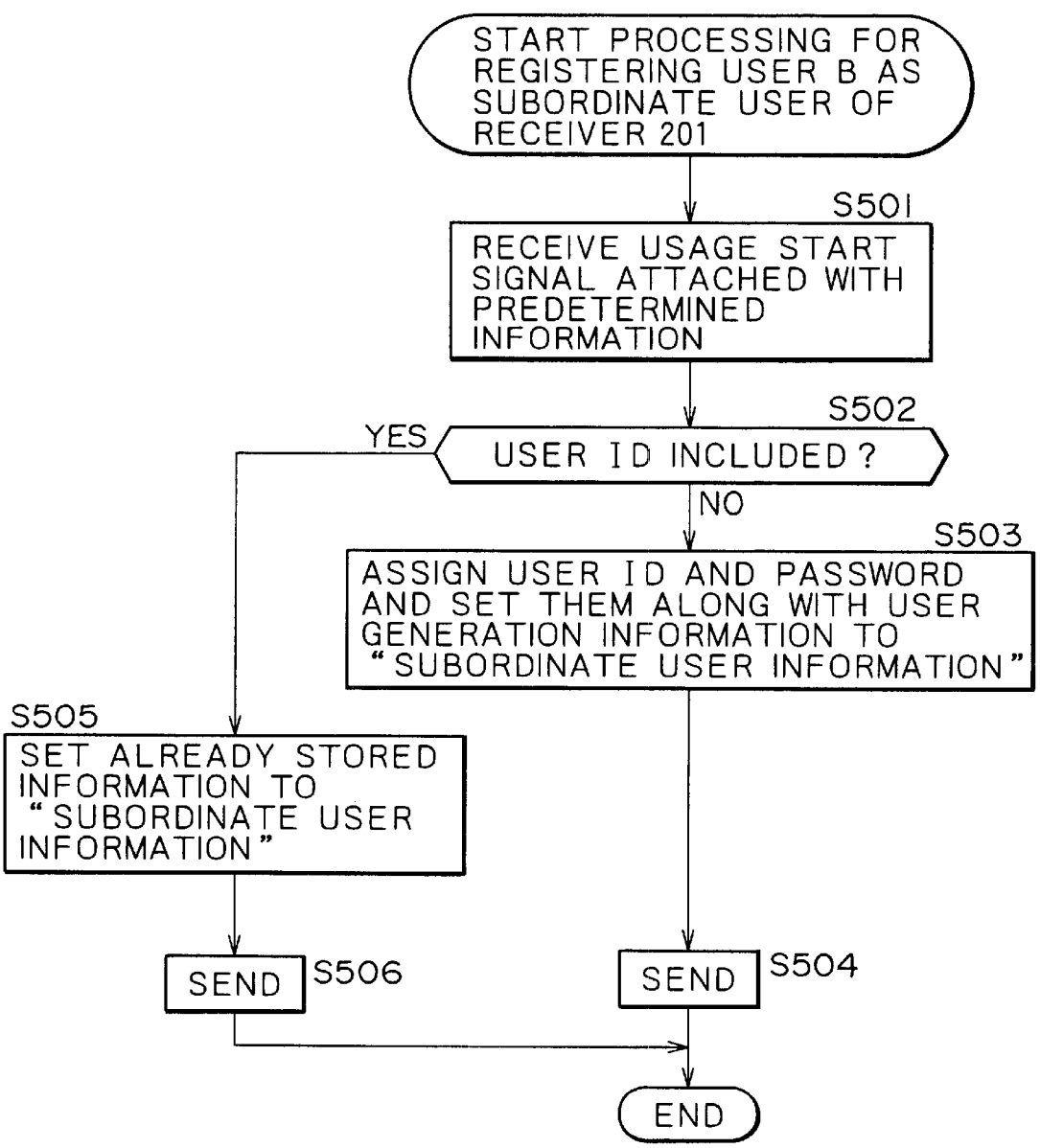

FIG. 76

| SAM ID | ID OF SAM 62 | ID OF SAM 212 | ID OF SAM 311 |
|---|---|---|---|
| DEVICE NUMBER | DEVICE NUMBER (100) OF RECEIVER 51 | DEVICE NUMBER (100) OF RECEIVER 201 | DEVICE NUMBER (25) OF RECEIVER 301 |
| SETTLEMENT ID | SETTLEMENT ID OF USER F | SETTLEMENT ID OF USER A | SETTLEMENT ID OF USER A |
| SETTLEMENT USER INFORMATION — NAME | NAME OF USER F | NAME OF USER A | NAME OF USER A |
| ADDRESS | ADDRESS OF USER F | ADDRESS OF USER A | ADDRESS OF USER A |
| TELEPHONE NUMBER | TELEPHONE NUMBER OF USER F | TELEPHONE NUMBER OF USER A | TELEPHONE NUMBER OF USER A |
| SETTLEMENT ORGANIZATION INFORMATION | SETTLEMENT ORGANIZATION INFORMATION OF USER F | SETTLEMENT ORGANIZATION INFORMATION OF USER A | SETTLEMENT ORGANIZATION INFORMATION OF USER A |
| BIRTHDAY | BIRTHDAY OF USER F | BIRTHDAY OF USER A | BIRTHDAY OF USER A |
| AGE | AGE OF USER F | AGE OF USER A (35 YEARS OLD) | AGE OF USER A (35 YEARS OLD) |
| GENDER | GENDER OF USER F (MALE) | GENDER OF USER A (MALE) | GENDER OF USER A (MALE) |
| USER ID | ID OF USER F | ID OF USER A | ID OF USER A |
| PASSWORD | PASSWORD OF USER F | PASSWORD OF USER A | PASSWORD OF USER A |
| SUBORDINATION USER INFORMATION — NAME | | NAME OF USER B | |
| ADDRESS | | ADDRESS OF USER B | |
| TELEPHONE NUMBER | | TELEPHONE NUMBER OF USER B | |
| BIRTHDAY | | BIRTHDAY OF USER B | |
| GENDER | | GENDER OF USER B | |
| USER ID | | ID OF USER B | |
| PASSWORD | | PASSWORD OF USER B | |
| USAGE POINT INFORMATION | USAGE POINT INFORMATION OF RECEIVER 51 | | |

SYSTEM REGISTRATION INFORMATION

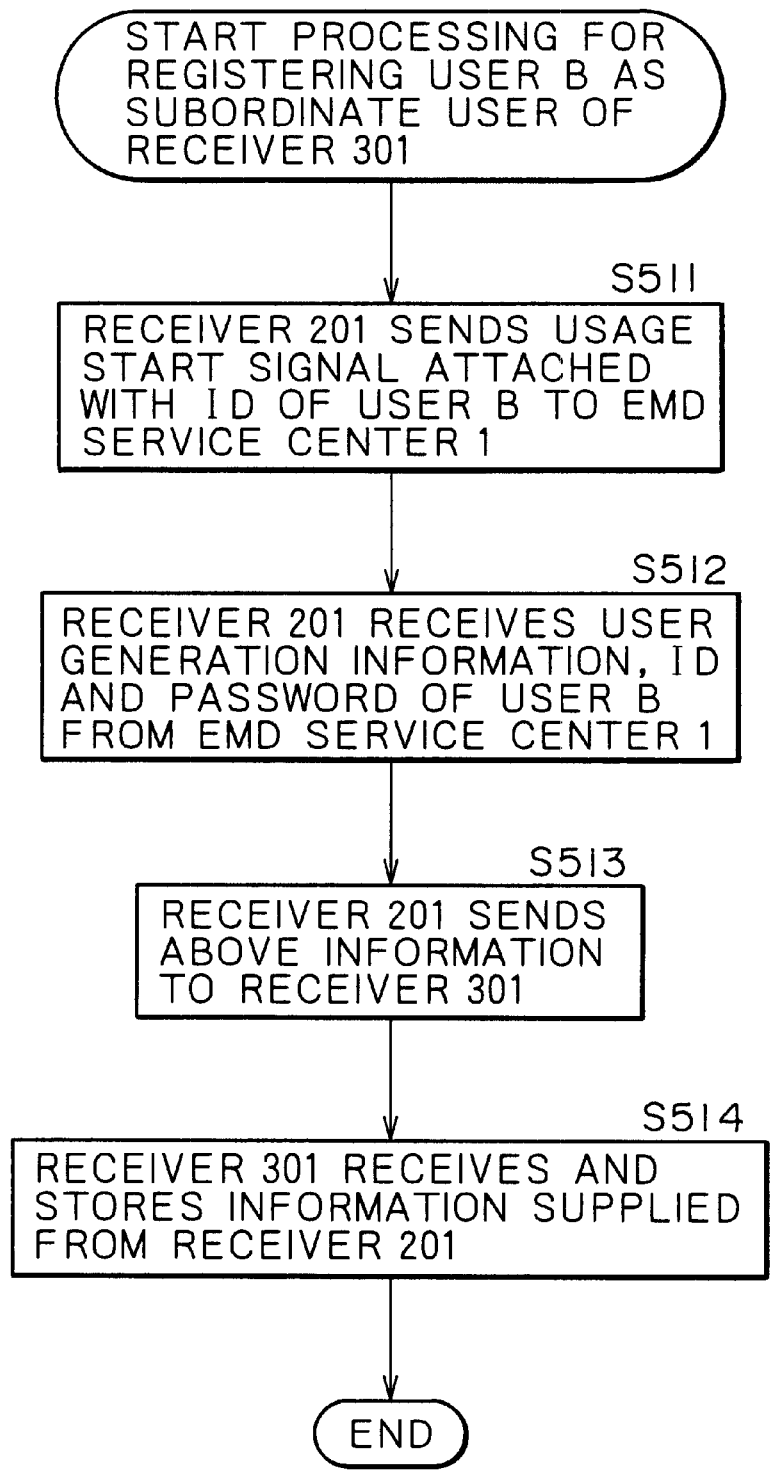

FIG. 78

| SAM ID | ID OF SAM 311 |
|---|---|
| DEVICE NUMBER | DEVICE NUMBER (25) OF RECEIVER 301 |
| SETTLEMENT ID | SETTLEMENT ID OF USER A |
| UPPER LIMIT AMOUNT OF CHARGING | UPPER LIMIT AMOUNT FOR OFFICIAL REGISTRATION |
| SETTLEMENT USER / INFORMATION / NAME | NAME OF USER A |
| ADDRESS | ADDRESS OF USER A |
| TELEPHONE NUMBER | TELEPHONE NUMBER OF USER A |
| SETTLEMENT ORGANIZATION INFORMATION | SETTLEMENT ORGANIZATION INFORMATION OF USER A |
| BIRTHDAY | BIRTHDAY OF USER A |
| AGE | 35 |
| GENDER | MALE |
| USER ID | ID OF USER A |
| PASSWORD | PASSWORD OF USER A |
| SUBORDINATE USER / INFORMATION / NAME | NAME OF USER B |
| ADDRESS | ADDRESS OF USER B |
| TELEPHONE NUMBER | TELEPHONE NUMBER OF USER B |
| BIRTHDAY | BIRTHDAY OF USER B |
| GENDER | GENDER OF USER B |
| USER ID | ID OF USER B |
| PASSWORD | PASSWORD OF USER B |
| USAGE POINT INFORMATION | |

REFERENCE INFORMATION 301

FIG. 79

| SAM ID | ID OF SAM 62 | ID OF SAM 212 | ID OF SAM 311 |
|---|---|---|---|
| DEVICE NUMBER | DEVICE NUMBER (100) OF RECEIVER 51 | DEVICE NUMBER (100) OF RECEIVER 201 | DEVICE NUMBER (25) OF RECEIVER 301 |
| SETTLEMENT ID | SETTLEMENT ID OF USER F | SETTLEMENT ID OF USER A | SETTLEMENT ID OF USER A |
| SETTLEMENT USER INFORMATION — NAME | NAME OF USER F | NAME OF USER A | NAME OF USER A |
| ADDRESS | ADDRESS OF USER F | ADDRESS OF USER A | ADDRESS OF USER A |
| TELEPHONE NUMBER | TELEPHONE NUMBER OF USER F | TELEPHONE NUMBER OF USER A | TELEPHONE NUMBER OF USER A |
| SETTLEMENT ORGANIZATION INFORMATION | SETTLEMENT ORGANIZATION INFORMATION OF USER F | SETTLEMENT ORGANIZATION INFORMATION OF USER A | SETTLEMENT ORGANIZATION INFORMATION OF USER A |
| BIRTHDAY | BIRTHDAY OF USER F | BIRTHDAY OF USER A | BIRTHDAY OF USER A |
| AGE | AGE OF USER F | AGE OF USER A (35 YEARS OLD) | AGE OF USER A (35 YEARS OLD) |
| GENDER | GENDER OF USER F (MALE) | GENDER OF USER A (MALE) | GENDER OF USER A (MALE) |
| USER ID | ID OF USER F | ID OF USER A | ID OF USER A |
| PASSWORD | PASSWORD OF USER F | PASSWORD OF USER A | PASSWORD OF USER A |
| SUBORDINATION USER INFORMATION — NAME | | NAME OF USER B | NAME OF USER B |
| ADDRESS | | ADDRESS OF USER B | ADDRESS OF USER B |
| TELEPHONE NUMBER | | TELEPHONE NUMBER OF USER B | TELEPHONE NUMBER OF USER B |
| BIRTHDAY | | BIRTHDAY OF USER B | BIRTHDAY OF USER B |
| GENDER | | GENDER OF USER B | GENDER OF USER B |
| USER ID | | ID OF USER B | ID OF USER B |
| PASSWORD | | PASSWORD OF USER B | PASSWORD OF USER B |
| USAGE POINT INFORMATION | USAGE POINT INFORMATION OF RECEIVER 51 | | |

SYSTEM REGISTRATION INFORMATION

INFORMATION PROCESSING APPARATUS AND METHOD, INFORMATION MANAGEMENT APPARATUS AND METHOD, AND INFORMATION PROVIDING MEDIUM

BACKGROUND OF THE INVENTION

The present invention relates generally to an information processing apparatus and an information processing method, an information management apparatus and an information managing method, and an information providing medium and, more particularly, to an information processing apparatus, an information processing method, and an information providing medium that decrypt encrypted information.

Systems are known in which information such as music is encrypted and the encrypted information is sent to an information processing apparatus of a user with whom a predetermined contract has been concluded, and the received information is decrypted in that information processing apparatus for use. Such information is hereafter referred to as content.

However, for a user to actually receive and use content by means of an information processing apparatus and, the user and the information processing apparatus must be registered in any of the above-mentioned system. So, the user makes an application for the registration into the system by following a predetermined registration procedure. When the application has been completed, a managing company for example for managing the system executes predetermined registration processing such as credit granting. Generally, it takes several days or weeks after the application of the registration for the user and the information processing apparatus to be registered in the system after completion of the registration processing. During this period, the user cannot use the content that is provided by this system.

In addition, if a user has two or more information processing apparatuses, the user must submit the information about each information processing apparatus separately for the application at much expense in time and effort.

SUMMARY OF THE INVENTION

It is therefore an object of the present invention to provide an information processing apparatus and an information processing method, an information management apparatus and an information managing method, and an information providing medium that perform significantly quickly and efficiently the processing of registering users and their information processing apparatuses into content-providing systems.

In carrying out the invention and according to one aspect thereof, there is provided an information processing apparatus managed by a management apparatus to decrypt encrypted information to use resultant decrypted information, comprising: first sending means for sending a usage start signal indicative of start of use of the encrypted information to the management apparatus after predetermined registration application information including an identification of the information processing apparatus is supplied to the management apparatus; second sending means for sending the identification to the management apparatus in correspondence with the usage start signal sent by the first sending means; first storage means for receiving and storing the usage start signal supplied from the management apparatus through the first sending means, a predetermined key usable for decrypting the encrypted information only for a first period of time, the predetermined key corresponding to the identification supplied from the second sending means, and first upper limit information indicative of a predetermined upper limit amount of first charges; second storage means for receiving and storing a predetermined key usable for decrypting the encrypted information only for a second period of time, the predetermined key corresponding to the registration application information supplied from the management apparatus, second upper limit information indicative of a predetermined upper limit amount of second charges, and a predetermined settlement identification; third storage means for receiving and storing a predetermined registration condition supplied from the management apparatus; and control means for controlling an operation of the information processing apparatus on the basis of the registration condition stored in the third storage means.

In carrying out the invention and according to another aspect thereof, there is provided an information processing method for an information processing apparatus managed by a management apparatus to decrypt encrypted information to use resultant decrypted information, the method comprising: a first sending step of sending a usage start signal indicative of start of use of the encrypted information to the management apparatus after predetermined registration application information including an identification of the information processing apparatus is supplied to the management apparatus; a second sending step of sending the identification to the management apparatus in correspondence with the usage start signal sent in the first sending step; a first storage step of receiving and storing the usage start signal supplied from the management apparatus in the first sending step, a predetermined key usable for decrypting the encrypted information only for a first period of time, the predetermined key corresponding to the identification supplied in the second sending step, and first upper limit information indicative of a predetermined upper limit amount of first charges; a second storage step of receiving and storing a predetermined key usable for decrypting the encrypted information only for a second period of time, the predetermined key corresponding to the registration application information supplied from the management apparatus, second upper limit information indicative of a predetermined upper limit amount of second charges, and a predetermined settlement identification; a third storage step of receiving and storing a predetermined registration condition supplied from the management apparatus; and a control step of controlling an operation of the information processing apparatus on the basis of the registration condition stored in the third storage step.

In carrying out the invention and according to still another aspect thereof, there is provided an information providing medium for providing a computer program for making an information processing apparatus managed by a management apparatus to decrypt encrypted information to use resultant decrypted information execute processing, the processing comprising: a first sending step of sending a usage start signal indicative of start of use of the encrypted information to the management apparatus after predetermined registration application information including an identification of the information processing apparatus is supplied to the management apparatus; a second sending step of sending the identification to the management apparatus in correspondence with the usage start signal sent in the first sending step; a first storage step of receiving and storing the usage start signal supplied from the management apparatus in the first sending step, a predetermined key usable for decrypting the encrypted information only for a first period of time, the predetermined key corresponding to the identification supplied in the second sending step, and first upper limit information indicative of a predetermined upper limit amount of first charges; a second storage step of receiving and storing a predetermined key usable for decrypting the encrypted information only for a second period of time, the predetermined key corresponding to the registration application information supplied from the management apparatus, second upper limit information indicative of a predetermined upper limit amount of second charges, and a predetermined settlement identification; a third storage step of receiving and storing a predetermined registration condition supplied from the management apparatus; and a control step of controlling an operation of the information processing apparatus on the basis of the registration condition stored in the third storage step.

In the above-mentioned information processing apparatus, information processing method, and information providing medium, after predetermined registration application information including the identification of the information processing apparatus is provided to a management apparatus, the information processing apparatus sends a set of a usage start signal indicative of start of use of information and the identification of the information processing apparatus to the management apparatus. The information processing apparatus receives, from the management apparatus, and stores a predetermined key usable only for a first period of time for decrypting encrypted information corresponding to the usage start signal and the identification, and a first upper limit information indicative of a predetermined upper limit amount of first charges. The information processing apparatus receives, from the management apparatus, and stores a key usable only for a second period of time for decrypting encrypted information corresponding to the registration application information, second upper limit information indicative of a predetermined upper limit amount of second charges, and a predetermined settlement identification. The information processing apparatus receives, from the management apparatus, a predetermined registration condition and stores it. The operation of the information processing apparatus is managed on the basis of the stored registration condition.

In carrying out the invention and according to yet another aspect thereof, there is provided a management apparatus for managing a predetermined apparatus that decrypts encrypted information to use resultant decrypted information, the management apparatus comprising: first execution means for executing first registration confirmation processing on the basis of predetermined user general information supplied in correspondence with an identification of the predetermined apparatus; first receiving means for receiving a predetermined usage start signal supplied from the predetermined apparatus; second receiving means for receiving the identification of the predetermined apparatus supplied therefrom in correspondence with the usage start signal received by the first receiving means; first sending means for sending a predetermined key usable only for a first period of time for decrypting the encrypted information, and first upper limit information indicative of an upper limit amount of first charges to the predetermined apparatus after the first receiving means receives the usage start signal and the second receiving means receives the identification of the predetermined apparatus; first assignment means for assigning a predetermined settlement identification according to a result of the first registration confirmation processing executed by the first execution means; registration means for registering, in correspondence to the result of the first registration confirmation processing executed by the first execution means, the settlement identification assigned by the first assignment means in correspondence with the identification of the predetermined apparatus received by the second receiving means; second sending means for sending the registered settlement identification registered by the registration means, a predetermined key usable only for a second period of time for decrypting the encrypted information, and second upper limit information indicative of a predetermined upper limit amount of second charges to the predetermined apparatus; and third sending means for generating and sending a registration condition of the predetermined apparatus on the basis of a result of the first registration confirmation processing executed by the first execution means.

In carrying out the invention and according to a different aspect thereof, there is provided a managing method for a management apparatus for managing a predetermined apparatus that decrypts encrypted information to use resultant decrypted information, the managing method comprising: a first execution step of executing first registration confirmation processing on the basis of predetermined user general information supplied in correspondence with an identification of the predetermined apparatus; a first receiving step of receiving a predetermined usage start signal supplied from the predetermined apparatus; a second receiving step of receiving the identification of the predetermined apparatus supplied therefrom in correspondence with the usage start signal received in the first receiving step; a first sending step of sending a predetermined key usable only for a first period of time for decrypting the encrypted information, and first upper limit information indicative of an upper limit amount of first charges to the predetermined apparatus after in the first receiving step the usage start signal is received, and in the second receiving step the identification of the predetermined apparatus is received; a first assignment step of assigning a predetermined settlement identification according to a result of the first registration confirmation processing executed in the first execution step; a registration step of registering, in correspondence to the result of the first registration confirmation processing executed in the first execution step, the settlement identification assigned in the first assignment step in correspondence with the identification of the predetermined apparatus received in the second receiving step; a second sending step of sending the registered settlement identification registered in the registration step, a predetermined key usable only for a second period of time for decrypting the encrypted information, and second upper limit information indicative of a predetermined upper limit amount of second charges to the predetermined apparatus; and a third sending step of generating and sending a registration condition of the predetermined apparatus on the basis of a result of the first registration confirmation processing executed in the first execution step.

In carrying out the invention and according to a still different aspect thereof, there is provided an information providing medium for providing a computer program for making a management apparatus for managing a predetermined apparatus for decrypting encrypted information and using resultant decrypted information execute processing, the processing comprising: a first execution step of executing first registration confirmation processing on the basis of predetermined user general information supplied in correspondence with an identification of the predetermined apparatus; a first receiving step of receiving a predetermined usage start signal supplied from the predetermined apparatus; a second receiving step of receiving the identification of the predetermined apparatus supplied therefrom in correspondence with the usage start signal received in the first receiving step; a first sending step of sending a predetermined key usable only for a first period of time for decrypting the encrypted information, and first upper limit information indicative of an upper limit amount of first charges to the predetermined apparatus after in the first receiving step the usage start signal is received, and in the second receiving step the identification of the predetermined apparatus is received; a first assignment step of assigning a predetermined settlement identification according to a result of the first registration confirmation processing executed in the first execution step; a registration step of registering, in correspondence to the result of the first registration confirmation processing executed in the first execution step, the settlement identification assigned in the first assignment step in correspondence with the identification of the predetermined apparatus received in the second receiving step; a second sending step of sending the registered settlement identification registered in the registration step, a predetermined key usable only for a second period of time for decrypting the encrypted information, and second upper limit information indicative of a predetermined upper limit amount of second charges to the predetermined apparatus; and a third sending step of generating and sending a registration condition of the predetermined apparatus on the basis of a result of the first registration confirmation processing executed in the first execution step.

In the above-mentioned management apparatus, managing method, and information providing medium, the management apparatus, receiving predetermined user general information from a predetermined apparatus under the management of the management apparatus in correspondence with the identification of the predetermined apparatus, the management apparatus executes first registration confirmation processing on the basis of the received user general information. The management apparatus receives, from the predetermined apparatus, a predetermined usage start signal and the identification of the predetermined apparatus in response to the received usage start signal. When the management apparatus has received the usage start signal and the identification of the predetermined apparatus, the management apparatus sends, to the predetermined apparatus, a key usable only for a first period of time for decrypting encrypted information and first upper limit information indicative of a predetermined upper limit amount of first charges. The management apparatus assigns a predetermined settlement identification according to a result of the first registration confirmation processing. The management apparatus registers the assigned settlement identification in correspondence to the received identification of the predetermined apparatus according to the result of the first registration confirmation processing. The management apparatus sends, to the predetermined apparatus, the registered settlement identification, a key usable for only a second period of time for decrypting encrypted information, and second upper limit information indicative of a predetermined upper limit amount of second charges. On the basis of the result of the first registration confirmation processing, the management apparatus generates a registration condition for the predetermined apparatus and sends the generated registration condition to the predetermined apparatus.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

These and other objects of the invention will be seen by reference to the description, taken in connection with the accompanying drawing, in which:

FIG. 3 is a block diagram illustrating a functional configuration of an EMD service center 1;

FIG. 4 is a diagram illustrating the transmission of delivery key Kd of the EMD service center 1;

FIG. 5 is a further diagram illustrating the transmission of delivery key Kd of the EMD service center 1;

FIG. 6 is another diagram illustrating the transmission of delivery key Kd of the EMD service center 1;

FIG. 7 is still another diagram illustrating the transmission of delivery key Kd of the EMD service center 1;

FIG. 8 illustrates provisional delivery key Kd of the EMD service center 1;

FIG. 9 illustrates system an example of system registration information;

FIGS. 12A and 12B illustrate examples of UCP (Usage Control Policy);

FIGS. 13A and 13B illustrate content management shifts;

FIGS. 15A and 15B illustrate examples of service code and conditional code values;

FIGS. 16A and 16B illustrate examples of code values set as UCP usage conditions;

FIG. 18 illustrates an example of a certificate of the content provider 2;

FIGS. 20A and 20B illustrate examples of PT (Price Tag);

FIGS. 21A and 21B illustrate examples of code values set as PT price conditions;

FIGS. 22A and 22B illustrate examples of other PTs;

FIGS. 23A and 23B illustrate examples of code values set as other PT price conditions;

FIG. 28 illustrates an example of UCS (Usage Control Status);

FIG. 30 illustrates an example of information on charges;

FIG. 32 illustrates reference information 51;

FIG. 33 illustrates an example of usage point information of the reference information 51;

FIG. 37 illustrates an example of reference information 201;

FIG. 38 is a flowchart describing content usage processing;

FIG. 49 illustrates an example of a registration form;

FIG. 51 illustrates another example of the reference information 201;

FIG. 53 illustrates still another example of the reference information 201;

FIG. 55 illustrates another example of system registration information;

FIG. 57 illustrates still another example of system registration information;

FIG. 58 illustrates yet another example of system registration information;

FIG. 59 is a flowchart describing the processing of acquiring a registration list;

FIG. 60 illustrates another example of the registration list;

FIG. 62 is a block diagram illustrating a functional configuration of a receiver 301;

FIG. 63 illustrates an example of reference information 301;

FIG. 65 illustrates yet another example of system registration information;

FIG. 67 illustrates another example of a registration form;

FIG. 69 illustrates another example of the reference information 301;

FIG. 71 illustrates a different example of system registration information;

FIG. 72 illustrates a still different example of system registration information;

FIG. 74 illustrates a yet another example of the reference information 201;

FIG. 75 is a flowchart describing another processing for registering user B as a subordinate user of the receiver 201;

FIG. 76 illustrates a yet another example of system registration information;

FIG. 77 is a flowchart describing processing for registering user B as a subordinate user of the receiver 301;

FIG. 78 illustrates still another example of information stored in the storage module 323 of the receiver 301; and FIG. 79 illustrates a different example of system registration information.

DETAILED DESCRIPTION OF PREFERRED EMBODIMENTS

This invention will be described in further detail by way of example with reference to the accompanying drawings.

In order to clarify the correlation between the means of the invention described in the claims appended hereto and the components of the embodiment of the invention, each of the means is followed by parentheses in which an example of the corresponding component of the embodiment is enclosed. It should be noted however that each of the above means are not restricted to those described below.

Figure 1:
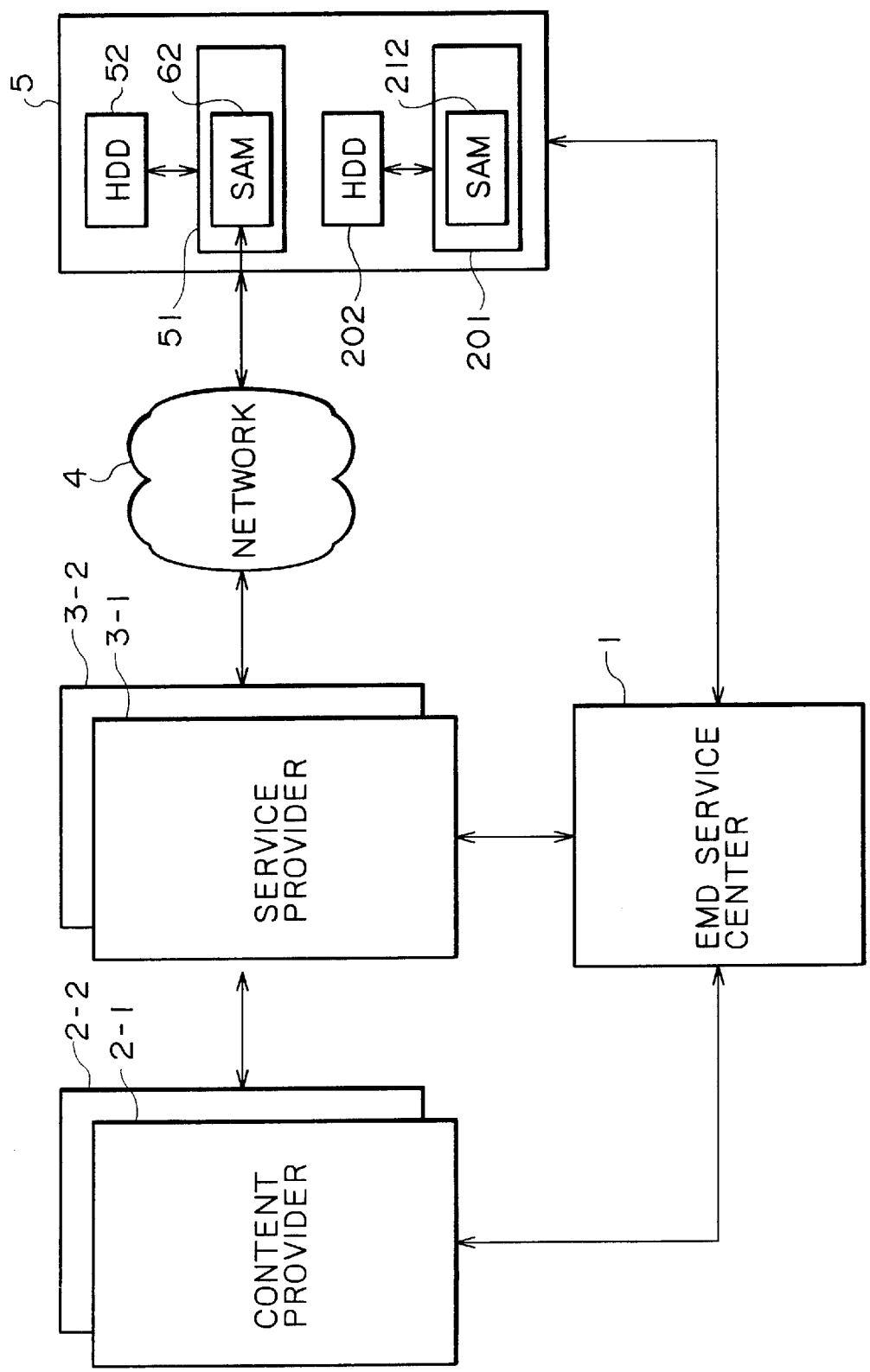
FIG. 1 is a schematic diagram illustrating an EMD (Electronic Music Distribution) system.

Now, referring to FIG. 1, there is shown an EMD (Electronic Music Distribution) system to which the present invention is applied. As shown, EMD system comprises an EMD service center 1 for managing registrations into the EMD system and managing various devices connected thereto, a content provider 2 for providing content, a service provider 3 for providing predetermined services corresponding to the content, and a user home network 5 composed of devices on which the content is used.

Content delivered (or provided) to devices (or users) registered in the EMD system denotes digital data in which information itself has a value. In present example, one item of content is equivalent to one title of music data. Content is provided to users with one item of content as one unit (called a single) or plural items of content as one unit (called an album). Users purchase provided content (actually buy the license to use the provided content) and use the purchased content.

Figure 2:
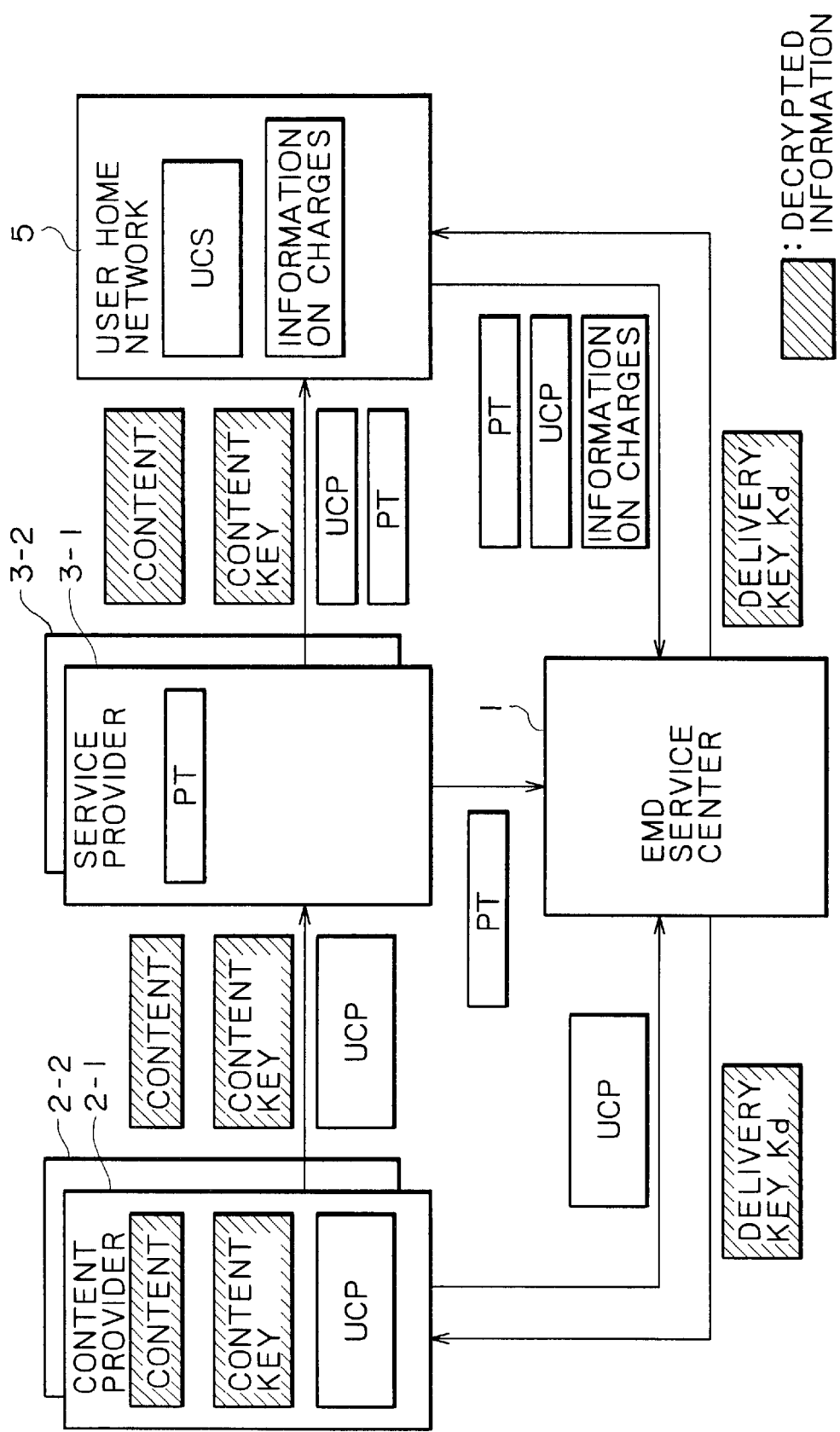
FIG. 2 is a schematic diagram illustrating a main information flow in the above-mentioned EMD system.

As shown in FIG. 2 illustrating a main information flow in the EMD system, the EMD service center 1 sends delivery key Kd necessary for use of content to a user home network 5 and plural content providers 2 (in present example, if there is no need for distinguishing between two content providers 2-1 and 2-2, they are generically referred to as the content provider 2, the same holding with other devices). The EMD service center 1 receives information such as information on charges from devices of the user home network 5 for usage charge settlement and receives a UCP (Usage Control Policy) from the content provider 2 and a PT (Price Tag) from the service provider 3.

The content providers 2-1 and 2-2 each hold content to be provided (as encrypted by content key Kco), content key Kco (encrypted by delivery key Kd) for decrypting encrypted content, and a UCP indicative of the information about use of content and provide these items to the service provider 3 in a form of content provider secure container to be described later. In present example, there are two service providers 3-1 and 3-2.

The service providers 3-1 and 3-2 each generate one or more pieces of price information known as PT, corresponding to the UCPs provided from the content provider 2 and hold PTs as shown in FIG. 2. The service provider 3 sends to the user home network 5 the generated PT along with the content (encrypted by content key Kco) provided from the content provider 2, content key Kco (encrypted by delivery key Kd), and UCP in the form of service provider secure container through a network 4 made up of a dedicated cable network, the Internet, or a satellite communication network.

On the basis of the provided UCP and PT, the user home network 5 generates a UCS (Usage Control Status) and executes the processing for using the content on the basis of the generated UCS. The user home network 5 also generates information on charges at the time the UCS is generated and sends the generated information on charges to the EMD service center 1 along with the information such as the corresponding UCP at the time delivery key Kd is provided for example.

In present example, the user home network 5 is composed of a receiver 51 connected to a HDD (Hard Disc Drive) 52 and having a SAM (Secure Application Module: SAM is a module which executes, for example, right processing of content, authentication processing, and the like in a content distribution system and has tamper resistance) 62 and a receiver 201 connected to a HDD 202 and having a SAM 212 as shown in FIG. 1. It is assumed here that, at this point of time, the receiver 51 is officially (or finally) registered in this EMD system while the receiver 201 is not.

Referring to FIG. 3, there is shown a functional configuration of the EMD service center 1. A service provider management block 11 provides profit distribution information to the service provider 3. A content provider management block 12 sends delivery key Kd and provides profit distribution information to the content provider 2.

The copyright management block 13 sends information indicative of content usage results of the user home network 5 to a copyright managing organization, for example JASRAC (Japanese Society for Rights of Authors, Composers and Publishers).

A key server 14 stores delivery key Kd and supplies it to the content provider 2 through the content provider management block 12 and the user home network 5 through a user management block 18.

The following describes devices of the user home network 5 (for example, the receiver 51) officially registered in this EMD system and delivery key Kd from the EMD service center 1 to be provided to the content provider 2 with reference to FIGS. 4 through 7.

FIG. 4 shows delivery keys Kd held by the EMD service center 1, delivery keys Kd held by the content provider 2, and delivery keys Kd held by the receiver 51 at the time of January 1998 for example on which the content provider 2 starts providing content and the receiver 51 (refer to FIG. 26) of the user home network 5 starts using the content.

In the example shown in FIG. 4, each delivery key Kd is valid from the first day of each month shown to the last. For example, version-1 delivery key Kd having a value "aaaaaaaa", a random number having the predetermined number of digits, is valid from Jan. 1, 1998 to Jan. 31, 1998 (namely, content key Kco for encrypting content to be delivered from the service provider 3 to the user home network 5 during a period starting Jan. 1, 1998 and ending Jan. 31, 1998 is encrypted by version-1 delivery key Kd). Version-2 delivery key Kd having a value "bbbbbbbb", a random number having the predetermined number of digits, is valid from Feb. 1, 1998 to Feb. 28, 1998 (namely, content key Kco for encrypting content to be delivered from the service provider 3 to the user home network 5 during this period is encrypted by version-2 delivery key Kd). Likewise, version-3 delivery key Kd is valid in March 1998, version-4 delivery key Kd is valid in April 1998, version-5 delivery key Kd is valid in May 1998, and version-6 delivery key Kd is valid in June 1998.

Before the content provider 2 starts providing content, the EMD service center 1 sends to the content provider 2 the six delivery keys Kd of version 1 through version 6 which are valid from January 1998 to June 1998. The content provider 2 receives these six delivery keys Kd and stores them. The delivery keys Kd for the six months are stored because the content provider 2 requires a predetermined period for preparing the content to be provided and encrypting the content key for example.

Before the receiver 51 starts using the content, the EMD service center 1 sends to the receiver 51 the three delivery keys Kd of version 1 through version 3 which are valid from January 1998 to March 1998. The receiver 51 receives these three delivery keys Kd and stores them. The delivery keys Kd for the three months are stored for the receiver 51 to avoid situations such as that the receiver 51 cannot use the content during the contract period due to troubles such as the failure of connection to the EMD service center 1. This storage is also made to reduce the frequency of connection to the EMD service center 1 to reduce the load of the user home network 5.

During the period from Jan. 1, 1998 to Jan. 31, 1998, version-1 delivery key Kd is used by the EMD service center 1, the content provider 2, and receiver 51 constituting the user home network 5.

The following describes the transmission of delivery keys Kd of the EMD service center 1 to the content provider 2 and the receiver 51 as of Feb. 1, 1998 with reference to FIG. 5. The EMD service center 1 sends to the content provider 2 the six delivery keys Kd of version 2 through version 7 which are valid from February 1998 to July 1998. The content provider 2 receives these delivery keys and writes them over the previously stored delivery keys Kd. The EMD service center 1 sends to the receiver 51 the three delivery keys Kd of version 2 through version 4 which are valid from February 1998 to April 1998. The receiver 51 receives these keys and writes them over the previously stored delivery keys Kd. The EMD service center 1 stores the version-1 delivery key as it is. By doing so, the EMD service center can use the delivery keys Kd used in the past should unexpected troubles occur or unauthorized activities occur or be found.

During a period from Feb. 1, 1998 and Feb. 28, 1998, version-2 delivery key Kd is used by the EMD service center 1, the content provider 2, and the receiver 51 constituting the user home network 5.

The following describes the transmission of delivery keys Kd of the EMD service center 1 to the content provider 2 and the receiver 51 as of Mar. 1, 1998 with reference to FIG. 6. The EMD service center 1 sends to the content provider 2 the six delivery keys Kd of version 3 through version 8 which are valid from March 1998 to August 1998. The content provider 2 receives these keys and writes them over the previously stored delivery keys Kd. The EMD service center 1 sends to the receiver 51 the three delivery keys Kd of version 3 through version 5 which are valid from March 1998 to May 1998. The receiver 51 receives these keys and writes them over the previously stored delivery keys Kd. The EMD service center 1 stores version-1 delivery key Kd and version-2 delivery key Kd as they are.

During a period from Mar. 1, 1998 to Mar. 31, 1998, version-3 delivery key Kd is used by the EMD service center 1, the content provider 2, and the receiver 51 constituting the user home network 5.

The following describes the transmission of delivery keys Kd of the EMD service center 1 to the content provider 2 and the receiver 51 as of Apr. 1, 1998 with reference to FIG. 7. The EMD service center 1 sends to the content provider 2 the six delivery keys Kd of version 4 through version 9 which are valid from April 1998 to September 1998. The content provider 2 receives these keys and writes them over the previously stored delivery keys Kd. The EMD service center 1 sends to the receiver 51 the three delivery keys Kd of version 4 through version 6 which are valid from April 1998 to June 1998. The receiver 51 receives these keys and writes them over the previously stored delivery keys Kd. The EMD service center 1 stores version-1 delivery key Kd, version-2 delivery key Kd, and version-3 delivery key Kd as they are.

During a period from Apr. 1, 1998 to Apr. 30, 1998, version-4 delivery key Kd is used by the EMD service center 1, the content provider 2, and the receiver 51 constituting the user home network 5.

Thus, delivery keys Kd for three months are distributed to the device, officially registered in the EMD system, of the user home network 5 and the content provider 2. The other device, the receiver 201, not officially but provisionally (details to be described) registered in the EMD system, of the user home network 5 is distributed with not delivery keys Kd for three months but provisional delivery key Kd for 1 month as shown in FIG. 8.

Referring to FIG. 3 again, the history data management block 15 stores the information on charges and the PT and UCP corresponding to that content supplied from the user management block 18.

The profit distribution block 16 computes the profits for the EMD service center 1, the content providers 2-1 and 2-2, and the service providers 3-1 and 3-2 on the basis of various pieces of information supplied from the history data management block 15 and outputs the computational results to the service provider management block 11, the content provider management block 12, the cashier block 20, and the copyright management block 13. The profit distribution block 16 also computes a usage point (which increases as the profit increases, or as the user uses content more frequently) for each of the content providers 2-1 and 2-2 and the service providers 3-1 and 3-2 according to the computed profits and outputs the computed usage points to the user management block 18. It should be noted that the usage point in the content provider 2 is hereafter referred to as a content usage point and the usage point in the service provider 3 as a service usage point.

The cross-authentication block 17 executes cross authentication between the content provider 2, the service provider 3, and the device of the user home network 5.

The user management block 18 manages information associated with the devices of the user home network 5 which can be registered in the EMD system (this information hereafter referred to as system registration information). The system registration information includes "SAM ID," "Device Number," "Settlement ID," "Settlement User Information," plural pieces of "Subordinate User Information," and "Usage Point Information" as shown in FIG. 9.

Set to "SAM ID" is the ID of the SAM of the device in the user home network 5. The IDs of the SAM 62 in the receiver 51 and the ID of the SAM 212 in the receiver 201 are set to the "SAM ID" shown in FIG. 9.

Set to "Device Number" is a device number preset to a device having a SAM in the user home network 5. If the device in the user home network 5 has a capability of communicating with the service provider 3 through the network 4 and directly with the EMD service center 1 (namely, if the device has a communication block) and a capability of outputting (or displaying) the descriptions of UCP and PT for example to the user and allowing the user to select the usage description of UCP (namely, if the device has a display block and an operator block), the device (hereafter referred to as a main device) is assigned with a device number 100 or higher. If the device has no such capabilities, the device (hereafter referred to as a subordinate device) is assigned with a device number 99 or lower. In present example, the receivers 51 and 201 have each a device having the above-mentioned capabilities, so that each device is assigned a device number 100 or higher (100 in present example), details thereof will be described later. Thus, device number 100 is set to the devices corresponding to the SAM 62 of the receiver 51 and the SAM 212 of the receiver 201 as shown in FIG. 9.

Set to "Settlement ID" is a predetermined settlement ID to be assigned at the official registration in the EMD system. In present example, the receiver 51 is officially registered and assigned a settlement ID, so that this assigned settlement ID is recorded in "Settlement ID" corresponding to the ID of the SAM 62 of the system registration information shown in FIG. 9. On the other hand, the receiver 201 is not registered in the EMD system and therefore no settlement ID is assigned, so that no information is set to "Settlement ID" corresponding to the ID of the SAM 212 of the system registration information shown in FIG. 9.

"Settlement User Information" includes the name, address, telephone number, settlement organization information (for example, credit card number), birthday, age, gender, ID, and password for example of the user for whom charges is settled (this user is hereafter referred to as a settlement user).

The settlement user's name, address, telephone number, settlement organization information, birthday, age, and gender to be set to "Settlement User Information" (if these items of information need not be distinguished from each other, they are hereafter generically referred to as user generation information) are provided by the settlement user at the time of application for the official registration. In present example, the name, the address, the telephone number, and the settlement organization information need to be correct information (for example, the information registered in a settlement organization) because credit granting processing is executed on the basis of these items of information. In the present example, the birthday, the age, and the gender need not be correct because they are not used for credit granting processing and therefore the user is not always required to submit them. The ID and password of the settlement user to be recorded on the "Settlement User Information" are assigned and set at the time of the provisional registration in the EMD system.

In the present example, with the receiver 51, user F is registered as the settlement user, so that the user general information, ID, and password provided by user F are set to "Settlement User Information" corresponding to the ID of the SAM 62 of the system registration information shown in FIG. 9. Because the receiver 201 has not applied for registration, no information is set to "Settlement User Information" corresponding to the ID of the SAM 212.

Each "Subordinate User Information" records the name, address, telephone number, birthday, age, gender, ID, and password for example of a user for whom charges is not settled (this user is hereafter referred to as a subordinate user). Namely, of the item of information to be set to "Settlement User Information," the items of information other than the settlement organization information are set. Because no credit granting processing is executed for the subordinate user, the subordinate user's name, address, telephone number, birthday, age, and gender need not be correct. For example, the name may be a dummy name. The name is used for identifying the user. But the user need not provide the other information. The ID and password of the subordinate user to be set to "Subordinate User Information" are assigned and set at the time of provisional or official registration.

In the present example, no subordinate user is registered for both the receiver 51 and receiver 201, so that no information is set to "Subordinate User Information" corresponding to the ID of the SAM 62 and that corresponding to the ID of the SAM 212 of the system registration information shown in FIG. 9.

Figures 10, 11:
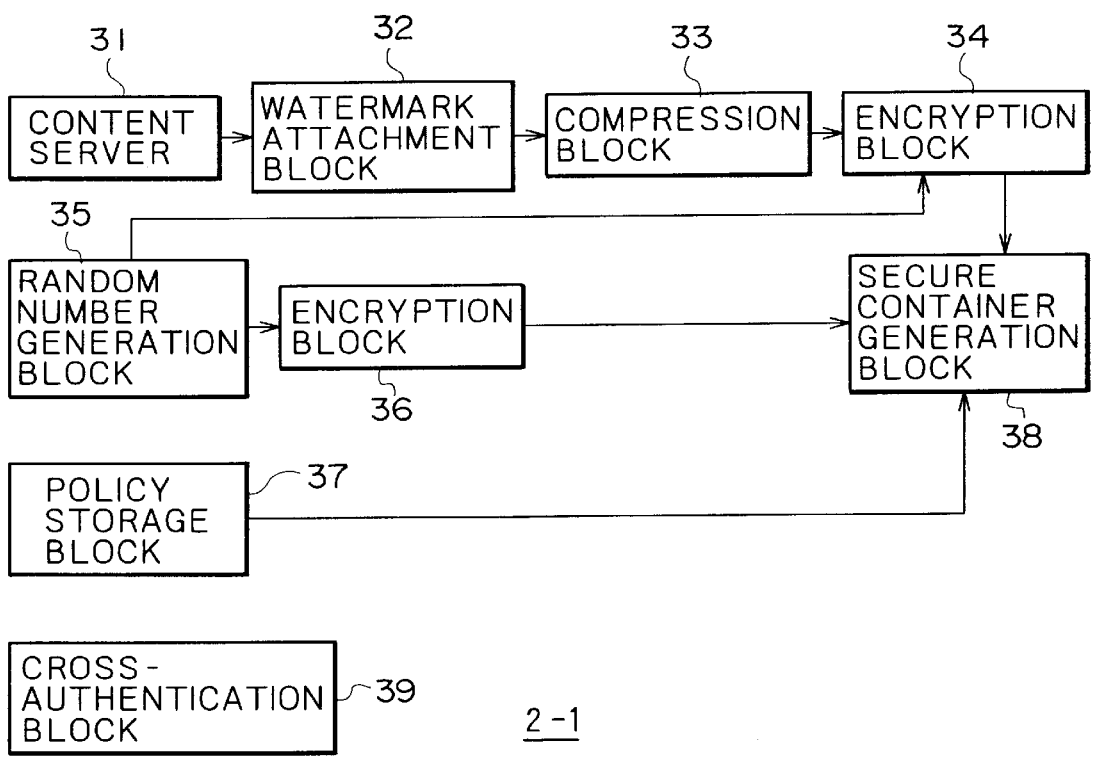
FIG. 10 illustrates usage point information.
FIG. 11 is a block diagram illustrating a functional configuration of a content provider 2.

Set to "Usage Point Information" is a usage point outputted from the profit distribution block 16. In the present example, content is already in use by the receiver 51 and the usage point information as shown in FIG. 10 is set to "Usage Point Information" corresponding to the SAM 62. In an example shown in FIG. 10, the point of using the content provided by the content provider 2-1 to user F (the settlement user) of the receiver 51 is 222, that by the content provider 2-2 is 123, the point of using the service by the service provider 3-1 is 345, and the point by the service provider 3-2 is 0.

It should be noted that, in the present example, the total point 345 (=123+222) of the content usage points for the content providers 2-1 and 2-2 is made equal to the total point 345 (=345+0) of the service usage points of the service providers 3-1 and 3-2.

Because no content is currently used in the receiver 201 (the usage of content is not granted), no information is set to "Usage Point Information" corresponding to the ID of the SAM 212.

In addition to managing the above-mentioned system registration information, the user management block 18 generates a registration list (to be described later) in correspondence with predetermined processing and sends it along with delivery key Kd to the user home network 5.

Referring to FIG. 3 again, an charging block 19 computes the charges for the user on the basis of the information on charges, UCP, and PT supplied from the history data management block 15 and outputs a computational result to a cashier block 20. The cashier block 20 communicates with a bank for example not shown to execute settlement processing on the basis of the payments to the user, the content provider 2, and the service provider 3 and the amount of fees to be collected therefrom. The cashier block 20 also informs the user management block 18 of a result of the settlement processing. An audit block 21 audits the validity of the information on charges, PT, and UCP supplied from the device of the user home network 5.

Referring to FIG. 11, there is shown a functional configuration of the content provider 2-1. A content server 31 stores content to be provided to the user and sends the content to a watermark attachment block 32. The watermark attachment block 32 attaches a watermark (or an electronic watermark) to the content and supplies the resultant content to a compression block 33.

The compression block 33 compresses the content supplied from the watermark attachment block 32 by use of a compression scheme such as ATRAC2 (Adaptive Transform Acoustic Coding 2) (trademark) and supplies the compressed content to an encryption block 34. The encryption block 34 encrypts the compressed content by using as the key a random number supplied from a random number generation block 35 (this random number hereafter being referred to as content key Kco) and by using a common key encryption scheme such as DES (Data Encryption Standard) and outputs the encrypted content to a secure container generation block 38.

The random number generation block 35 supplies a random number having the predetermined number of digits providing content key Kco to the encryption block 34 and another encryption block 36. The encryption block 36 encrypts content key Kco by use of delivery key Kd supplied from the EMD service center 1 through a common key encryption scheme such as DES and outputs encrypted content key Kco to the secure container generation block 38.

DES uses a common key of 56 bits and processes 64 bits of plaintext as one block. The DES processing is composed of a data permutation block in which plaintext is permuted into ciphertext and a key processing block in which a key (or an enlargement key) for use in the data permutation block is generated from the common key. All algorithms of DES are publicized, so that only the basic processing of the data permutation block will be described below.

First, the 64 bits of plaintext are divided into high-order 32 bits $H_0$ and low-order 32 bits $L_0$. From a 48-bit enlargement key $K_1$ and the low-order 32 bits $L_0$ supplied from the key processing block, an output of F function obtained by permutating the low-order 32 bits $L_0$ is computed. F function consists of two basic transformations; substitution for substituting numeric values by a predetermined law and transposition in which bit positions are transposed by a predetermined law. Next, the high-order 32 bits $H_0$ is exclusively ORed with the output of F function, a result thereof being $L_1$ and $L_0$ being $H_1$.

On the basis of the high-order 32 bits $H_0$ and the low-order 32 bits $L_0$, the above-mentioned process is iterated 16 times, resultant high-order 32 bits $H_{16}$ and low-order 32 bits $L_{16}$ being output as ciphertext. Decryption of the ciphertext is realized by use of the common key used in the encryption and by following the above-mentioned process in the reverse order.

A policy storage block 37 stores the UCP corresponding to content and outputs the UCP to the secure container generation block 38. FIGS. 12A and 12B show UCP A and UCP B respectively which are set for content A stored in the content server 31 and are stored in the policy storage block 37. The UCP includes predetermined information such as items corresponding to "Content ID," "Content Provider ID," "UCP ID," "Valid Period of UCP," "Usage Condition," and "Usage Description." Set to "Content ID" is the ID of the content corresponding to the UCP. The ID of content A is set to "Content ID" of UCP A (FIG. 12A) and UCP B (FIG. 12B).

Set to "Content Provider ID" is the ID of the content provider from which the content is provided. The ID of the content provider 2-1 is set to the "Content Provider ID" of UCP A and UCP B. Set to "UCP ID" is the predetermined ID assigned to each UCP. The UCP ID A is set to "UCP ID" of UCP A and the UCP ID B is set to "UCP ID" of UCP B. Set to "Valid Period of UCP" is the information indicative of the valid period of the UCP. The valid period of UCP A is set to "Valid Period of UCP" of UCP A and the valid period of UCP B is set to "Valid Period of UCP" of UCP B.

Set to "Usage Condition" is predetermined information corresponding to "User Condition" and "Device Condition." Set to "User Condition" is information indicative of a user predetermined condition allowing the selection of this UCP. Set to "Device Condition" is information indicative of device predetermined condition allowing the selection of this UCP.

For UCP A, "Usage Condition 10" is set. "User Condition 10" of "Usage Condition 10" has information ("200 points or higher") indicative of a condition that the usage point is 200 or higher. "Device Condition 10" of "Usage Condition 10" has information ("No condition") indicative that there is no condition. Namely, UCP A is selectable only by a user having a content usage point of 200 or higher of the content provider 2-1.

For UCP B, "Usage Condition 20" is set. "User Condition 20" of "Usage Condition 20" has information ("lower than 200") indicative of a condition that the usage point is lower than 200. "Device Condition 20" of "Usage Condition 20" has information ("No condition") indicative that there is no condition. Namely, UCP B is selectable only by a user having a content usage point of lower than 200 of the content provider 2-1.

"Usage Description" has predetermined information corresponding to "ID," "Form," "Parameter," and "Management Shift Permit Information." Set to "ID" is a predetermined ID assigned to information to be set to "Usage Description." Set to "Form" is information indicative of content usage forms such as reproduction and duplication. Set to "Parameter" is predetermined information corresponding to the usage form set to "Form."

Set to "Management Shift Permit Information" is a predetermined status flag for example for managing the shift of content management. When a content management shift occurs, the content is duplicated into a destination device without leaving a source device as shown in FIG. 13A. Namely, the same content is used by both the source and destination devices. This is different from a usual content management shift in which, as shown in FIG. 13B, content is moved to a destination device by leaving a source device and therefore the content is available only in the destination device.

Figure 14B:
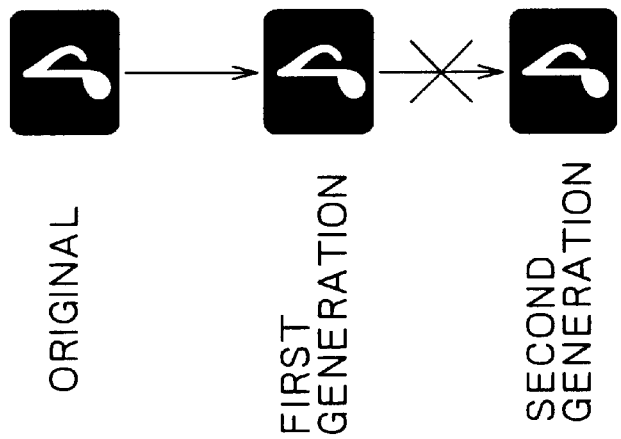
FIGS. 14A and 14B illustrate examples of first-generation duplication.
Figure 14A:
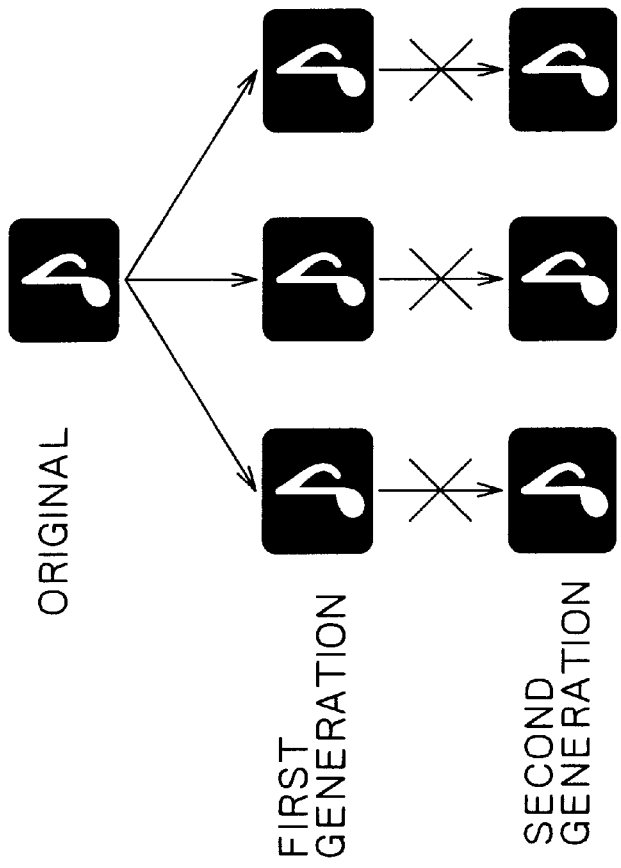

It should be noted that, while a content management shift is in process, the source device is not allowed to shift content management to another destination device as shown in FIG. 13A. Namely, the content is held only by the two devices, one source and one destination. This is different from first-generation duplication in which two or more duplications (of the first generation) can be generated from original content as shown in FIG. 14A. This is also different from one-time-only duplication shown in FIG. 14B because the content management moved to one destination device can be retrieved and then passed to another destination device.

Referring to FIG. 12A again, four "Usage Description 11" through "Usage Description 14" are set to UCP A. In "Usage Description 11," "ID 11" has a predetermined ID assigned to "Usage Description 11." "Form 11" has information ("Reproduction by Purchase") indicative of the usage form for purchase content for reproduction. "Parameter 11" has predetermined information for "Reproduction by Purchase." "Management Shift Permit Information 11" has status information indicative that there is no content management shift.

In "Usage Description 12," "ID 12" has a predetermined ID allocated to "Usage Description 12." "Form 12" has information ("First-generation Duplication") indicative of a usage form in which first generation duplication is made. As shown in FIG. 14A, in the first-generation duplication, plural first-generation duplications can be made from the original content but no second-generation duplication can be made from the first-generation duplication (such duplication is not permitted). "Parameter 12" has predetermined information corresponding to "First-generation duplication." "Management Shift Permit Information 12" has status information indicative that there is no content management shift.

In "Usage Description 13," "ID 13" has a predetermined ID assigned to "Usage Description 13." "Form 13" has information ("Time-limited Reproduction") indicative of a usage form in which the content is reproduced only in a predetermined period. "Parameter 13" has the start and end of the predetermined period for "Time-limited Reproduction." "Management Shift Permit Information 13" has status information indicative that there is no content management shift.

In "Usage Description 14," "ID 14" has a predetermined ID assigned to "Usage Description 14." "Form 14" has information ("Pay Per Copy") indicative of a usage form in which duplication is made once. It should be noted that, in the case of "Pay Per Copy," no duplication can be made from another duplication as shown in FIG. 14B (such duplication is not permitted). "Parameter 14" has predetermined information for "Pay Per copy." "Management Shift Permit Information 14" has status information indicative that there is no content management shift.

Although not shown in this example, there is also a form in which content can be reproduced (or duplicated) only for the predetermined number of times. If this type of usage form is set to "Form," the corresponding "Parameter" stores the number of times reproduction (or duplication) can be performed. For example, if the content can be reproduced only three times and the content has not been reproduced at all, information indicative that reproduction can be made three times is set to "Parameter." If reproduction has been made once, information indicative that reproduction can be made two more times is set to "Parameter." If reproduction has already been made three times, information indicative that reproduction can be made no more is set to "Parameter."

UCP B shown in FIG. 12B has two usage descriptions, "Usage Description 21" and "Usage Description 22." In "Usage Description 21," "ID 21" has a predetermined ID allocated to "Usage Description 21." "Form 21" has information ("Pay Per Play") indicative of a usage form in which reproduction can be made once. "Parameter 21" has predetermined information for "Pay Per Play." "Management Shift Permit Information 21" has status information indicative that there is no content management shift.

In "Usage Description 22," "ID 22" has a predetermined ID allocated to "Usage Description 22." "Form 22" has "Pay Per Copy." "Parameter 22" has predetermined information for "Pay Per Copy." "Management Shift Permit Information 22" has status information indicative that there is no content management shift.

Comparison between the details of UCP A and those of UCP B shows that the user having 200 or more usage points can select from four usage descriptions 11 through 14 while the user having less than 200 usage points can select only from two usage descriptions 21 and 22.

It should be noted that FIGS. 12A and 12B schematically illustrate UCP A and UCP B. Actually, "Usage Condition 10" of UCP A and "Usage Condition 20" of UCP B are constituted by value codes indicative of values and predetermined types corresponding to service codes in addition to service codes shown in FIG. 15A and condition codes shown in FIG. 15B.

FIG. 16A shows the code values of codes set as "User Condition 10" and "Device Condition 10" in "Usage Condition 10" of UCP A (refer to FIG. 12A). Because "User Condition 10" of "Usage Condition 10" of UCP A is "200 points or higher," a service code 80xxh (refer to FIG. 15A) denoting "there is a usage point condition", a value code 0000C8h indicative of value 200, and a condition code 06h (refer to FIG. 15B) denoting "≧" (equal to or higher than) are set as the user condition.

Because "Device Condition 10" of UCP A is "No condition," a service code 0000h indicative of no condition, a value code FFFFFFh having no significance at this time, and a condition code 00h indicative of no condition are set as the device condition.

FIG. 16B shows the code values of codes set as "User Condition 20" and "Device Condition 20" in "Usage Condition 20" of UCP B. Because "User Condition 20" is "less than 200 points," a service code 80xxh denoting "there is a usage point condition", a value code 0000C8h indicative of value 200, and a condition code 03h denoting "<" (less than) are set as the user condition.

Like "Device Condition 10" of UCP A, "Device Condition 20" of UCP B is "No condition," so that the same code values are set as the device condition.

Figure 17:
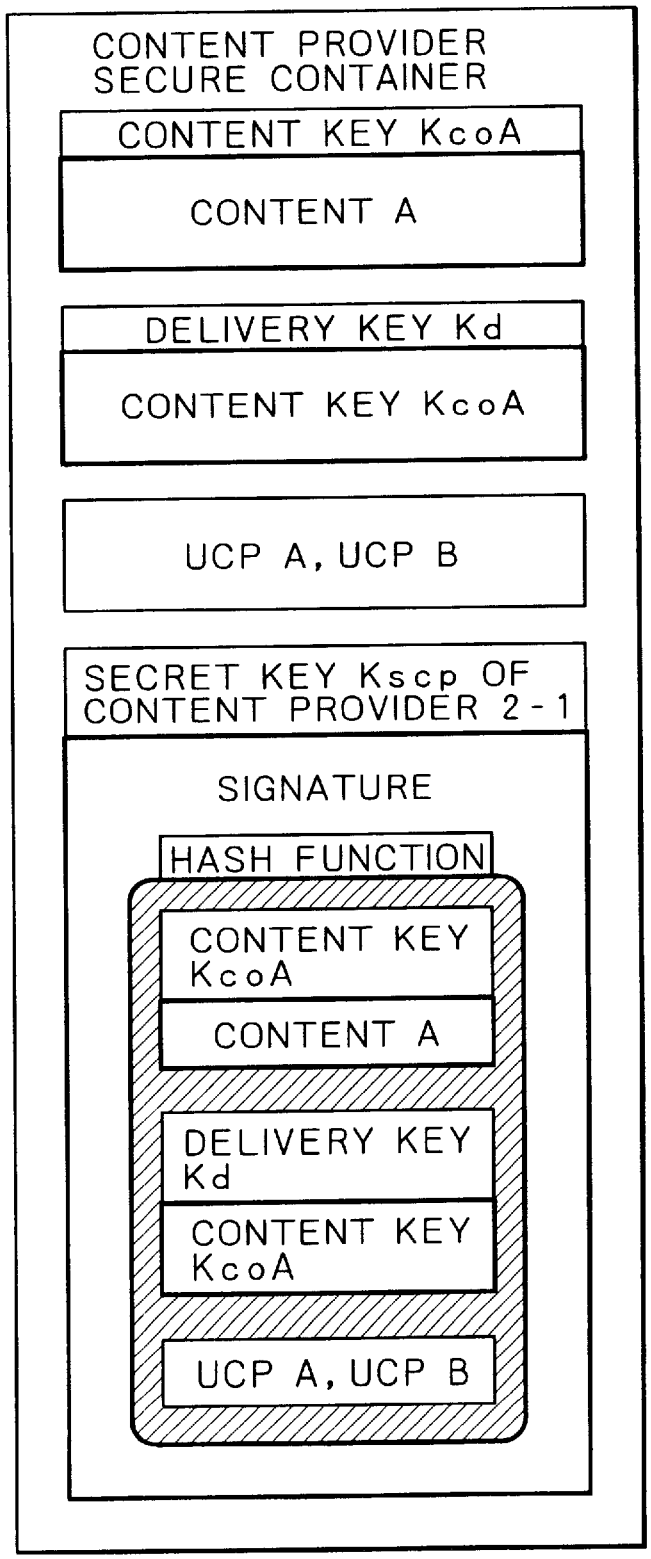
FIG. 17 illustrates an example of a content provider secure container.

Referring to FIG. 11 again, the secure container generation block 38 generates a content provider secure container consisting of content A (encrypted by a content key KcoA), the content key KcoA (encrypted by delivery key Kd), UCP A, UCP B, and a signature for example as shown in FIG. 17. The signature is obtained by encrypting a hash value obtained by applying a hash function to data plaintext to be transmitted (in this case, all of the content A, the content key KcoA, UCP A, and UCP B) by a secret key (in this case, a secret key Kscp of the content provider 2-1) of public key cryptography.

The secure container generation block 38 also attaches a certificate shown in FIG. 18 of the content provider 2-1 to the generated content provider secure container and sends them to the service provider 3. This certificate consists of the version number of the certificate, the serial number of the certificate assigned to the content provider 2-1 by a certificate authority, the algorithm and parameter used for the signature, the name of the certificate authority, the valid period of the certificate, the name of the content provider 2-1, the public key Kpcp of the content provider 2-1, and the signature (encrypted by the secret key Ksca of the certificate authority).

The signature is data for checking of tampering and creator authentication. The signature is created by obtaining a hash value by applying a hash function to the data to be transmitted and encrypting the obtained hash value by the secret key of public key cryptography.

The following describes the hash function and signature matching. The hash function is used to compress predetermined data to be transmitted into data having a predetermined bit length and outputs these data as a hash value. The hash function is characterized by that it is difficult to predict the input from a hash value (output), the change of a single bit in the data inputted in the hash function causes the change of many bits of the hash value, and it is difficult to search for input data having a same hash value.

A receiver who received a signature and data decrypts the signature by the public key of public key cryptography and gets a result (a hash value) of the decryption. Further, a hash value of the received data is computed and the computed hash value is matched against the hash value obtained by decrypting the signature. If a match is found, it indicates that the received data are not tampered and therefore they are sent from a sender who has the secret key corresponding to the public key. For the hash function, MD4, MD5, or SHA-1 is available for example.

The following describes public key cryptography. Unlike common key cryptography in which a same key (a common key) is used in encryption and decryption, public key cryptography uses different keys for encryption and decryption. In public key cryptography, one of the keys is made public while the other is kept secret. The key made public is referred to as a public key. The key kept secret is referred to as a secret key.

The following briefly describes RSA (Rivest-Shamir-Adleman), a representative public key cryptography. First, two sufficiently large prime numbers p and q are obtained. Then, product n of p and q is obtained. Lowest common multiple L of (p-1) and (q-1) is computed. Further, number e which is 3 or higher and less than L and mutually prime with L (namely, e and L can be commonly divided only by 1).

Next, multiplication inverse d of number e associated with a multiplication to modulus L is obtained. Namely, "ed=1 mod L" is established between d, e, and L, d being computed by Euclidean algorithm. At this time, n and e provide the public key and p, q and d provide the secret key.

Ciphertext C is computed from plaintext M by the processing of equation (1):

$$C = M^e \bmod n \quad (1)$$

Ciphertext C is decrypted into plaintext M by the processing of equation (2):

$$M = C^d \bmod n \quad (2)$$

Although the proof is skipped, the encryption and decryption by RSA are based on Fermat's Little Theorem, in which equation (3) is established:

$$M = C^d = (M^e)^d = M^{(ed)} = M \bmod n \quad (3)$$

If secret keys p and q are known, secret key d can be computed from public key e. But, if the number of digits of public key n is increased to a degree which makes quantitatively difficult the factorization of public key n into prime factors, knowing only public key n cannot compute secret key d from public key e, disabling the decryption. Thus, in RSA, a key for encryption can be made different from a key for decryption.

The following briefly describes elliptic curve cryptography, another example of public key cryptography. Assuming that a certain point on an elliptic curve $y^2=x^3+ax+b$ is B, the addition of the point on the elliptic curve is defined. nB represents a result of the addition of B by n times. Likewise, the subtraction is defined. It has been proven difficult to compute n from B and nB. B and nB provide the public key and n provides the secret key. Using random number r, ciphertexts C1 and C2 are computed from plaintext M by the processing of equations (4) and (5):

$$C1=M+rnB \tag{4}$$

$$C2=rB \tag{5}$$

Ciphertexts C1 and C2 are decrypted into plaintext M by the processing of equation (6):

$$M=C1-nC2 \tag{6}$$

Ciphertexts that can be decrypted are only those having secret key n. Thus, like RSA, elliptic curve cryptography can make the key for encryption different from the key for decryption.

Referring to FIG. 11 again, before receiving delivery key Kd from the EMD service center 1, the cross-authentication block 39 of the content provider 2-1 cross-authenticates the EMD service center 1. Before sending a content provider secure container to the service provider 3, the cross-authentication block 39 cross-authenticates the service provider 3.

Because the content provider 2-2 is generally the same in basic configuration as the content provider 2-1, the illustration and description of the content provider 2-2 are skipped.

Figure 19:
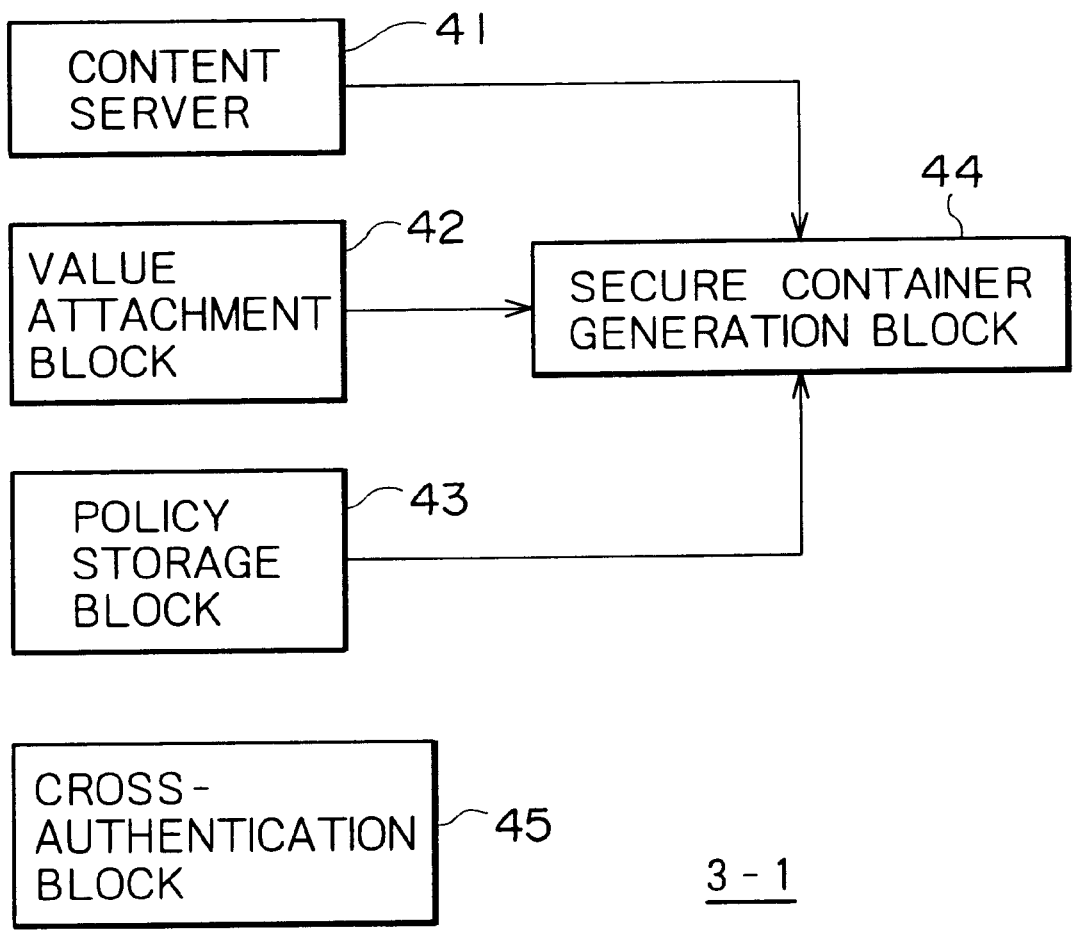
FIG. 19 is a block diagram illustrating a functional configuration of a service provider 3.

Now, referring to FIG. 19, the functional configuration of the service provider 3-1 will be described. A content server 41 stores the content (encrypted by content key Kco), content key Kco (encrypted by delivery key Kd), UCP, and signature included in a content provider secure container supplied from the content provider 2 and supplies them to a secure container generation block 44.

A value attachment block 42 verifies the correctness of the content provider secure container on the basis of the signature included therein. If the correctness is proven, the value attachment block 42 generates a PT corresponding to a UCP included in the content provider secure container and supplies the PT to the secure container generation block 44. FIG. 20A shows PT A-1 corresponding to the UCP A shown in FIG. 12A. FIG. 20B shows PT A-2 corresponding to the UCP A shown in FIG. 12A. The PT includes predetermined information corresponding to items "content ID," "content Provider ID," "UCP ID," "Valid Period of UCP," "Service Provider ID," "PT ID," "Valid Period of PT," "Price Condition," and "Price Description."

Items of information corresponding to the UCP are set to "Content ID," "Content Provider ID," "UCP ID," and "Valid Period of UCP" of the PT. To be specific, the ID of content A is set to "Content ID" of PT A-1 and PT A-2, the ID of the content provider 2-1 to "Content Provider ID," the ID of UCP A to "UCP ID," and the valid period of UCP A to "Valid Period of UCP."

"Service Provider ID" has the ID of the service provider 3 from which the PT has been supplied. "Service Provider ID" of PT A-1 and PT A-2 have the ID of the service provider 3-1. "PT ID" has a predetermined ID assigned to each PT. "PT ID" of PT A-1 has the ID of PT A-1. "PT ID" of PT A-2 has the ID of PT A-2. "Valid Period of PT" has information indicative of the valid period of the PT. "Valid Period of PT" of PT A-1 has the valid period of PT A-1. "Valid Period of PT" of PT A-2 has the valid period of PT A-2.

Like "Usage Condition" of UCP, "Price Condition" has predetermined information corresponding to the items of "User Condition" and "Device Condition." "User Condition" of "Price Condition" has information indicative of a user condition permitting the selection of this PT. "Device Condition" has information indicative of a device condition permitting the selection of this PT.

In the case of PT A-1, "Price Condition 10" is set. "User Condition 10" of "Price Condition 10" has information indicative that the user is male ("Male"). "Device Condition 10" has "No condition." That is, only a male user can select PT A-1.

Actually, "User Condition 10" and "Device Condition 10" of "Price Condition 10" of PT A-1 have code values shown in FIG. 21A. "User Condition 10" of "Price Condition 10" has service code 01xxh (refer to FIG. 15A) indicative of "Gender Condition Present," value code 00000h indicative of male, and condition code 01h (refer to FIG. 15B) indicative of "=" (equal). "Device Condition 10" has service code 0000h indicative of "No Condition," a value code FFFFFFh indicative of no significance in this case, and condition code 00h indicative of "No Condition."

In the case of PT A-2, "Price Condition 20" is set. "User Condition 20" of "Price Condition 20" has information indicative that the user is female ("Female") "Device Condition 20" has "No Condition." Namely, only a female user can select PT A-2.

Actually, "User Condition 20" and "Device Condition 20" of "Price Condition 20" of PT A-2 have code values shown in FIG. 21B. "User Condition 20" of "Price Condition 20" has service code 01xxh (refer to FIG. 15A) indicative of "Gender Condition Present," value code 000001h indicative of female, and condition code 01h (refer to FIG. 15B) indicative of "=" (equal). "Device Condition 20" has service code 0000h indicative of "No Condition," a value code FFFFFFh indicative of no significance in this case, and condition code 00h indicative of "No Condition."

Referring to FIG. 20 again, "Price Description" of the PT shows a usage price for usage of the content in a usage form set to "Form" of "Usage Description" of UCP. Namely, "2000 yen" set to "Price Description 11" of PT A-1 and "1000 yen" set to "Price Description 21" of PT A-2 indicate content purchase prices (fees) because "Form 11" of "Usage Description 11" of UCP A shown in FIG. 12A is "Reproduction by Purchase."

Referring to FIG. 20, "600 yen" of "Price Description 12" of PT A-1 and "300 yen" of "Price Description 22" of PT A-2 indicate usage fees of content A in the usage form of first-generation duplication because of "Form 12" of "Usage Description 12" of UCP A. Likewise, "100 yen" of "Price Description 13" of PT A-1 and "50 yen" of "Price Description 23" of PT A-2 indicate usage fees of content A in a usage form of time-limited reproduction because of "Form 13" of "Usage Description 13" of UCP A. Next, "300 yen" of "Price Description 14" of PT A-1 and "150 yen" of "Price Description 24" of PT A-2 indicate usage fees of content A by duplicating it once because of "Form 14" of "Usage Description 14" of UCP A.

In the present example, comparison of the price description of PT A-1 (applied to male user) with the price description of PT A-2 (applied to female user) indicates that the price in PT A-1 is twice as high as the price in PT A-2. For example, "Price Description 11" of PT A-1 corresponding to "Usage Description 11" of UCP A is "2000 yen" and "Price Description 21" of PT A-2 corresponding to "Usage Description 11" of UCP A is "1000 yen." Likewise, the prices set to "Price Description 12" through "Price Description 14" of PT A-1 are two times as high as those set to "Price Description 22" through "Price Description 24" of PT A-2. Namely, female users can use content A at prices one half of those for male users.

FIGS. 22A and 22B show PT B-1 and PT B-2 respectively generated in correspondence with UCP B shown in FIG. 12B. PT B-1 includes the ID of content A, the ID of the content provider 2-1, the ID of UCP B, the valid period of UCP B, the ID of the service provider 3-1, the ID of PT B-1, the valid period of PT B-1, price condition 30, and two price descriptions 31 and 32.

"User Condition 30" of "Price Description 30" of PT B-1 has "No Condition." "Device Condition 30" has information ("Subordinate Device") indicative that this device is a subordinate device. Namely, PT B-1 can be selected only when content A is used on a subordinate device.

Actually, "User Condition 30" and "Device Condition 30" of "Price Condition 30" of PT B-1 have code values shown in FIG. 23A. "User Condition 30" of "Price Condition 30" has service code 0000h (refer to FIG. 15A) indicative of "No Condition," value code FFFFFFh indicative of no significance, and condition code 00h (refer to FIG. 15B) indicative of "No Condition." "Device Condition 30" has service code 00xxh indicative of "Device Condition Present," a value code 000064h indicative of "value 100" in this case, and condition code 03h (refer to FIG. 15B) indicative of "<" (less than). In this example, these code values are set because each subordinate device is assigned with a number less than 100.

Because "Form 21" of "Usage Description 21" of UCP B (refer to FIG. 12B) is "Pay Per Play," "100 yen" of "Price Description 31" of PT B-1 indicates the fee for reproducing the content one time. Because "Form 22" of "Usage Description 22" of UCP B is "Pay Per Copy," "300 yen" of "Price Description 32" indicates a fee for duplicating the content one time.

FIG. 22B shows PT B-2 generated in correspondence with UCP B shown in FIG. 12B. PT B-2 includes the ID of content A, the ID of the content provider 2-1, the ID of UCP B, the valid period of UCP B, the ID of the service provider 3-1, the ID of PT B-2, the valid period of PT B-2, price condition 40, and two price descriptions 41 and 42.

"User Condition 40" of "Price Condition 40" of PT B-2 has "No Condition." "Device Condition 40" has information ("Main Device") indicative that this device is a main device. Namely, PT B-2 is selectable only when the content is used in the main device.

Actually, "User Condition 40" and "Device Condition 40" of "Price Condition 40" of PT B-2 have code values shown in FIG. 23B. "User Condition 40" of "Price Condition 40" has service code 0000h (refer to FIG. 15A) indicative of "No Condition," value code FFFFFFh indicative of no significance, and condition code 00h (refer to FIG. 15B) indicative of "No Condition." "Device Condition 40" has service code 00xxh indicative of "Device Condition Present," a value code 000064h indicative of "value 100" in this case, and condition code 06h (refer to FIG. 15B) indicative of "≧" (equal to or more than).

Prices shown in "Price Description 41" and "Price Description 42" of PT B-2 indicate fees for using the content in the forms shown in "Form 21" of "Usage Description 21" and "Form 22" of "Usage Description 22" of UCP B respectively.

Comparison of the price description of PT B-1 (applied to subordinate device) with the price description of PT B-2 (applied to main device) indicates that the price description of PT B-1 is set twice as high as the price description of PT B-2. For example, "Price Description 31" of PT B-1 is "100 yen" while "Price Description 41" of PT B-2 is "50 yen." "Price Description 32" is "300 yen" while "Price Description 42" is "150 yen."

Referring to FIG. 19 again, a policy storage block 43 stores the UCP of the content supplied from the content provider 2 and supplies the received UCP to the secure container generation block 44.

Figure 24:
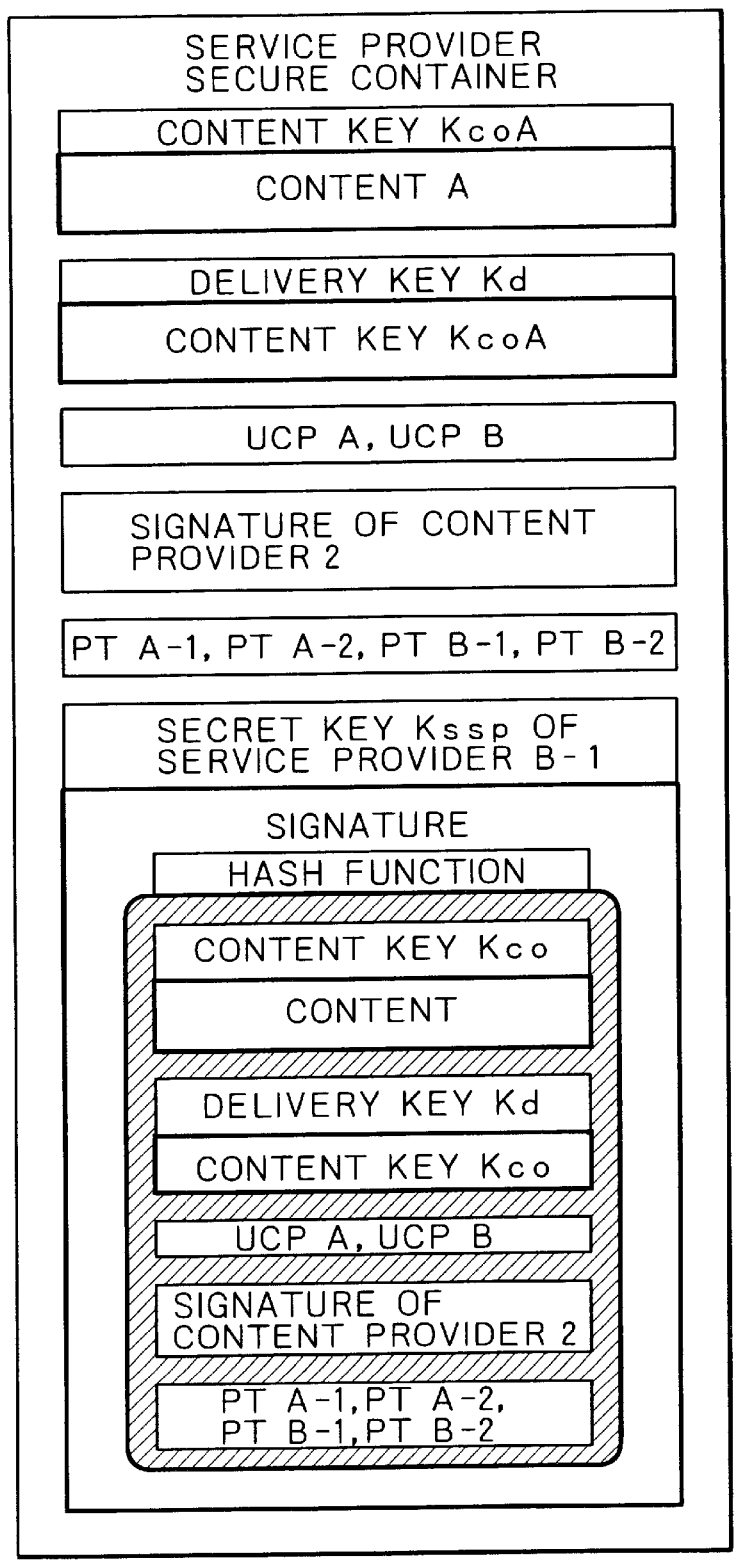
FIG. 24 illustrates an example of a service provider secure container.

The secure container generation block 44 generates a service provider secure container composed of content A (encrypted by content key KcoA), content key KcoA (encrypted by delivery key Kd), UCP A, UCP B, signature of content provider 2, PT A-1, PT A-2, PT B-1, PT B-2, and signature of the service provider 3 for example as shown in FIG. 24.

Figure 25:
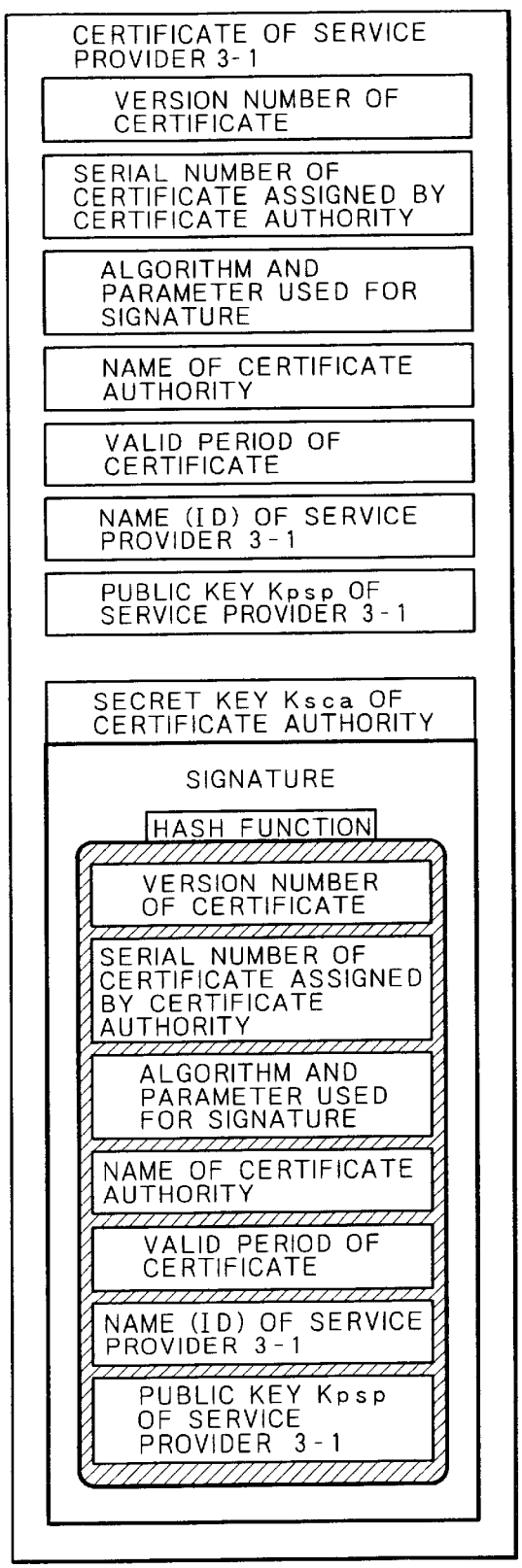
FIG. 25 illustrates an example of a certificate of the service provider 3.

The secure container generation block 44 attaches to the generated service provider secure container a service provider certificate composed of certificate version number, certificate serial number assigned by certificate authority to service provider 3-1, algorithm and parameter used for the signature, name of certificate authority, the valid period of certificate, name of service provider 3-1, public key Kpsp of service provider 3-1, and signature as shown in FIG. 25 and sends the resultant secure container to the user home network 5.

A cross-authentication block 45 cross-authenticates the content provider 2 before receiving the content provider secure container from the content provider 2. Before sending the service provider secure container to the user home network 5, the cross-authentication block 45 cross-authenticates the user home network 5. If the network 4 is based on satellite communication for example, the cross-authentication between the service provider 3 and the user home network 5 is not executed.

Because the service provider 3-2 is generally the same in basic configuration as the service provider 3-1, the illustration and description of the service provider 3-2 are skipped.

Figure 26:
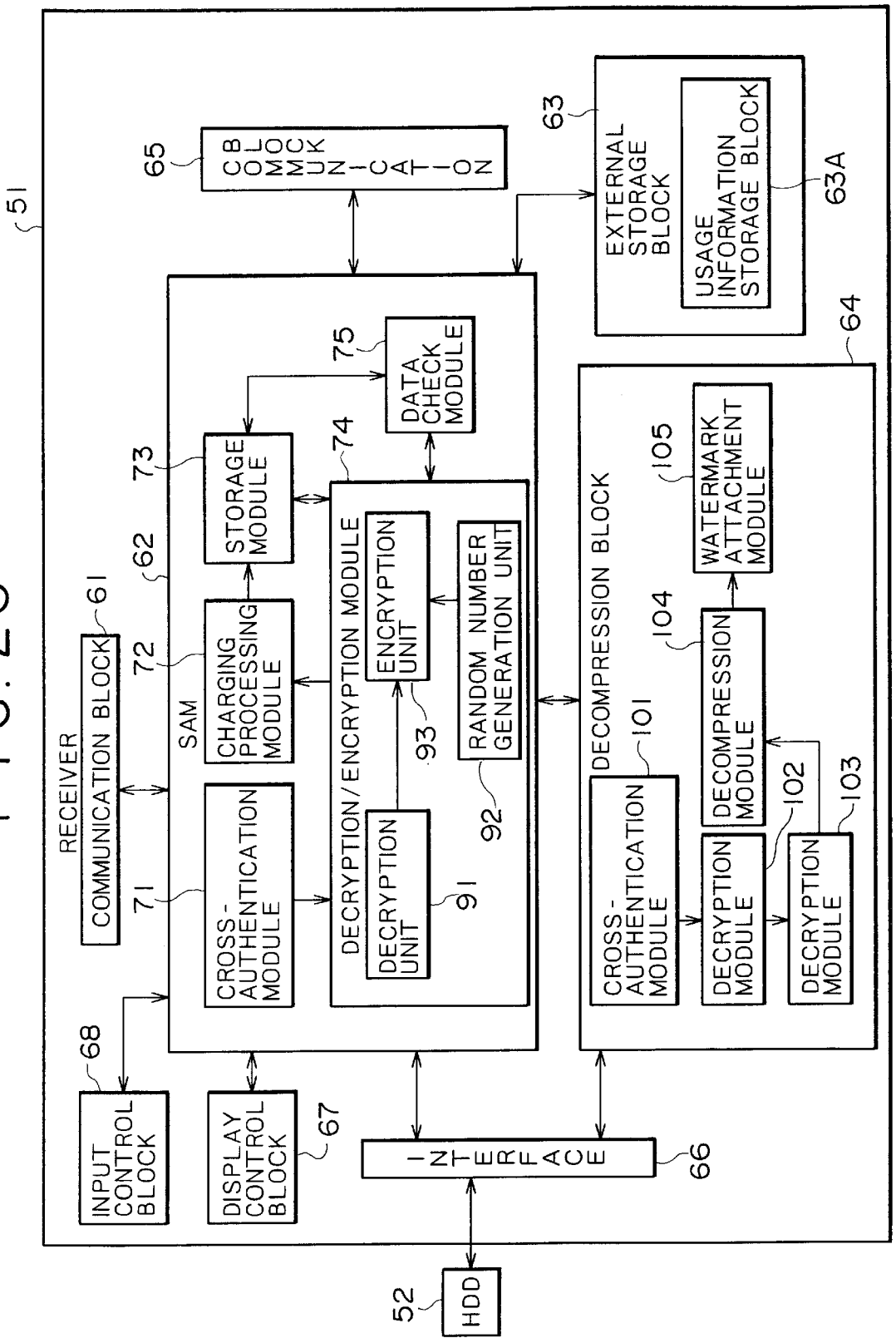
FIG. 26 is a block diagram illustrating a functional configuration of a receiver 51 of a user home network 5.

The following describes an exemplary configuration of the receiver 51 constituting the user home network 5 with reference to FIG. 26. The receiver 51 comprises a communication block 61, the SAM 62, an external storage block 63, a decompression block 64, a communication block 65, an interface 66, a display control block 67, and an input control block 68. The communication block 61 communicates with the service provider 3 through the network 4 or with the EMD service center 1 for sending and receiving predetermined information.

The SAM 62 comprises a cross-authentication module 71, a charging processing module 72, a storage module 73, a decryption/encryption module 74, and data check module 75. The SAM 62 is made up of a single-chip IC (Integrated Circuit) dedicated to cryptographic processing. This IC has a multilayer structure in which the internal memory cells are sandwiched between dummy layers such as aluminum layers and the width of the operating voltage or frequency is held narrow, thereby providing properties (tampering proof) that make difficult unauthorized access from outside.

Figure 27:
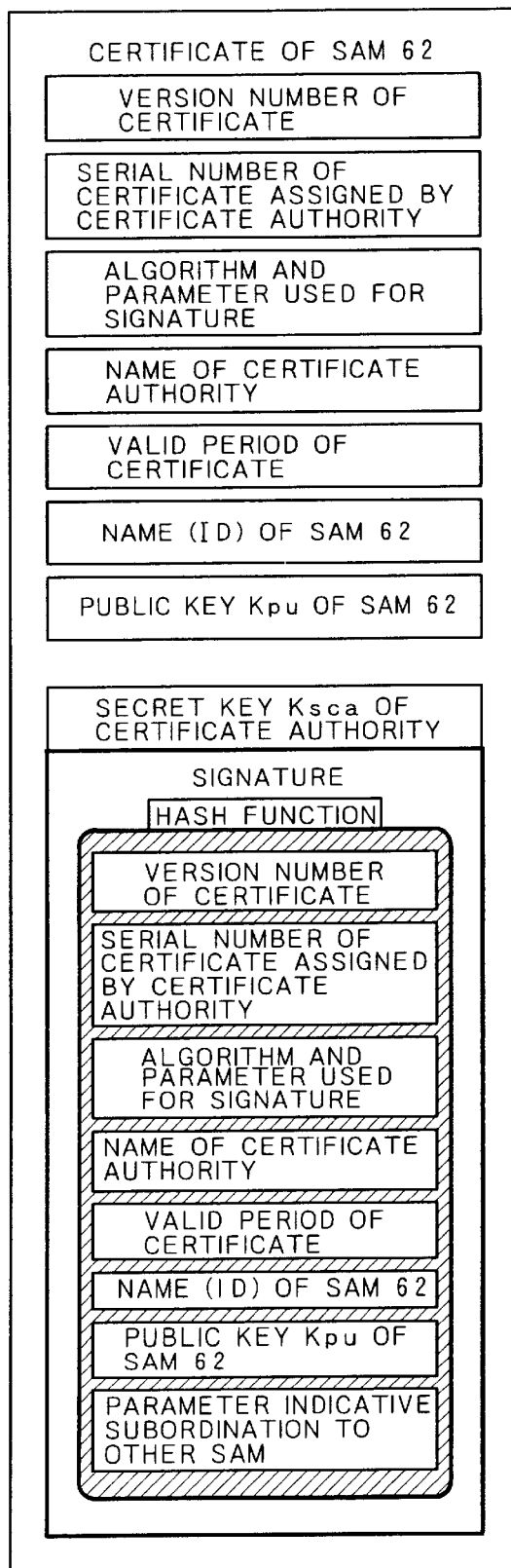
FIG. 27 illustrates an example of a certificate of a SAM (Secure Application Module) 62 of the receiver 51.

The cross-authentication module 71 of the SAM 62 sends the certificate of the SAM 62 shown in FIG. 27 stored in the storage module 73 to the other party of cross-authentication, executes cross-authentication with it, and supplies a temporary key Ktemp (session key) shared by the other party to the decryption/encryption module 74. The certificate of the SAM 62 contains information indicative of main device or subordinate device in addition to the information corresponding to the information included in the certificate (refer to FIG. 18) of the content provider 2-1 and the certificate (refer to FIG. 25) of the service provider 3-1. Because the receiver 51 is the main device, the information thereof is included in the certificate shown in FIG. 27 of the SAM 62.

The charging processing module 72 generates UCS and information on charges on the basis of the usage description of the selected UCP. FIG. 28 shows UCS A =generated on the basis of the usage description 11 of UCP A shown in FIG. 12A and the price description 11 of PT A-1 shown in FIG. 20A. As shown in FIG. 28, UCS has predetermined information corresponding to items "Content ID," "Content Provider ID," "UCP ID," "Valid Period of UCP," "Service Provider ID," "PT ID," "Valid Period of PT," "UCS ID," "SAM ID," "User ID," "Usage Description," and "Usage History."

"Content ID," "Service Provider ID," "UCP ID," "Valid period of UCP," "Service Provider ID," "PT ID," and "Valid Period of PT" of UCS have respective items of information of PT. Namely, "Content ID" of UCS A shown in FIG. 28 has the ID of content A, "Content Provider ID" has the ID of the content provider 2-1, "UCP ID" has the ID of the UCP A, "Valid Period of UCP" has the valid period of UCP A, "Service Provider ID" has the ID of the service provider 3-1, "PT ID" has the ID of PT A-1, and "Valid Period of PT" has the valid period of PT A-1.

"UCS ID" has a predetermined ID assigned to UCS and "UCS ID" of UCS A has the ID of UCS A. "SAM ID" has the ID of the SAM of the device, "SAM ID" of UCS A has the ID of the SAM 62 of the receiver 51. "User ID" has the ID of the user of the content and "User ID" of UCS A has the ID of User F.

"Usage Description" has items "ID," "Form," "Parameter," and "Management Shift Permit Information." To these items, information of corresponding items of "Usage Description" of the selected UCP are set. Namely, "ID" of UCS A has information (the ID of usage description 11) set to "ID 11" of "Usage Description 11" of UCP A, "Form" has "reproduction by purchase" set to "Form 11" of "Usage Description 11", "Parameter" has information (corresponding to "reproduction by purchase)" set to "Parameter 11" of "Usage Description 11," and "Management Shift Permit Information" has information (indicative that there is no content management shift) set to "Management Shift Permit Information 11" of "Usage Description 11."

"Usage History" includes the history of usage form for same content. "Usage History" of UCS A stores only information indicative of "reproduction by purchase." If content A has been used before in the receiver 51 for example, the information thereof is also stored in the "Usage History."

Figure 29:
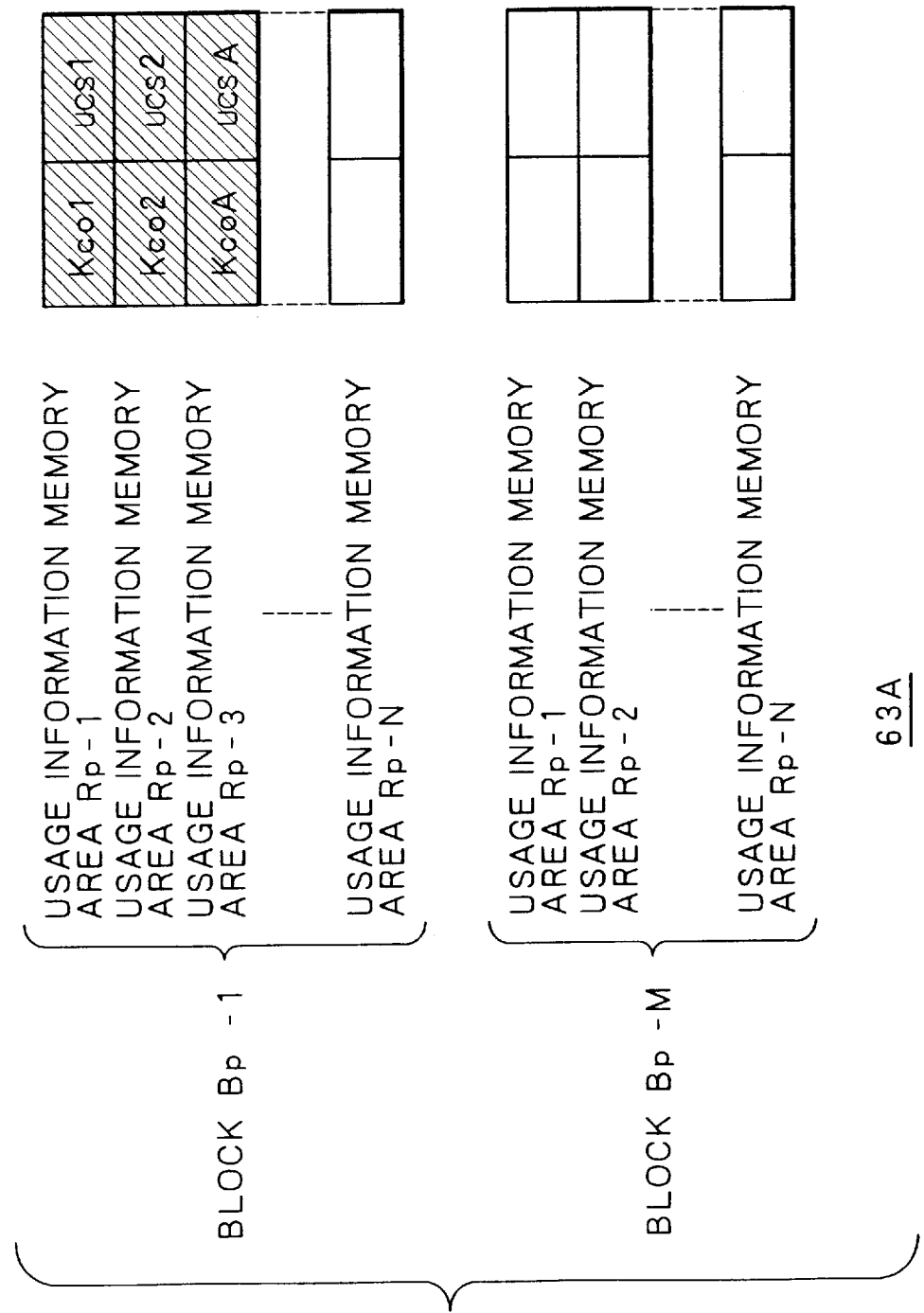
FIG. 29 illustrates the inside of a usage information storage block 63A of an external storage block 63 of the receiver 51.

The generated UCS is sent to the external storage block 63 along with content key Kco (encrypted by save key Ksave) supplied from a decryption unit 91 of the decryption/encryption module 74 of the receiver 51. The UCS and the content key are stored in a usage information storage block 63A. The usage information storage block 63A are divided into M blocks Bp-1 through Bp-M (for example, in units of one megabytes) as shown in FIG. 29. Each block Bp is further divided into N usage information memory areas Rp-1 through Rp-N. The content key Kco (encrypted by save key Ksave) and UCS supplied from the SAM 62 are stored in a pair into the usage information memory area Rp of predetermined block Bp of the usage information storage block 63A.

In the example of FIG. 29, the pair of UCS A shown in FIG. 28 and the content key KcoA (encrypted by save key Ksave) for decrypting content A is stored in usage information memory area Rp-3 of block Bp-1. Usage information memory areas Rp-1 and Rp-2 of block Bp-1 store content keys Kco1 and Kco2 (each encrypted by save key Ksave) and UCS 1 and UCS 2 respectively. Usage information memory areas Rp-4 through Rp-N of block Bp-1 and blocks Bp-2 through Bp-M store neither content key Kco nor UCS but store predetermined initial information indicative that they are free. It should be noted that, if the content key Kco (encrypted by save key Ksave) and UCS stored in the usage information memory area Rp need not be distinguished from each other, they are generically referred to as usage information.

FIG. 30 shows information on charges A generated at the same time as UCS A shown in FIG. 28. The information on charges includes "Content ID," "Content Provider ID," "UCP ID," "Valid Period of UCP," "Service Provider ID," "PT ID," "Valid Period of PT," "UCS ID," "SAM ID," "User ID," "Usage Description," and "Charging History."

"Content ID," "Content Provider ID," "UCP ID," "Valid Period of UCP," "Service Provider ID," "PT ID," "Valid Period of PT," "UCS ID," "SAM ID," "User ID," and "Usage Description" of the information on charges have corresponding items of information of UCS. Namely, "Content ID" of information on charges A shown in FIG. 30 has the ID of content A, "Content Provider ID" has the ID of the content provider 2-1, "UCP ID" has the ID of UCP A, "Valid Period of UCP" has the valid period of UCP A, "Service Provider ID" has the ID of the service provider 3-1, "PT ID" has the ID of PT A-1, "Valid Period of PT" has the valid period of PT A-1, "UCS ID" has the ID of UCS A, "SAM ID" has the ID of SAM 62, "User ID" has the ID of user F, and "Usage Description" has the usage description of UCS A.

"Charging History" of information on charges A has information indicative of a total amount of charges added up in the device, namely the receiver 51.

Referring to FIG. 26 again, the storage module 73 stores public key Kpu of the SAM 62, secret key Ksu of SAM 62, public key Kpesc of the EMD service center 1, public key Kpca of certificate authority, save key Ksave, delivery keys Kd for three months, the certificate of SAM 62 (refer to FIG. 27), information on charges (for example, information on charges A shown in FIG. 30), reference information 51 and M check values Hp-1 through Hp-M.

FIG. 32 shows the reference information 51 stored in the storage module 73. The reference information 51 includes predetermined information items "SAM ID," "Device Number," "Settlement ID," "Upper Limit Amount of Charging," "Settlement User Information," "Subordinate User Information," and "Usage Point Information."

"SAM ID," "Device Number," "Settlement ID," "Settlement User Information," "Subordinate User Information," and "Usage Point Information" of the reference information have corresponding items of information of the system registration information (refer to FIG. 9) managed by the user management block 18 of the EMD service center 1. Namely, the reference information 51 has the ID of the SAM 62, the device number (100) of SAM 62, the settlement ID of user F, settlement user information (general information of user F such as name, address, telephone number, settlement organization information, birthday, age, and gender) of user F, the ID of user F, the password of user F, and the usage point information (the same as shown in FIG. 10) shown in FIG. 33.

"Upper Limit Amount of Charging" has the upper limit amount of charging which is different when the device is officially or provisionally registered in the EMD system. In the present example, the receiver 51 is officially registered, so that the "Upper Limit Amount of Charging" of the reference information 51 has information ("Upper Limit Amount for Official Registration") indicative of the upper limit amount of the charges for official registration. It should be noted that the upper limit amount of charging for official registration is greater than that for provisional registration.

Figure 31:
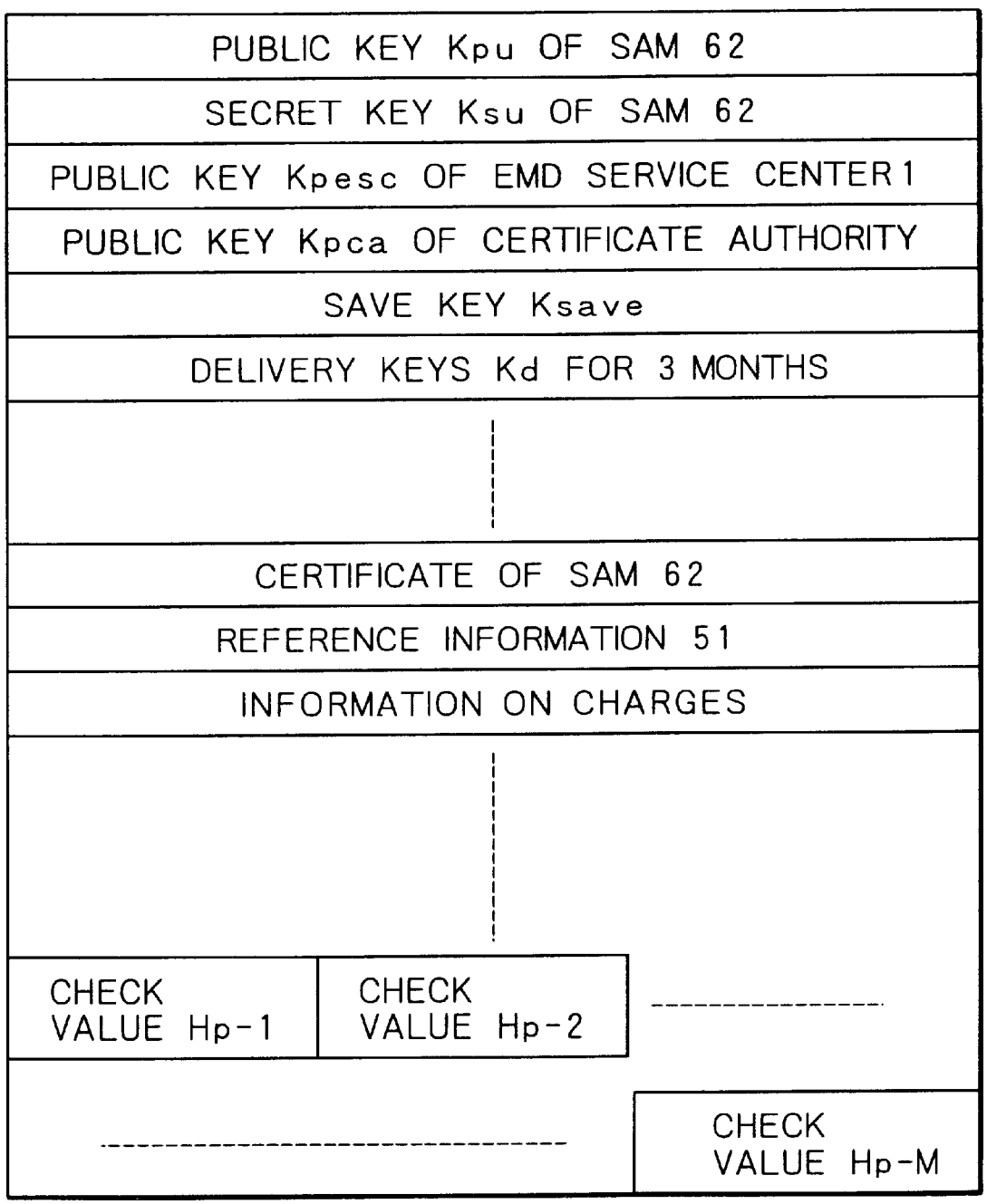
FIG. 31 illustrates information stored in a storage module 73 of the receiver 51.

The following describes the M check values Hp-1 through Hp-M shown in FIG. 31 stored in the storage module 73. Check value Hp-1 is a hash value obtained by applying hash function to the entire data stored in the block Bp-1 of the usage information storage block 63A of the external storage block 63. Like check value Hp-1, check values Hp-2 through Hp-M are hash values obtained by applying hash function to the data stored in blocks Bp-2 through Bp-M.

Referring to FIG. 26 again, the decryption/encryption module 74 of the SAM 62 comprises a decryption unit 91, a random number generation unit 92, and an encryption unit 93. The decryption unit 91 decrypts the encrypted content key Kco by delivery key Kd and outputs the decrypted key to the encryption unit 93. The random number generation unit 92 generates a random number having the predetermined number of digits at the time of cross-authentication to generate temporary key Ktemp as required and sends this key to the encryption unit 93.

The encryption unit 93 encrypts the decrypted content key Kco again by the save key Ksave stored in the storage module 73. The encrypted content key Kco is supplied to the external storage block 63. When sending the content key Kco to the decompression block 64, the encryption unit 93 encrypts the content key Kco by the temporary key Ktemp generated by the random number generation unit 92.

The data check module 75 compares check value Hp stored in the storage module 73 with the hash value of the data in the corresponding block Bp in the usage information storage block 63A of the external storage block 63 to see if the data in the block Bp are tampered. Also the data check module 75 computes check value Hp again when content management shift is made, storing the computed check value into the storage module 73. The decompression block 64 comprises a cross-authentication module 101, a decryption module 102, a decryption module 103, a decompression module 104, and a watermark attachment module 105. The cross-authentication module 101 cross-authenticates the SAM 62 and outputs the temporary key Ktemp to the decryption module 102. The decryption module 102 decrypts by use of the temporary key Ktemp the content key Kco encrypted by the temporary key Ktemp and outputs the decrypted content key to the decryption module 103. The decryption module 103 decrypts the content stored in the HDD 52 by the content key Kco and outputs the decrypted content to the decompression module 104. The decompression module 104 decompresses the decrypted content by a scheme such as ATRAC2 and outputs the decompressed content to the watermark attachment module 105. The watermark attachment module 105 attaches a predetermined watermark (electronic watermark) for identifying the receiver 51 to the content and outputs the watermarked content to a loudspeaker, not shown, reproducing music for example.

The communication block 65 communicates with the receiver 201 of the user home network 5. The interface 66 changes signals supplied from the SAM 62 and the decompression block 64 into a predetermined format and outputs the resultant signals to the HDD 52 and signals from the HDD 52 into a predetermined format and outputs the resultant signals to the SAM 62 and the decompression block 64.

The display control block 67 controls the output to a display block, not shown. The input control block 68 controls the input from an operator block, not shown, composed of various operation controls.

Figure 34:
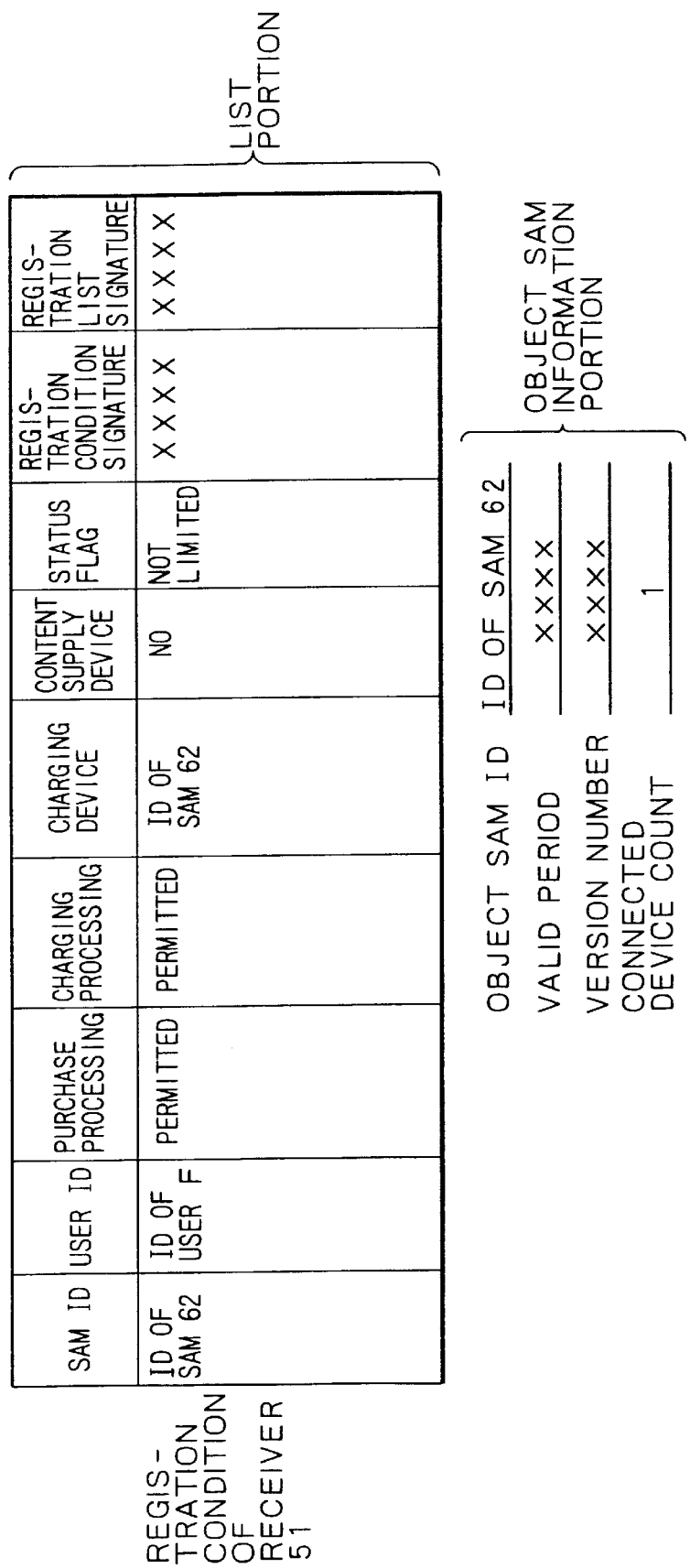
FIG. 34 illustrates an example of a registration list.

The HDD 52 stores a registration list as shown in FIG. 34 in addition to the content, UCP, and PT supplied from the service provider 3. The registration list consists of a list portion in which information is stored in table form and an object SAM information portion in which predetermined information about the device holding this list is stored.

The object SAM information portion stores, in "Object SAM ID," the SAM ID of the device holding this registration list, namely the ID of the SAM 62 of the receiver 51 in this example. The object SAM information portion also stores, in "Valid Period," the valid period of this registration list and, in "Version Number," the version number of this registration list. This portion further stores, in "Connected Device Count," the number of connected devices (including the receiver 51 itself), namely value 1 because no other devices are connected.

The list portion consists of 9 items "SAM ID," "User ID," "Purchase Processing," "Charging Processing," "Charging Device," "Content Supply Device," "Status Flag," "Registration Condition Signature," and "Registration List Signature." In the present example, predetermined information is stored in these items as the registration condition of the receiver 51.

"SAM ID" stores the ID of the SAM of the device. In this example, the ID of the SAM 62 of the receiver 51 is stored. "User ID" stores the ID of the user of the device. In this example, the ID of user F is stored.

"Purchase Processing" stores information ("Permitted" or "Not Permitted") indicative whether the corresponding device can execute processing for purchase content (to be specific, purchase usage license condition and content key Kco). In this example, the receiver 51 can execute this processing, so that "Permitted" is stored.

"Charging Processing" stores information ("Permitted" or "Not Permitted") indicative whether the corresponding device can execute processing for settlement with the EMD service center 1. In this example, since user F is registered as a settlement user, the receiver 51 can execute this processing. Therefore, "Permitted" is set to "Charging Processing."

"Charging Device" stores the ID of the SAM of the device that executes the processing the charges added up in the corresponding device. In this example, since the receiver 51 (the SAM 62) can settle the charges of its own, the ID of the SAM 62 is stored.

"Content Supply Device" stores, if the corresponding device is supplied content not from the service provider 3 but from another connected device, the ID of the SAM of that connected device. In this example, since the receiver 51 receives content from the service provider 3, information ("No") indicative that there is no content supplying device.

"Status Flag" stores an operation limiting condition of the corresponding device. If there is no limitation, information ("Not Limited") indicative thereof is stored. If a certain limitation is imposed, information ("Limited") indicative thereof is stored. If the operation of the corresponding device is stopped, information ("Stop") is stored. If settlement has been unsuccessful or the credit granting processing for official registration has not been completed (namely, only provisional registration has been made), "Limited" is set to "Status Flag" of that device. In this example, in the device with "Limited" set to "Status Flag," the processing for using already purchased content is executed but the processing for purchasing new content is not executed. Namely, a certain limitation is imposed on that device. If unauthorized duplication of content for example is detected, "Stop" is set to "Status Flag," stopping the operation of that device. Thus, that device cannot receive any service from the EMD system.

In the present example, it is assumed that no limitation is imposed on the receiver 51, so that "No" is set to "Status Flag."

"Registration Condition Signature" stores the signature by the EMD service center 1 for the information stored as registration conditions into "SAM ID," "User ID," "Purchase Processing," "Charging Processing," "Charging Device," "Content Supply Device," and "Status Flag." In the present example, the signature for the registration condition of the receiver 51 is stored. To "Registration List Signature," the signature for the entire data set to the registration list is set.

Figure 35:
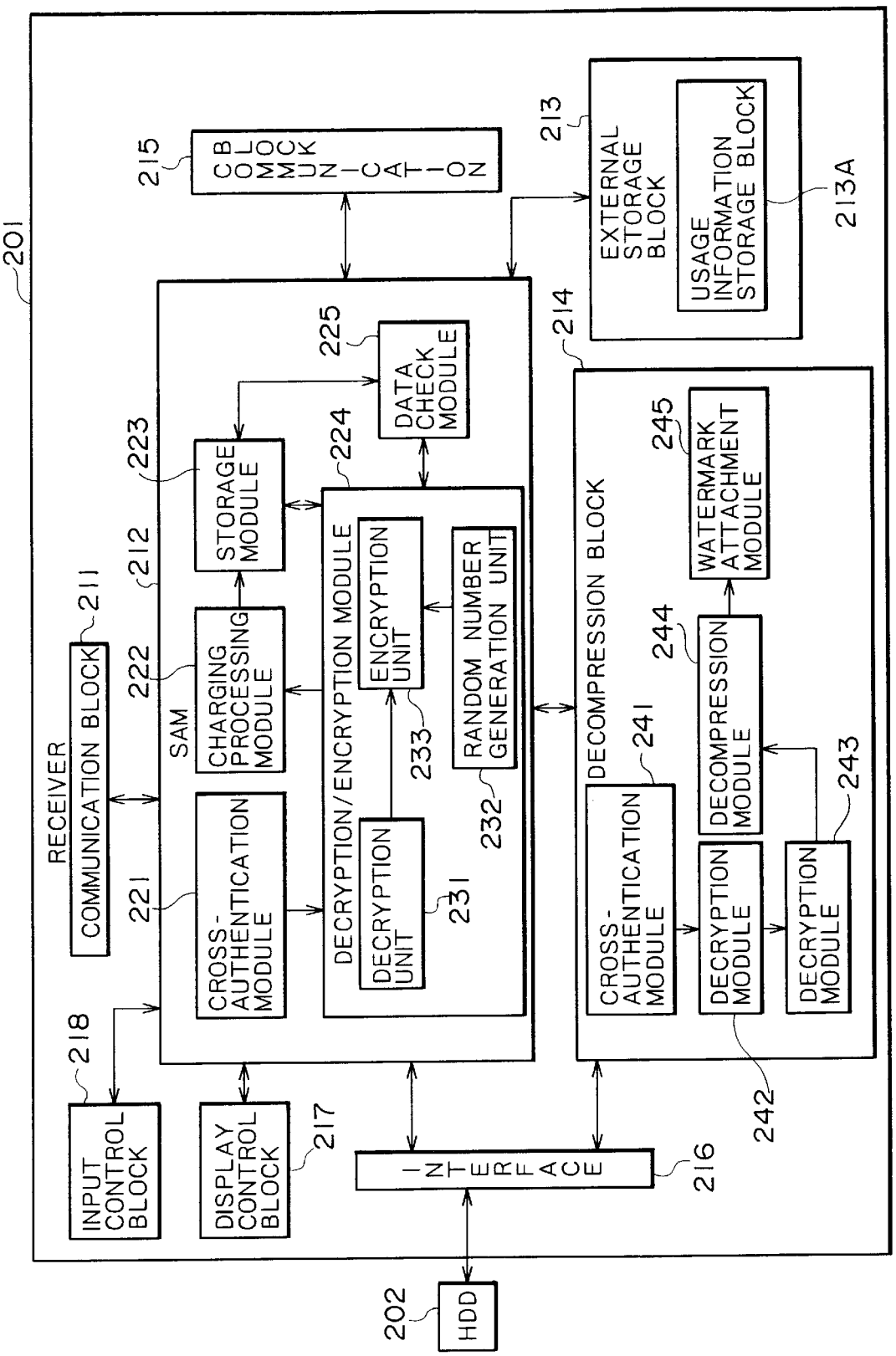
FIG. 35 is a block diagram illustrating a functional configuration of a receiver 201 of the user home network 5.

FIG. 35 shows an exemplary configuration of the receiver 201. A communication block 211 through an input control block 218 of the receiver 201 are generally the same in function as those of the communication block 61 through the input control block 68 of the receiver 51 and therefore will be skipped from the description below.

Figure 36:
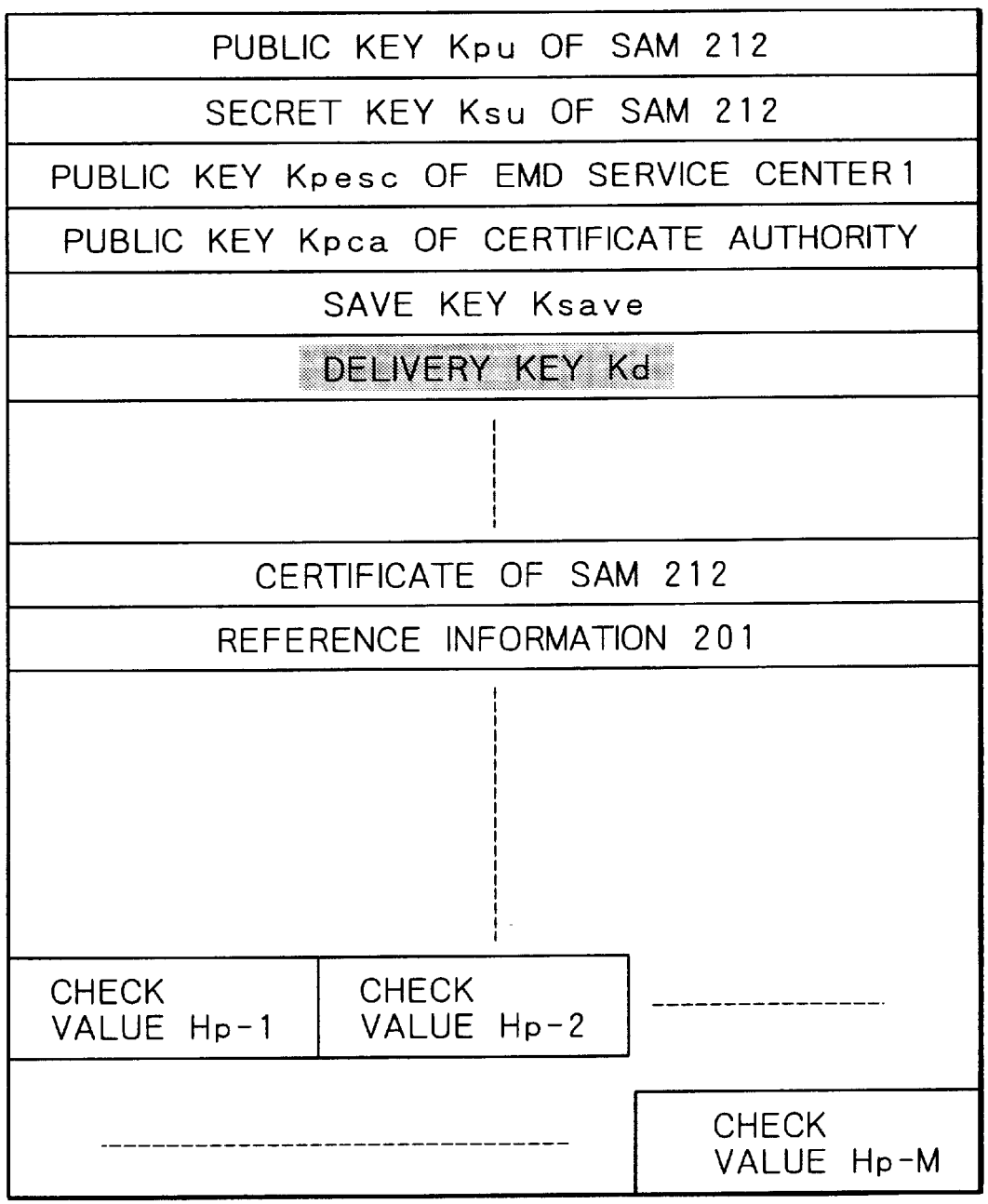
FIG. 36 illustrates an example of information stored in a storage module 223 of the receiver 201.

A storage module 223 of the SAM 212 stores at this point of time public key Kpu of the SAM 212, secret key Ksu of SAM 212, public key Kpesc of the EMD service center 1, public key Kpca of certificate authority, save key Ksave, a certificate of the SAM 212 previously distributed by certificate authority shown in FIG. 36 and reference information 201 to which the ID of the SAM 212 and the device number (100) of the receiver 201 are set shown in FIG. 37. It should be noted that the delivery key Kd shown in halftone in FIG. 36 is not stored at this point of time.

A HDD 202 is generally the same in function as the HDD 52 and therefore skipped from the description below.

The following describes the processing of the EMD system with reference to the flowchart shown in FIG. 38 by use of an example in which content A held in the content server 2-1 is supplied to the receiver 51 of the user home network 5 through the service provider 3-1.

Figure 39:
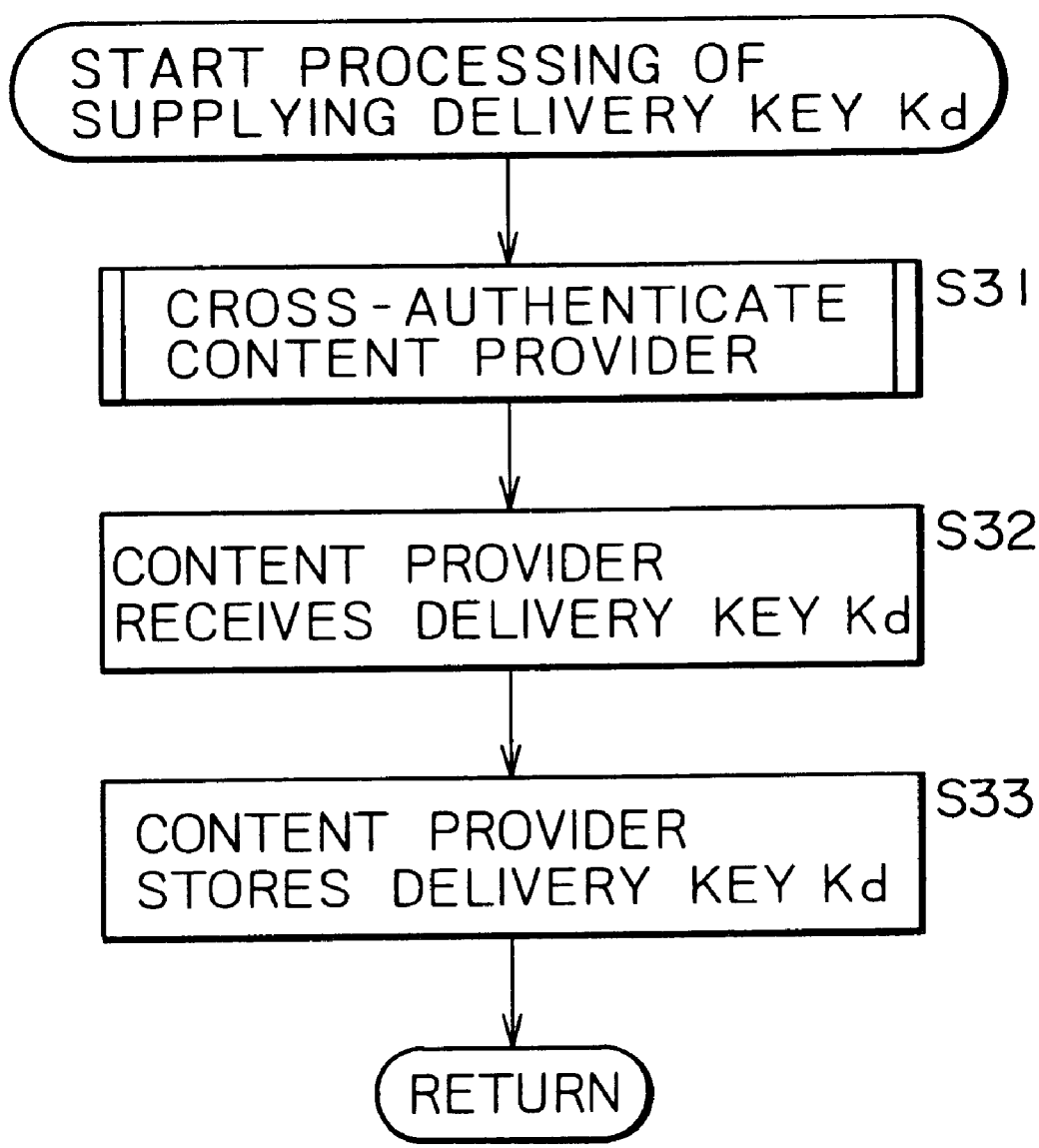
FIG. 39 is a flowchart describing processing for transmitting by the EMD service center 1 of content key Kd to the content provider 2.

Now, referring to FIG. 38, in step S11, processing is executed for supplying delivery key Kd from the EMD service center 1 to the content provider 2-1. This processing is detailed in FIG. 39. Namely, in step S31, the cross-authentication block 17 (refer to FIG. 3) of the EMD service center 1 cross-authenticates the cross-authentication block 39 (refer to FIG. 11) of the content provider 2-1. If the content provider 2-1 is found a valid provider, the content provider management block 12 of the EMD service center 1 sends the delivery key Kd supplied from the key server 14 to the content provider 2-1. Details of the cross-authentication processing will be described later with reference to FIGS. 40 through 42.

Next, in step S32, the encryption block 36 of the content provider 2-1 receives the delivery key Kd sent from the EMD service center and stores it in step S33.

Thus, when the encryption block 36 of the content provider 2-1 has stored the delivery key Kd, the delivery key supply processing comes to an end and the system proceeds to step S12 shown in FIG. 38. Before describing the processing of step S12 and so on, the cross-authentication (for checking for masquerading) in step S31 of FIG. 39 will be described by use of an example in which one common key is used (refer to FIG. 40), another example in which two common keys are used (refer to FIG. 41), and still another example in which public key cryptography is used (refer to FIG. 42).

Figure 40:
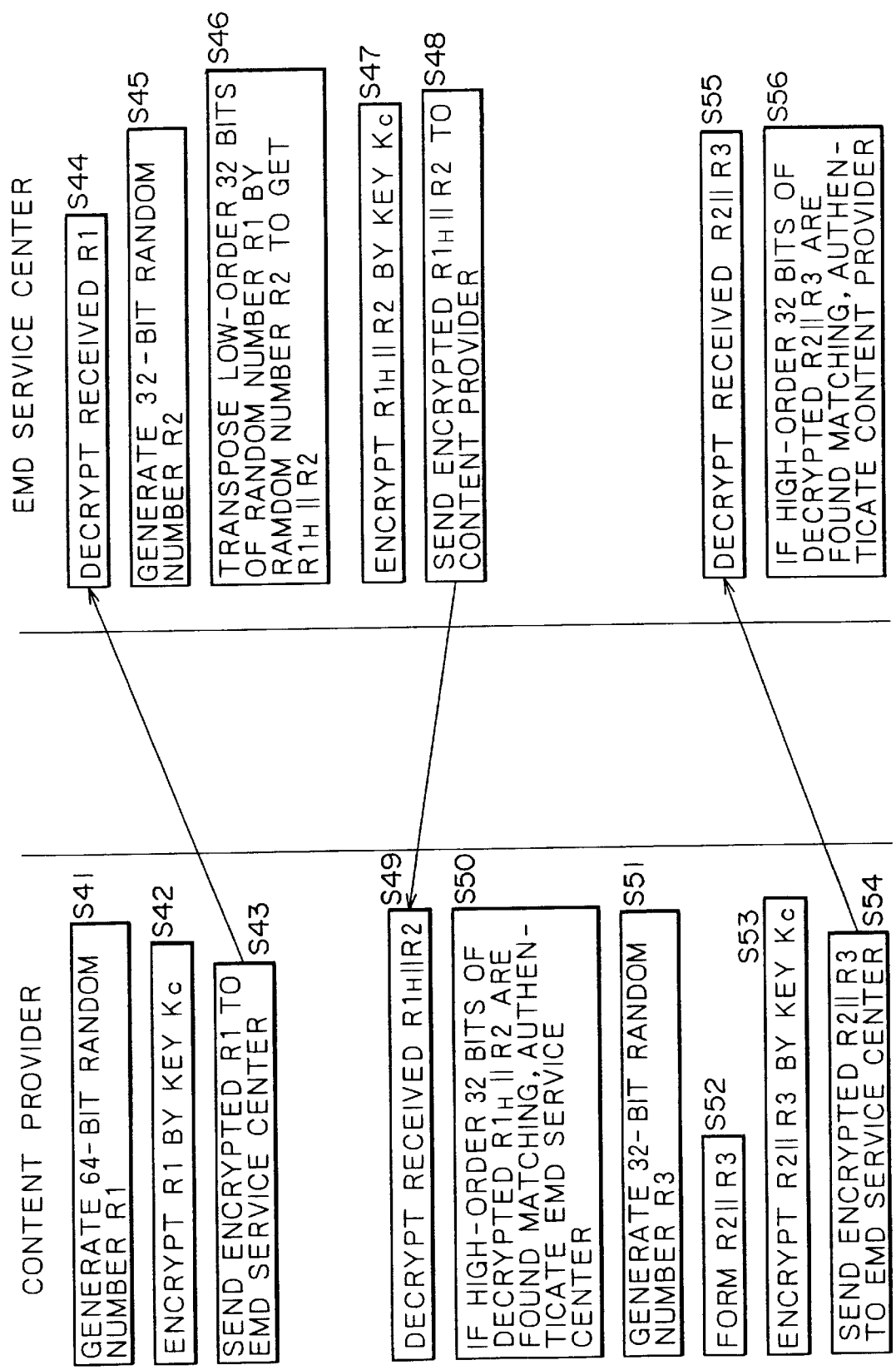
FIG. 40 is a flowchart describing a cross-authentication operation between the content provider 2 and the EMD service center 1.

FIG. 40 shows a flowchart describing cross-authentication processing between the cross-authentication block 39 of the content provider 2 and the cross-authentication block 17 of the EMD service center 1 by use of one common key and DES which is public key cryptography. In step S41, the cross-authentication block 39 of the content provider 2 generates a 64-bit random number R1 (this may be generated by the random number generation block 35). In step S42, the cross-authentication block 39 of the content provider 2 encrypts on the basis of DES the random number R1 by the common key Kc stored in advance (this encryption may be made by the encryption block 36). In step S43, the cross-authentication block 39 sends the encrypted random number R1 to the cross-authentication block 17 of the EMD service center 1.

In step S44, the cross-authentication block 17 decrypts the received random number R1 by the stored common key Kc. In step S45, the cross-authentication block 17 generates a 32-bit random number R2. In step S46, the cross-authentication block 17 transposes the low-order 32 bits of the decrypted 64-bit random number R1 with the random number R2 to generate a coherence $R1_H\|R2$. It should be noted here that $Ri_H$ denotes the high-order bits of Ri and A∥B denotes a coherence between A and B (m-bit B is linked to the end of n-bit A to provide (n+m) bits). In step S47, the cross-authentication block 17 encrypts $R1_H\|R2$ by the common key Kc on the basis of DES. In step S48, the cross-authentication block 17 sends the encrypted $R1_H\|R2$ to the content provider 2.

In step S49, the cross-authentication block 39 of the content provider 2 decrypts the received $R1_H\|R2$ by the common key Kc. In step S50, the cross-authentication block 39 checks the high-order 32 bits $R1_H$ of the decrypted $R1_H\|R2$. If the high-order 32 bits $R1_H$ are found matching the high-order 32 bits $R^1H$ Of the random number R1 generated in step S41, it indicates that the EMD service center 1 is a valid center. Otherwise, this processing is aborted. In the case of matching, then, in step S51, the cross-authentication block 39 generates a 32-bit random number R3. In step S52, the cross-authentication block 39 sets the received decrypted 32-bit random number R2 to the upper and the generated random number R3 to the lower to provide a coherence R2∥3. In step S53, on the basis of DES, the cross-authentication block 39 encrypts the coherence R2∥R3 by the common key Kc. In step S54, the cross-authentication 39 sends the encrypted coherence R2∥R3 to the cross-authentication block 17 of the EMD service center 1.

In step S55, the cross-authentication block 17 decrypts the received coherence R2∥R3 by the common key Kc. In step S56, the cross-authentication block 17 checks the high-order 32 bits of the decrypted coherence R2∥R3. If they are found matching the random number R2, the cross-authentication block 17 authenticates the content provider 2 as a valid provider; otherwise, the cross-authentication block 17 determines the content provider 2 to be an invalid provider and ends the processing.

Figure 41:
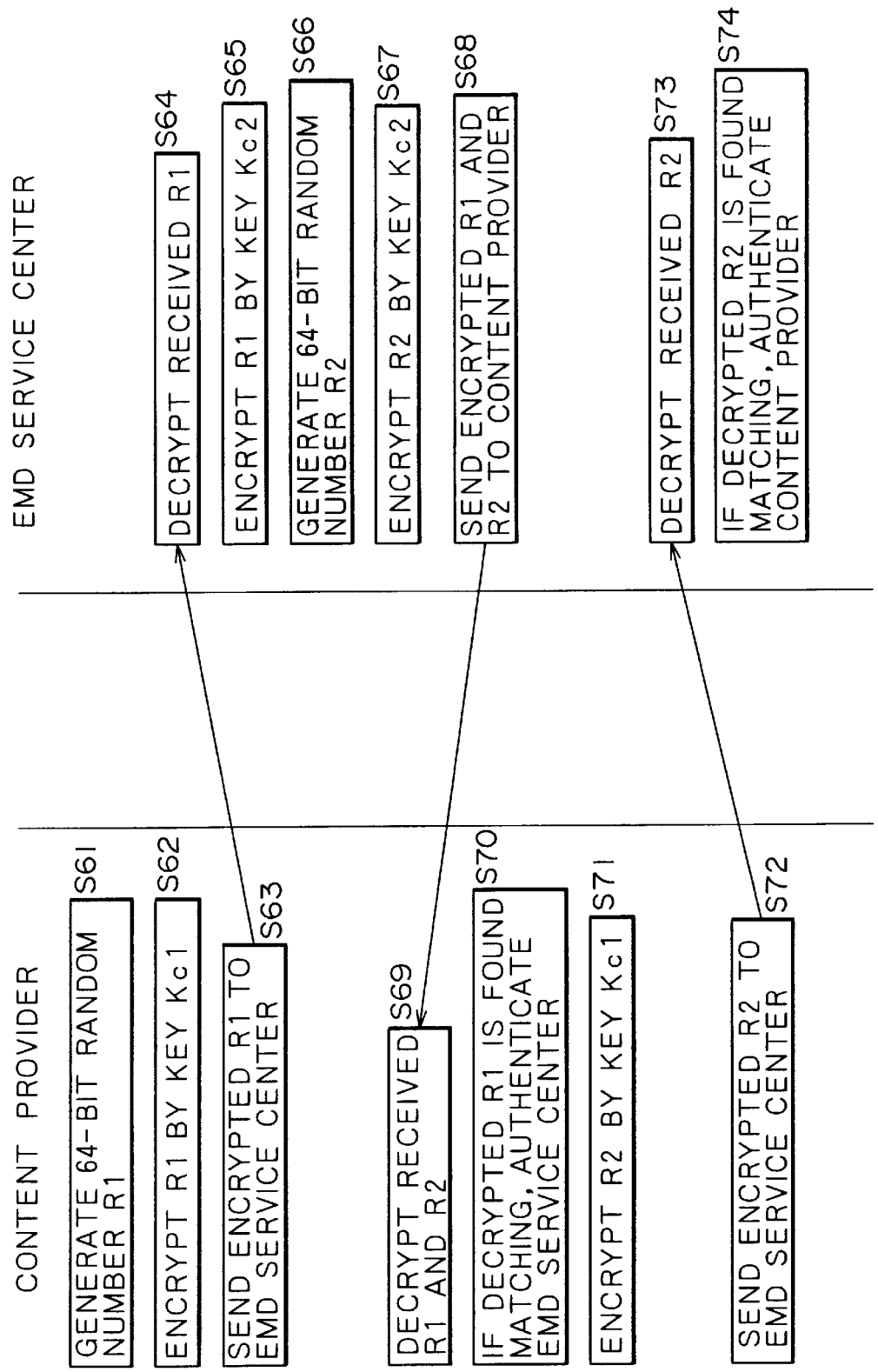
FIG. 41 is a flowchart describing another cross-authentication operation between the content provider 2 and the EMD service center 1.

FIG. 41 is a flowchart describing cross-authentication processing between the cross-authentication block 39 of the content provider 2 and the cross-authentication block 17 of the EMD service center 1 by use of two common keys Kc1 and Kc2 on the basis of DES. In step S61, the cross-authentication block 39 generates a 64-bit random number R1. In step S62, the cross-authentication block 39 encrypts the random number R1 by the stored common key Kc1 on the basis of DES. In step S63, the cross-authentication block 39 sends the encrypted random number R1 to the EMD service center 1.

In step S64, the cross-authentication block 17 of the EMD service center 1 decrypts the received random number R1 by the stored common key Kc1. In step S65, the cross-authentication block 17 encrypts the random number R1 by the stored common key Kc2. In step S66, the cross-authentication block 17 generates a 64-bit random number R2. In step S67, the cross-authentication block 17 encrypts the random number R2 by the common key Kc2. In step S68, the cross-authentication block 17 sends the encrypted random number R1 and the encrypted random number R2 to the cross-authentication block 39 of the content provider 2.

In step S69, the cross-authentication block 39 decrypts the received random number R1 and random number R2 by the stored common key Kc2. In step S70, the cross-authentication block 39 checks the decrypted random number R1. If this random number R1 is found matching the random number R1 (before encryption) generated in step S61, the cross-authentication block 39 authenticates the EMD service center 1 as a valid center; otherwise, the cross-authentication block 39 determines the EMD service center 1 to be an invalid center and ends the processing. In step S71, the cross-authentication block 39 encrypts the decrypted random number R2 by the common key Kc1. In step S72, the cross-authentication block 39 sends the encrypted random number R2 to the EMD service center 1.

In step S73, the cross-authentication block 17 decrypts the received random number R2 by the common key Kc1. In step S74, the cross-authentication block 17 checks the decrypted random number R2. If this decrypted random number R2 is found matching the random number R2 (before encryption) generated in step S66, the cross-authentication block 17 authenticates the content provider 2 as a valid provider; otherwise, the cross-authentication block 17 determines the content provider 2 to be an invalid provider and ends the processing.

Figure 42:
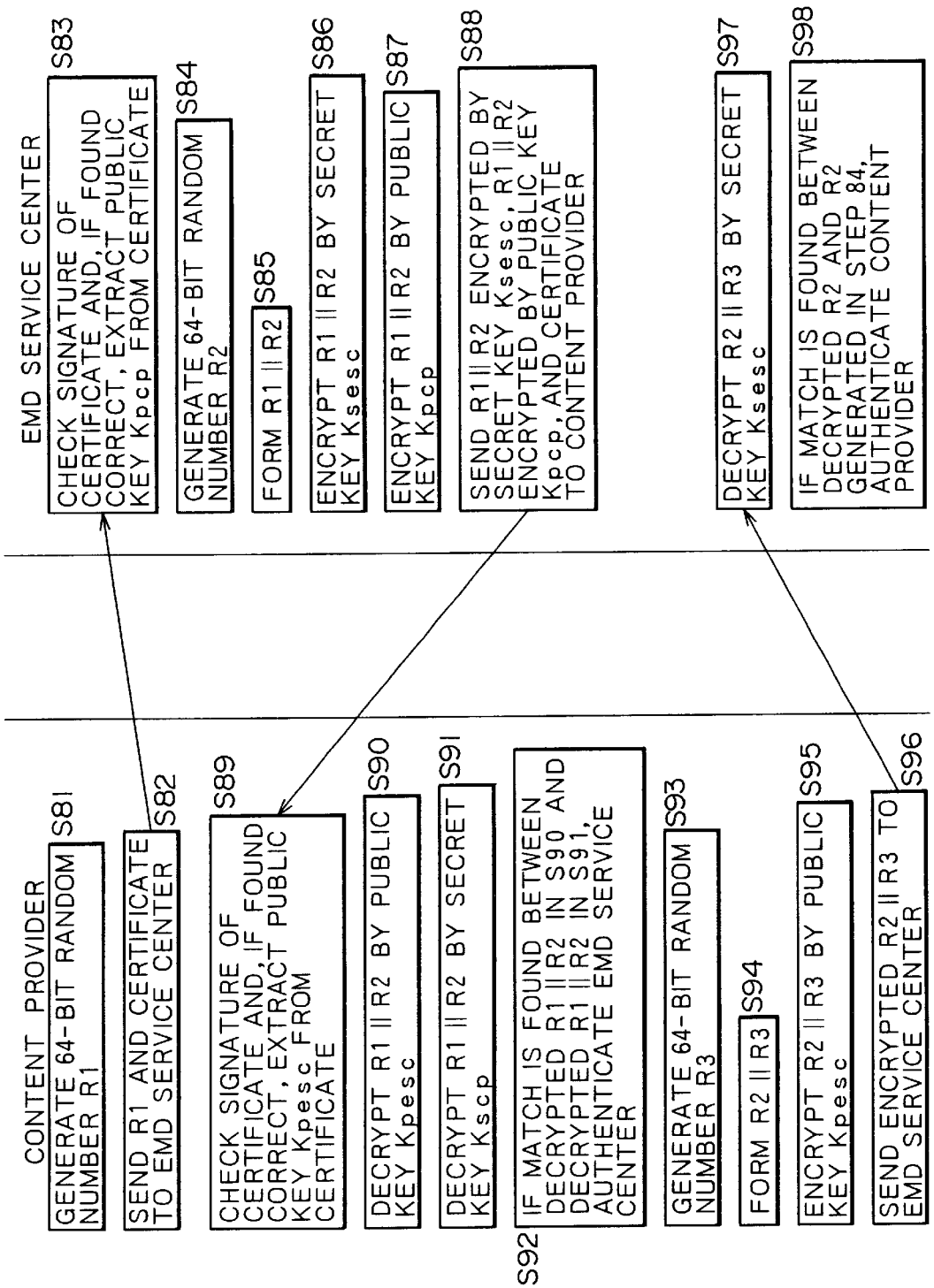
FIG. 42 is a flowchart describing still another cross-authentication operation between the content provider 2 and the EMD service center 1.

FIG. 42 shows a flowchart describing cross-authentication processing between the cross-authentication block 39 of the content provider 2 and the cross-authentication block 17 of the EMD service center 1 by use of 160-bit elliptic curve cryptography of public key cryptography. In step S81, the cross-authentication block 39 generates a 64-bit random number R1. In step S82, the cross-authentication block 39 sends a certificate (obtained from certificate authority in advance) including the public key Kpcp of its own and the random number R1 to the cross-authentication block 17.

In step S83, the cross-authentication block 17 of the EMD service center 1 decrypts the signature (encrypted by the secret key Ksca of the certificate authority) of the received certificate by the previously acquired public key Kpca of the certificate authority, extracts the public key Kpcp of the content provider 2 and the hash value of the name of the content provider 2, and extracts the public key Kpcp of the content provider 2 included in the certificate as plaintext and name of the content provider 2. If the certificate is found correct, the signature of the certificate can be decrypted. The public key Kpcp and the hash value of the name of the content provider 2 obtained by the decryption match the public key Kpcp of the content provider 2 included in the certificate as plaintext and the hash value obtained by applying hash function to the name of the content provider 2, respectively. Thus, the public key Kpcp is authenticated to be the public key not tampered. If the signature cannot be decrypted or if the signature can be decrypted but there is no hash value match, it indicates that either the public key is not correct or the provider is not correct, and then the processing is ended.

When a correct authentication result has been obtained, the cross-authentication block 17 generates a 64-bit random number R2 in step S84. In step S85, the cross-authentication block 17 generates a coherence R1∥R2. In step S86, the cross-authentication block 17 encrypts the coherence R1∥R2 by its own secret key Ksesc. In step S87, the cross-authentication block 17 encrypts the coherence R1∥R2 by the public key Kpcp of the content provider 2 obtained in step S83. In step S88, the cross-authentication block 17 sends the coherence R1∥R2 encrypted by the secret key Ksesc, the coherence R1∥R2 encrypted by the public key Kpcp, and the certificate (previously obtained from the certificate authority) including its own public key Kpesc to the cross-authentication block 39 of the content provider 2.

In step S89, cross-authentication block 39 decrypts the signature of the received certificate by the previously obtained public key Kpca of the certificate authority and, if the signature is found correct, extracts the public key Kpesc from the certificate. This processing is generally the same as that of step S83 and therefore its description will be skipped. In step S90, by use of the public key Kpesc obtained in step S89, the cross-authentication block 39 decrypts the coherence R1∥R2 encrypted by the secret key Ksesc of the EMD service center 1. In step S91, by use of its own secret key Kscp, the cross-authentication block 39 decrypts the encrypted coherence R1∥R2. In step S92, the cross-authentication block 39 compares the coherence R1∥R2 decrypted in step S90 with the coherence R1∥R2 decrypted in step S91. If a match is found, the cross-authentication block 39 authenticates the EMD service center 1 as a correct center; otherwise, the cross-authentication block 39 determines the center to be incorrect and ends the processing.

If a correct authentication result has been obtained, the cross-authentication block 39 generates a 64-bit random number R3 in step S93. In step S94, the cross-authentication block 39 generate a coherence R2∥R3. In step S95, the cross-authentication block 39 encrypts the coherence R2∥R3 by the public key Kpesc obtained in step S89. In step S96, the cross-authentication block 39 sends the encrypted coherence R2∥R3 to the cross-authentication block 17 of the EMD service center 1.

In step S97, the cross-authentication block 17 decrypts the encrypted coherence R2∥R3 by its own secret key Ksesc. In step S98, if the decrypted random number R2 is found matching the random number R2 (before being encrypted) generated in step S84, the cross-authentication block 17 authenticates the content provider 2 as a correct provider; otherwise, the cross-authentication block 17 determines the content provider 2 as incorrect and ends the processing.

Thus, the cross-authentication block 17 of the EMD service center 1 and the cross-authentication block 39 of the content provider 2 execute the cross-authenticating operations. The random numbers used in the cross-authentication are used for a temporary key Ktemp which is valid only for the processing that follows this cross-authentication processing.

Figure 43:
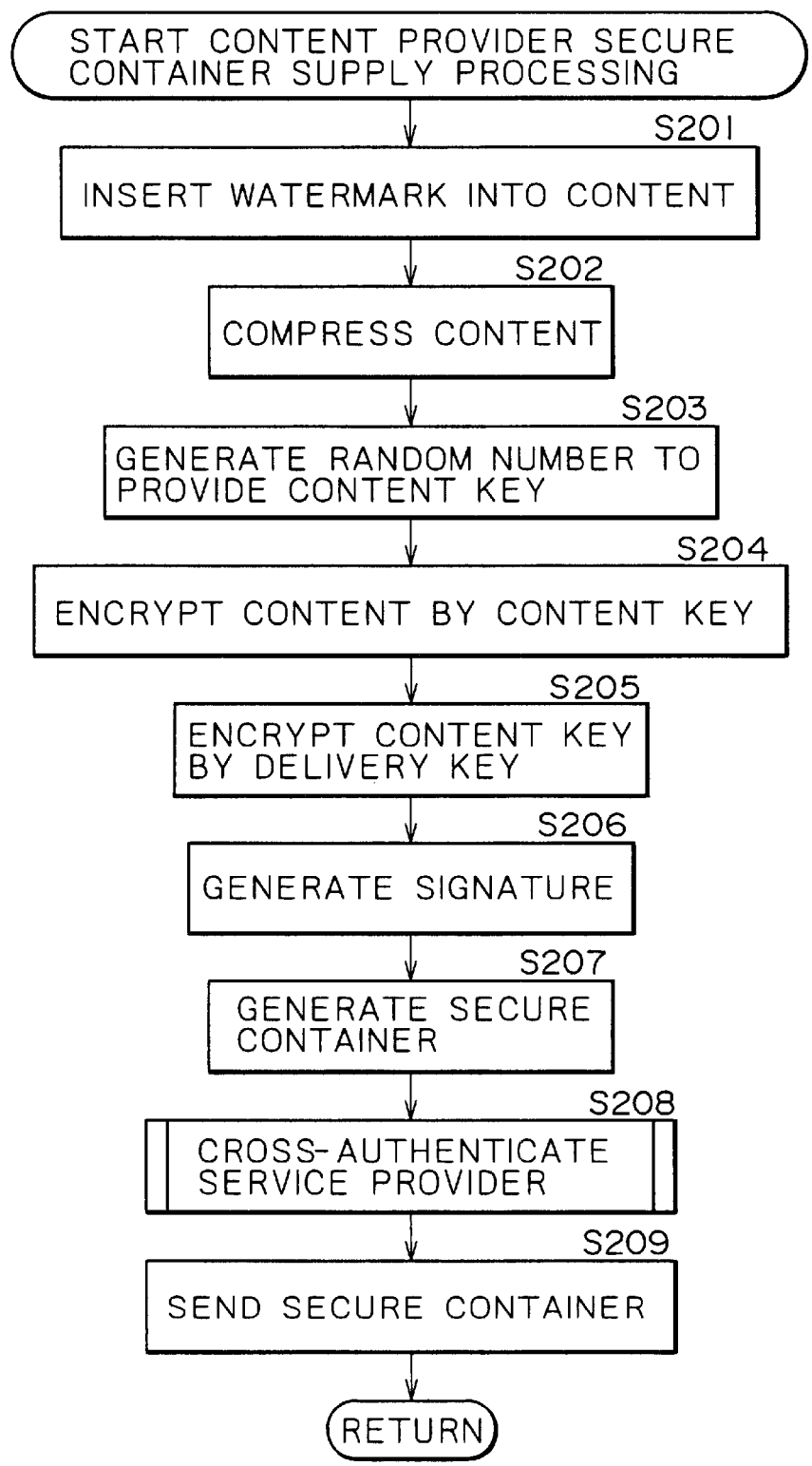
FIG. 43 is a flowchart describing the transmission by the content provider 2 of a content provider secure container to the service provider 3.

The following describes the processing of step S12 shown in FIG. 38. In step S12, processing is performed in which a content provider secure container is supplied from the content provider 2-1 to the service provider 3-1. Details of this processing will be described with reference to the flowchart of FIG. 43. To be more specific, the watermark attachment block 32 (refer to FIG. 11) of the content provider 2-1 reads content A from the content server 31, inserts a predetermined watermark indicative of the content provider 2-1 into content A, and sends the resultant content to the compression block 33.

In step S202, the compression block 33 of the content provider 2-1 compresses watermarked content A by a predetermined scheme such as ATRAC2 and supplies the compressed content to the encryption block 34. In step S203, the random generation block 35 generates a random number that provides a content key KcoA and supplies it to the encryption block 34.

In step S204, the encryption block 34 of the content provider 2-1 encrypts the compressed watermarked content A by use of the random number (namely the content key KcoA) generated in the random generation block 35 on the basis of a predetermined cryptography such as DES. In step S205, on the basis of a predetermined cryptography such as DES, the encryption block 36 encrypts the content key KcoA by the delivery key Kd supplied from the EMD service center 1.

In step S206, the secure container generation block 38 of the content provider 2-1 computes a hash value by applying hash function to all of the content A (encrypted by the content key KcoA), the content key KcoA (encrypted by the delivery key Kd) and the UCP A and UCP B (refer to FIG. 12) corresponding to the content A stored in the policy storage block 37 and encrypts the hash value with its own secret key Kscp, thereby generating a signature shown in FIG. 17.

In step S207, the secure container generation block 38 generates a content provider secure container shown in FIG. 17 which includes the content A (encrypted by the content key KcoA), the content key KcoA (encrypted by the delivery key Kd), the UCP A and UCP B (refer to FIG. 12), and the signature generated in the step S206.

In step S208, the cross-authentication block 39 of the content provider 2-1 cross-authenticates the cross-authentication block 45 (refer to FIG. 19) of the service provider 3-1. This authentication processing is generally the same as that described with reference to FIGS. 40 through 42 and therefore its description will be skipped. In step S209, the secure container generation block 38 of the content provider 2-1 attaches the certificate (refer to FIG. 18) previously issued by the certificate authority to the content provider secure container generated in step S207 and sends them to the service provider 3-1.

Thus, when the content provider secure container has been supplied to the service provider 3-1, the content provider secure container supply processing comes to an end and the system proceeds to step S13 shown in FIG. 38.

Figure 44:
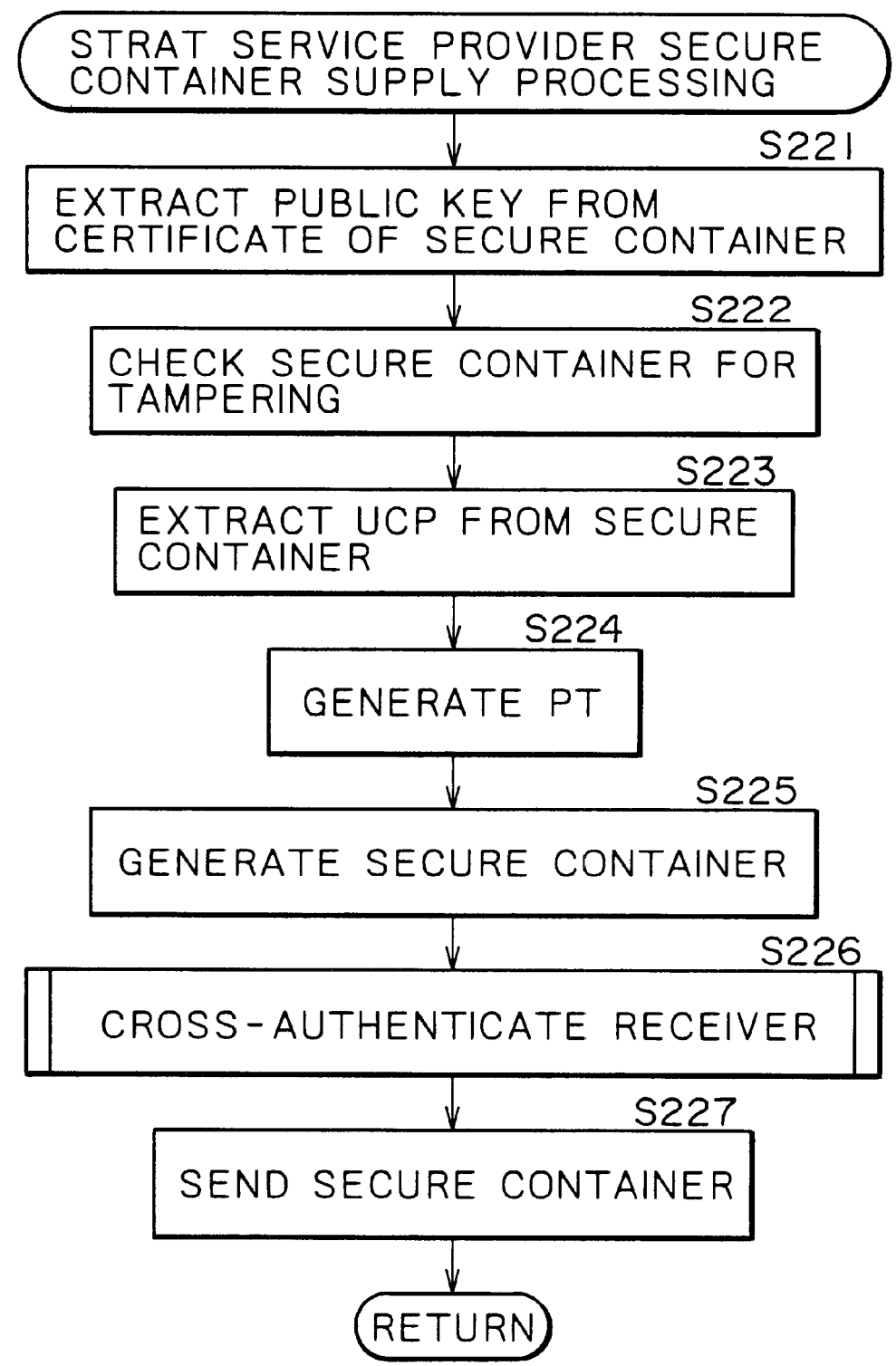
FIG. 44 is a flowchart describing the transmission by the service provider 3 of a service provider secure container to the receiver 51.

In step S13, the service provider secure container is supplied from the service provider 3-1 to the user home network 5 (or the receiver 51). Details of this processing will be described with reference to the flowchart shown in FIG. 44. To be more specific, in step S221, the value attachment block 42 (refer to FIG. 19) of the service provider 3-1 checks the signature included in the certificate (refer to FIG. 18) attached to the content provider secure container supplied from the content provider 2-1. If the certificate is found untampered, the value attachment block 42 takes the public key Kpcp of the content provider 2-1 out of the certificate. The signature of the certificate is checked in the same manner as in the processing of step S83 shown in FIG. 42 and therefore the description of this checking will be skipped.

In step S222, the value attachment block 42 decrypts the signature of the content provider secure container supplied from the content provider 2-1 by the public key Kpcp thereof. The value attachment block 42 matches the obtained hash value against the hash value obtained by applying hash function to all of the content A (encrypted by the content key KcoA), the content key KcoA (encrypted by the deliver key Kd), and the UCP A and UCP B, thereby checking the content provider secure container for tampering. If a mismatch is found (or the secure container is found tampered), this processing is aborted. In this example, however, it is assumed that no tampering has been found in the secure container and therefore the system proceeds to step S223.

In step S223, the value attachment block 42 takes the content A (encrypted by the content key KcoA), the content key KcoA (encrypted by the delivery key Kd), and the signature out of the content provider secure container and sends them to the content server 41. The content server 41 receives and stores them. The value attachment block 42 also takes the UCP A and the UCP B out of the secure container and supplies them to the secure container generation block 44.

In step 224, the value attachment block 42 generates PT A-1 and PT A-2 (refer to FIG. 20) and PT B-1 and PT B-2 (refer to FIG. 22) on the basis of the extracted UCP A and UCP B and supplies the generated PTs to the secure container generation block 44 of the service provider 3-1.

In step S225, the secure container generation block 44 generates the service provider secure container shown in FIG. 24 from the content A (encrypted by the content key KcoA) and the content key KcoA (encrypted by the delivery key Kd) read from the content server 41 and the UCP A, UCP B, the signature of the content provider 2, the PT A-1, A-2, B-1, and B-2, and their signature.

In step S226, the cross-authentication block 45 of the service provider 3-1 cross-authenticates the cross-authentication block 71 (refer to FIG. 26) of the receiver 51. This cross-authentication processing is generally the same as the case described with reference to FIGS. 40 through 42 and therefore the description will be skipped.

In step S227, the secure container generation block 44 attaches the certificate (refer to FIG. 25) of the service provider 3-1 to the service provider secure container generated in step S225 and sends the resultant secure container to the receiver 51 of the user home network 5.

Thus, when the service provider secure container has been supplied from the service provider 3-1 to the receiver 51, the service provider secure container supply processing comes to an end and the system proceeds to step S14 shown in FIG. 38.

In step S14, the service provider secure container outputted from the service provider 3-1 is received by the receiver 51 of the user home network 5. Details of this processing will be described with reference to the flowchart shown in FIG. 45. To be more specific, in step S241, the cross-authentication module 71 (refer to FIG. 26) of the receiver 51 cross-authenticates the cross-authentication block 45 (refer to FIG. 19) of the service provider 3-1 through the communication block 61. When this cross-authentication is successful, the communication block 61 receives the service provider secure container (refer to FIG. 24) from the cross-authenticated service provider 3-1. If this cross-authentication is unsuccessful, this processing is aborted. In this example, it is assumed that the cross-authentication is successful and the system proceeds to step S242.

In step S242, the communication block 61 of the receiver 51 receives a public key certificate from the service provider 3-1 cross-authenticated in step S241.

In step S243, the decryption/encryption module 74 of the receiver 51 checks the signature included in the service provider secure container received in step S241 for tampering. If the secure container is found tampered, this processing is aborted. In this example, it is assumed that the service container is found untampered and the system proceeds to step S244.

In step S244, on the basis of the reference information 51 (refer to FIG. 32) stored in the storage module 73 of the receiver 51, the UCP satisfying the usage condition and the PT satisfying the price condition are selected and displayed on the display block, not shown. The user F, referring to the descriptions of the displayed UCP and PT, selects one of the usage descriptions of the UCP by operating the operator block, not shown. The input control block 68 outputs a signal corresponding to the operation by user F to the SAM 62.

In the present example, the content usage point of the content provider 2-1 is set to 222 in "Usage Point Information" of the reference information 51 of the receiver 51 as shown in FIG. 33. Namely, according to the reference information 51, of the UCP A and the UCP B set for the content A, the UCP A (refer to FIG. 12A) in which "User Condition 10" of "Usage Condition 10" is set to 200 points or more is selected. In addition, in "Settlement User Information" of the reference information 51, user F is male, so that the condition set to "Price Condition 10" of PT A-1 (refer to FIG. 20A) is satisfied. Consequently, of the PT A-1 and the PT A-2 generated for the UCP A, the PT A-1 is selected. Eventually, the descriptions of the UCP A and the PT A-1 are displayed on the display block. As a result, in this example, it is assumed that user F has selected the usage description 11 (the price description 11 of PT A-1) of the UCP A.

In step S245, the charging processing module 72 of the SAM 62 of the receiver 51 generates the UCS A (refer to FIG. 28) and information on charges A (refer to FIG. 30) on the basis of the description (the description of "Price Description 11" of the PT A-1) of "Usage Description 11" of the UCP A. Namely, in this case, the content A is purchased at a price of 2,000 yen and reproduced.

In step S246, the content A (encrypted by the content key KcoA), the UCP A-1, the PT A-1 and PT A-2, and the signature of the content provider 2 are taken out of the service provider secure container (refer to FIG. 24) and stored in the HDD 52. In step S247, the decryption unit 91 of the decryption/encryption module 74 decrypts the content key KcoA (encrypted by the delivery key Kd) included in the service provider secure container by the delivery key Kd stored in the storage module 73.

In step S248, the encryption unit 93 of the decryption/encryption module 74 encrypts the content key KcoA decrypted in step S247 by the save key Ksave stored in the storage module 73.

In step S249, the data check module 75 of the receiver 51 detects the block Bp of the usage information storage block 63A (refer to FIG. 29) of the external storage block 63 in which the content key KcoA encrypted by the save key Ksave in step S248 and the UCS A generated in step S245 are stored in a pair. In the present example, the block Bp-1 of the usage information storage block 63A is detected. It should be noted that, in the usage information storage block 63A shown in FIG. 29, the content key KcoA and the UCS A are shown as stored in the usage information memory area Rp-3 of the block Bp-1, but, at this point of time, these are not stored in the Rp-3, which stores instead predetermined initial information indicative that the Rp-3 is free.

In step S250, the data check module 75 of the receiver 51 obtains a hash value by applying hash function to the data (all data stored in the usage information memory areas Rp-1 through Rp-N) in the block Bp-1 detected in step S249. Next, in step S251, the data check module 75 compares the hash value obtained in step S250 with the check value Hp-1 (refer to FIG. 31) corresponding to the block Bp-1 stored in the storage module 73. If a match is found, it indicates that the data in the block Bp-1 are not tampered, so that the system proceeds to step S252.

In step S252, the SAM 62 of the receiver 51 stores the usage information (the content key KcoA encrypted by the save key Ksave in step 248 and the UCS A (refer to FIG. 28) generated in step S245) into the usage information memory area Rp-3 of the block Bp-1 of the external storage block 63.

In step S253, the data check module 75 of the receiver 51 computes a hash value by applying hash function to all data stored in the block Bp-1 of the usage information storage block 63A to which the usage information memory area Rp-3 in which the usage information was stored in step S252. In step S254, the data check module 75 writes the obtained hash value over the check value Hp-1 stored in the storage module 73. In step S255, the charging processing module 72 stores the information on charges A generated in step S245 into the storage module 73, upon which the processing comes to an end.

If, in step S251, no match is found between the computed hash value and the check value Hp-1, it indicates that the data in the block Bp-1 are tampered. The system proceeds to step S256, in which the data check module 75 determines whether all blocks Bp of the usage information storage block 63A of the external storage block 63 have been checked. If all blocks Bp are found not checked, then, in step S257, the data check module 75 checks the usage information storage block 63A for other free blocks Bp. Then, back to step S250, the processing is repeated.

In step S256, if all blocks Bp of the usage information storage block 63A are found checked, it indicates that there is no block Bp (usage information memory area Rp) that can store usage information, upon which the service provider secure container receiving processing comes to an end.

Thus, when the service provider secure container has been received by the receiver 51, the processing comes to an end and the system proceeds to step S15 shown in FIG. 38.

Figure 46:
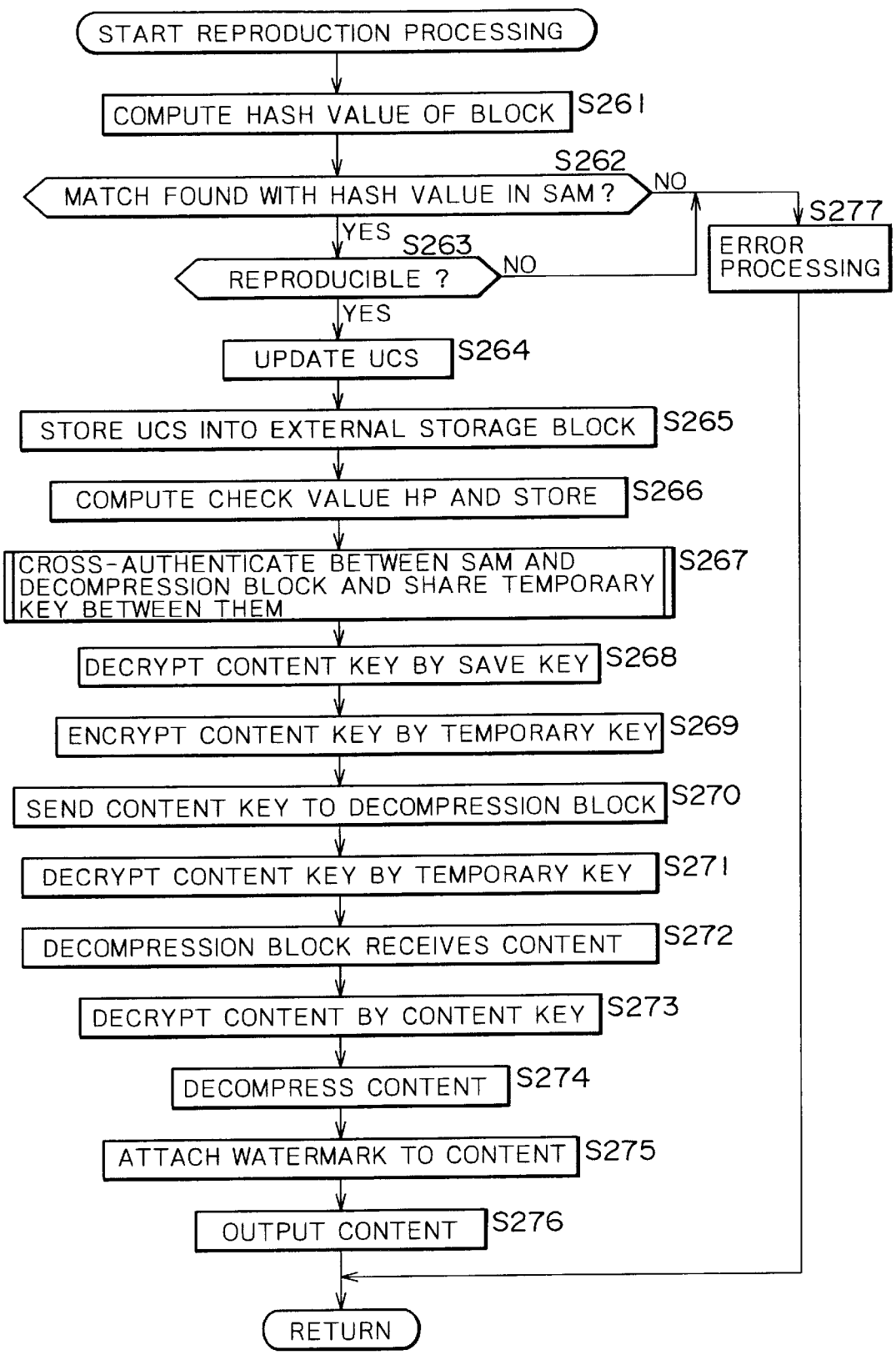
FIG. 46 is a flowchart describing the processing by the receiver 51 for content reproduction.

In step S15, the supplied content A is used in the receiver 51. In this case, according to the usage description 11 of the selected UCP A, the content A is used by reproduction. Therefore, the following describes the processing of reproducing the content A with reference to the flowchart shown in FIG. 46.

Figure 45:
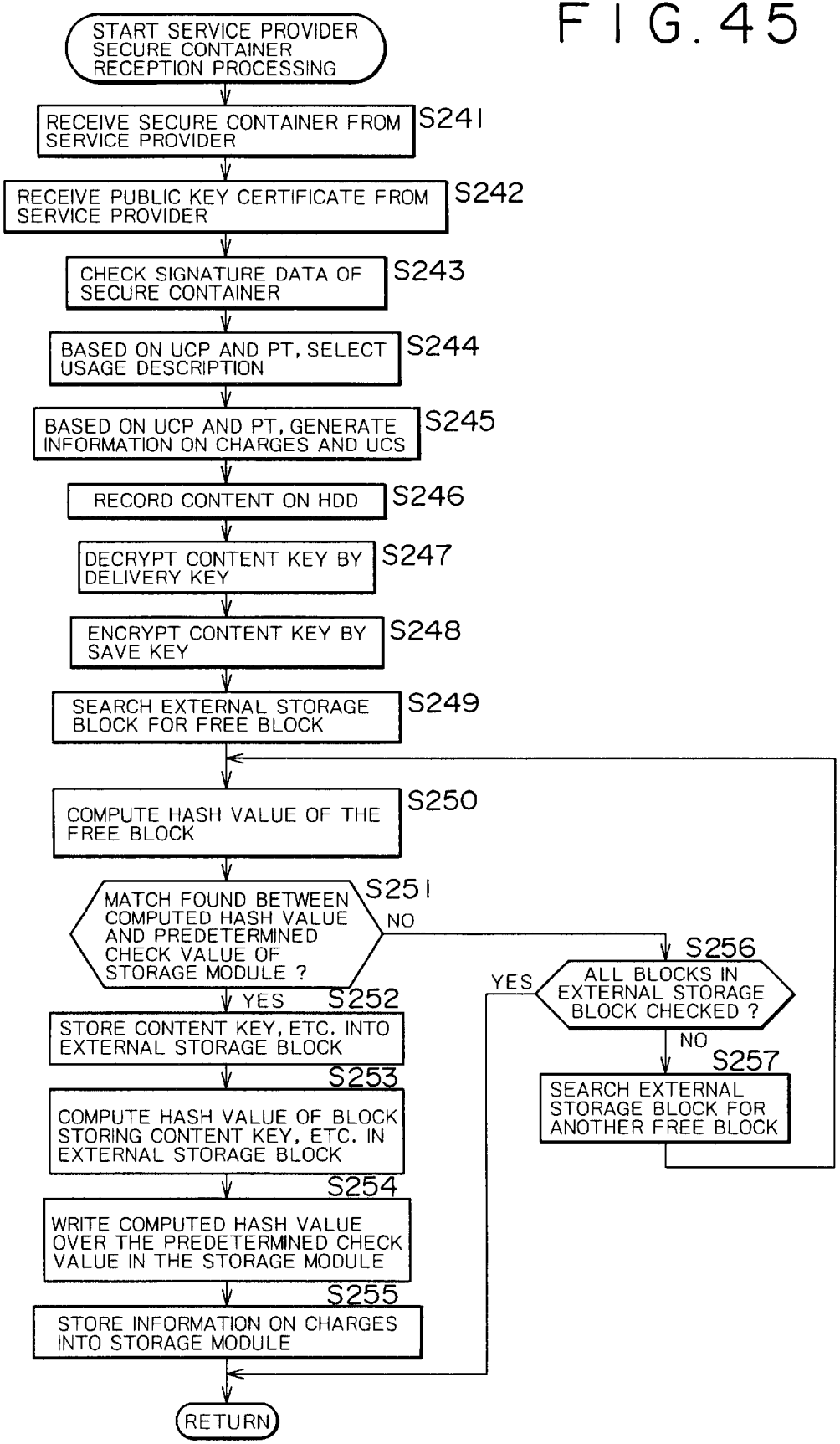
FIG. 45 is a flowchart describing the reception by the receiver 51 of the service provider secure container.

In step S261, the data check module 75 of the receiver 51 computes a hash value by applying hash function to the data in the block Bp-1 of the usage information storage block 63A to which the usage information memory area Rp-3 storing the content key KcoA (encrypted by the save key Ksave) and the UCS A belongs, in step S252 shown in FIG. 45.

In step S262, the data check module 75 compares the hash value computed in step S261 and the hash value computed in step S253 of FIG. 45 and stored in the storage module 73 in step S254. If a match is found, it indicates that the data in the block Bp-1 are not tampered. The system proceeds to step S263.

In step S263, it is determined, on the basis of the information indicated by "Parameter" of "Usage Description" of the UCS A (refer to FIG. 28), whether the content A is usable or not. For example, in the UCS in which "Form" of "Usage Description" is "time-limited reproduction," its "Parameter" stores the start and end periods (or times) of the reproduction, so that the current time is checked whether it is inside the time limit range. If the current time is found inside the time limit range, it is determined that corresponding content is usable; otherwise, the content is unusable. In the UCS in which "Form" of "Usage Description" is the reproduction (or duplication) only by a predetermined number of times, its "Parameter" stores the remaining number of times the content can be used. In this case, if the number of times set to "Parameter" is not zero, it is determined that the corresponding content is usable. If the number of times is zero, it is determined that the corresponding content is unusable.

"Form" of "Usage Descriptions" of the UCS A is "reproduction by purchase," so that, in this case, the content A is purchased and reproduced without condition. Namely, "Parameter" of "Usage Description" of the UCS A stores the information indicative of usability of content. Hence, in the present example, it is determined in step S263, that the content A is usable and the system proceeds to step S264.

In step S264, the charging processing module 72 of the receiver 51 updates the UCS A. Although information to be updated is not included in the UCS A, if "Form" of "Usage Description" is the reproduction only by the predetermined number of times, the reproduction count set to the "Parameter" is decremented by one.

Next, in step S265, the receiver 51 stores the UCS A (actually not updated) updated in step S264 into the usage information memory area Rp-3 of the block Bp-1 of the usage information storage block 63A. In step S266, the data check module 75 computes a hash value by applying hash function to the data in the block Bp-1 of the usage information storage block 63A in which the UCS A was stored in step S265 and writes the computed hash value over the check value Hp-1 stored in the storage module 73.

In step S267, the cross-authentication module 71 of the SAM 62 cross-authenticates the cross-authentication module 101 of the decompression block 64 and the SAM 62 and the decompression block 64 share temporary key Ktemp. This cross-authentication processing is generally the same as described with reference to FIGS. 40 through 42 and therefore its description will be skipped. Random numbers R1, R2, R3 or their combination used for cross-authentication is used as the temporary key Ktemp.

In step S268, the decryption unit 91 of the decryption/encryption module 74 decrypts the content key KcoA (encrypted by the save Ksave) stored in the block Bp-1 (the usage information memory area Rp-3) of the usage information storage block 63A in step S252 of FIG. 45 by the save key Ksave stored in the storage module 73.

Next, in step S269, the encryption unit 93 of the decryption/encryption module 74 encrypts the decrypted content key KcoA by temporary key Ktemp. In step S270, the SAM 62 sends the content key KcoA encrypted by temporary key Ktemp to the decompression block 64.

In step S271, the decryption module 102 of the decompression block 64 decrypts the content key KcoA by temporary key Ktemp. In step S272, the decompression block 64 receives the content A (encrypted by the content key Kco) stored in the HDD 52. In step S273, the decryption module 103 of the decompression block 64 decrypts the content A (encrypted by the content key Kco) by the content key KcoA.

In step S274, the decompression module 104 of the decompression block 64 decompresses the decrypted content A by a predetermined scheme such as ATRAC2. In step S275, the watermark attachment module 105 of the decompression block 64 inserts a predetermined watermark identifying the receiver 51 into the decompressed content A. In step S276, the content A is outputted to a speaker, not shown, for example, upon which the content reproduction processing comes to an end.

In step S262, if the hash value computed in step S261 is found not matching the hash value stored in the storage module 73 of the receiver 51 or, if the content is found unusable, then the SAM 62 executes, in step S263, a predetermined error handling operation such as displaying an error message on a display block not shown through the display control block 67, upon which the content reproduction processing is aborted.

Thus, when the content A is reproduced (or used) in the receiver 51, the content reproduction processing as well as the content A usage processing shown in FIG. 38 come to an end.

Figure 47:
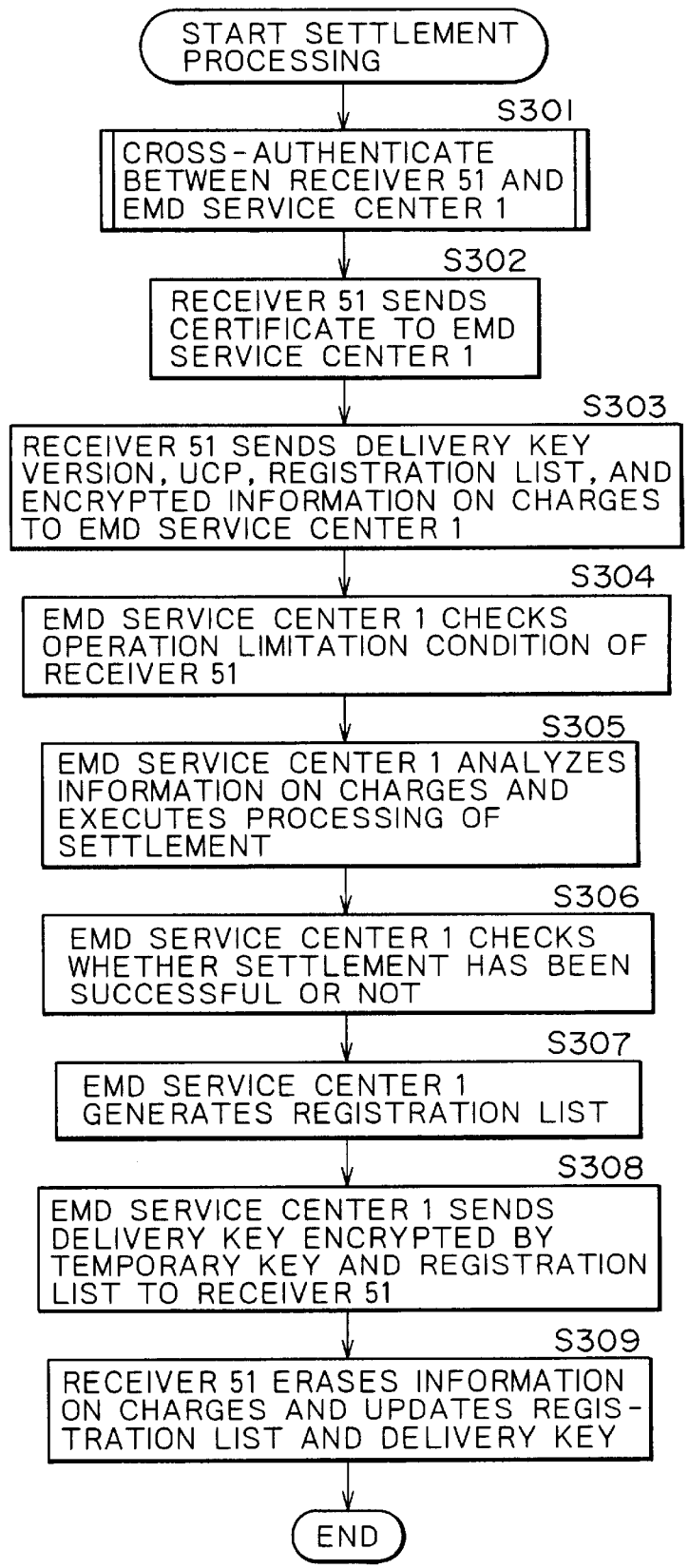
FIG. 47 is a flowchart describing settlement processing.

The following describes the processing of settling the charges of the receiver 51 with reference to the flowchart shown in FIG. 47. It should be noted that this settlement processing starts when an added-up charges exceeds a predetermined upper limit amount (namely, the upper limit amount for official or provisional registration) or the version of delivery key Kd has become obsolete and therefore cannot decrypt the content key Kco (encrypted by delivery key Kd) in step S247 of FIG. 45 for example (namely, the service provider secure container cannot be received).

To be specific, in step S301, cross-authentication is executed between the receiver 51 and the EMD service center 1. This cross-certification is generally the same as described with reference to FIGS. 40 through 42 and therefore its description will be skipped.

Next, in step S302, the SAM 62 of the receiver 51 sends a certificate to the user management block 18 (refer to FIG. 3) of the EMD service center 1. In step S303, the SAM 62 encrypts the UCP stored in the HDD 52 corresponding to the charges (or information on charges) to be settled by use of temporary key Ktemp shared by the EMD service center 1 in step S301. Then the SAM 62 sends the encrypted UCP to the EMD service center 1 along with the version of the delivery key Kd stored in the storage module 73, information on charges (for example, information on charges A shown in FIG. 30), and a registration list (as shown in FIG. 34 for example) stored in the HDD 52.

In step S304, the user management block 18 of the EMD service center 1 receives and decrypts the information supplied from the receiver 51 in step S303 and checks to see if there is any unauthorized action in the receiver 51 that sets "stop" to "Status Flag" of the registration list.

In step S305, the charging block 19 of the EMD service center 1 analyzes the information on charges received in step S303 to execute processing such as computing the amount due of a user (user F for example). Next, in step S306, the user management block 18 confirms by the processing of step S305 whether the settlement has been successful or not.

Next, in step S307, on the basis of the confirmation made in step S304 and the confirmation made in step S306, the user management block 18 sets the registration condition of the receiver 51 and attaches a signature thereto to form the registration list of the receiver 51.

For example, if an unauthorized action is found in step S304, "stop" is set to "Status Flag" of the registration list. In this case, the further processing is all stopped. Namely, the receiver 51 cannot receive the services of the EMD system. If the settlement is found unsuccessful in step S306, "limited" is set to "Status Flag" of the registration list. In this case, the receiver 51 can reproduce the already purchased content but cannot purchase new content.

Next, in step S308, the user management block 18 encrypts the delivery key Kd of the latest version (the delivery keys Kd of the latest version for 3 months) and the registration list generated in step S307 by temporary key Ktemp and sends the encrypted keys and list to the receiver 51.

In step S309, the SAM 62 receives the delivery keys Kd and the registration list through the communication block 61, decrypts them, and stores the decrypted delivery keys and registration list into the storage module 73. At this moment, the information on charges stored in the storage module 73 is deleted and the registration list and the delivery keys Kd are updated by new ones.

The following describes the processing in which the receiver 201 not yet registered in the EMD system is registered with user A, who is a purchaser, as the settlement user. The flowchart shown in FIG. 48 indicates the processing procedure of the receiver 201 for executing this registration processing.

In step S401, user A who purchased the receiver 201 enters predetermined information in the registration form attached to the receiver 201 and sends the completed registration form to the managing company that manages the EMD service center 1. As shown in FIG. 49, this registration form has entries such as the ID of the SAM of the device (in this case, the ID of the SAM 212 of the receiver 201), user's name, address, telephone number, settlement organization information (for example, user's credit card number), birthday, age, gender, password, user ID, and settlement ID.

It should be noted that the user's password, ID and settlement ID are given when the receiver 201 has been registered (officially registered or provisionally registered), so that, at this point of time, user A does not hold these items of information. Therefore, in this case, user A enters in the registration form the other items of information, namely user A's name, address, telephone number, settlement organization information, birthday, age, and gender (unless there is no need for especially making distinction between these items of information, they are hereafter generically referred to as user general information).

Also, in this case, because user A is registered as a settlement user of the receiver 201, credit granting processing is executed for user A. Therefore, user A must always enter into the registration form the user A's name, address, telephone number, and settlement organization information, of the user general information, to be used for the credit granting processing.

Next, in step S402, user A performs an operation on the receiver 201 for sending to the EMD service center 1 a predetermined usage start signal indicative of the start of using content in the receiver 201. This causes cross-authentication between the cross-authentication module 221 (refer to FIG. 35) of the receiver 201 and the cross-authentication block 17 (refer to FIG. 3) of the EMD service center 1. The usage start signal is sent to the EMD service center 1 through the communication block 211 of the receiver 201. It should be noted that the usage start signal includes the ID of the SAM of the device (in this case, the ID of the SAM 212 of the receiver 201) for which usage start is requested.

In step S403, the receiver 201 receives and stores the delivery key Kd for 1 month (see FIG. 8), the upper limit amount for provisional registration, the ID of user A, the password of user A, and the user general information entered in the registration form, in step S401, from the EMD service center 1 at the provisional registration into the EMD system (hereafter, unless it is necessary to make distinction between these items of information, they are generically referred to as provisional registration information). To be more specific, before receiving the information from the EMD service center 1, cross-authentication is executed between the cross-authentication module 221 of the receiver 201 and the cross-authentication block 17 of the EMD service center 1 to share temporary key Ktemp. Then, the information from the EMD service center 1 received through the communication block 211 of the receiver 201 is decrypted by the temporary key Ktemp shared by the EMD service center 1 in the decryption/encryption module 224. The decrypted information is outputted to the storage module 223.

Thus, the storage module 223 stores the delivery key Kd (encrypted by the save key Ksave) for 1 month in addition to the information (refer to FIG. 36) stored before this registration processing starts. At the same time, the reference information 201 stored in the storage module 223 has, in addition to the information (refer to FIG. 37) stored before, "upper limit amount for provisional registration" set to "Upper Limit Amount of Charging" and the user generation information of user A, the ID of user A, and the password of user A set to "Settlement User Information" as shown in FIG. 51.

Figure 50:
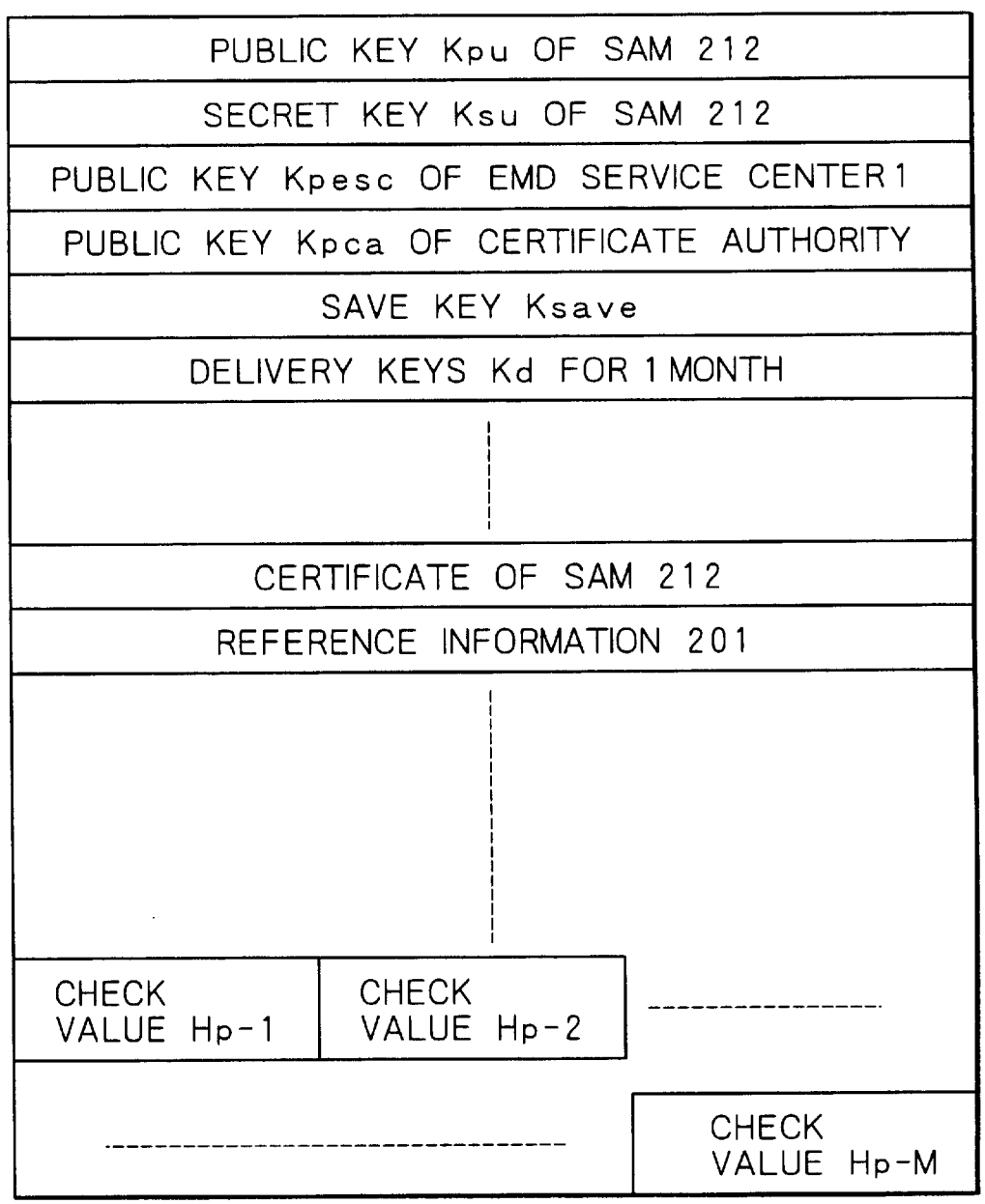
FIG. 50 illustrates another example of information stored in the storage module 223 of the receiver 201.
Figure 52:
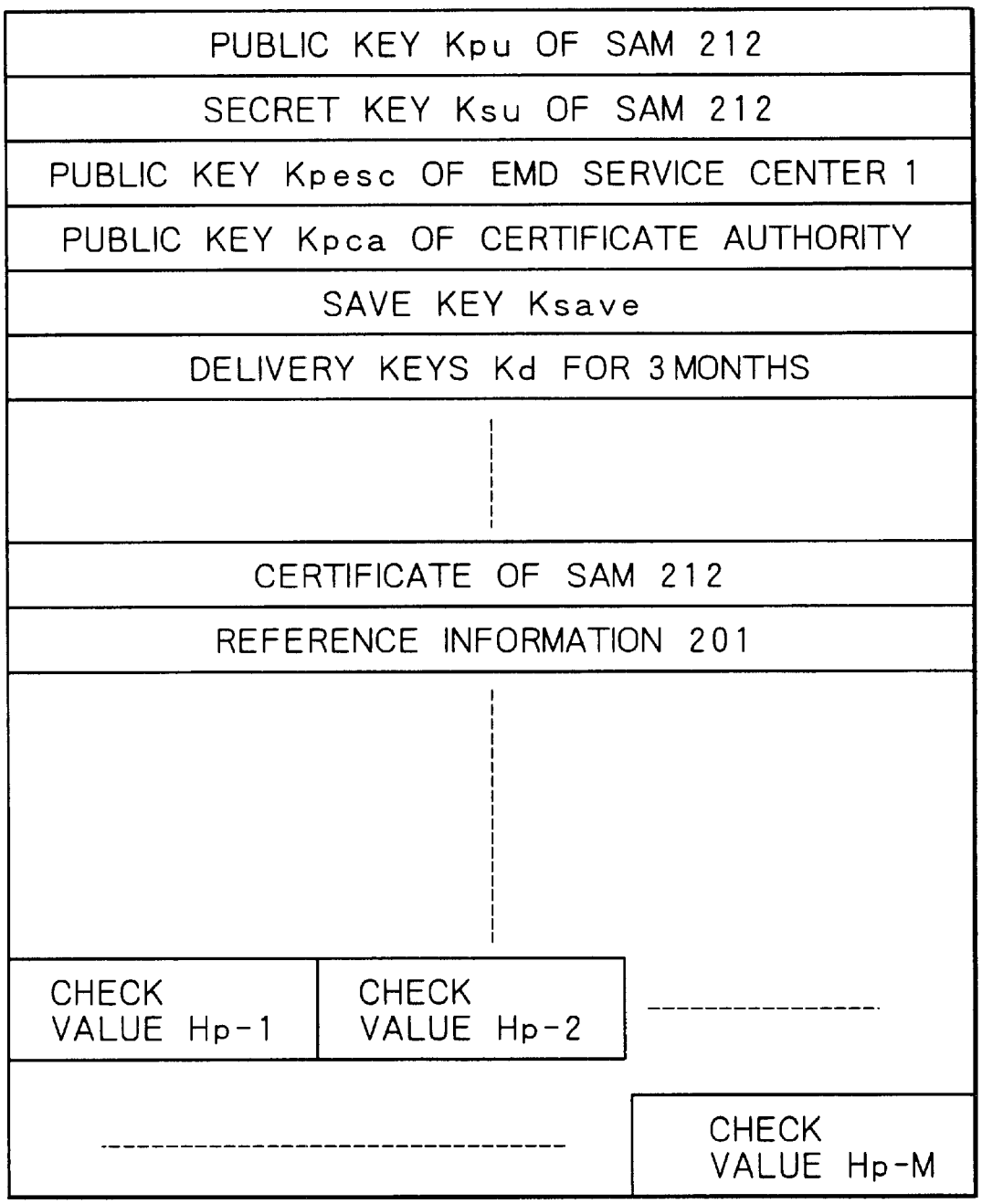
FIG. 52 illustrates still another example of information stored in the storage module 223 of the receiver 201.

Next, in step S404, the receiver 201 receives and stores the delivery keys Kd for 3 months, the upper limit amount for official registration, and the settlement ID of user A (hereafter, unless it is necessary to make distinction between these items of information supplied from the EMD service center 1, they are generically referred to as official registration information) which are supplied from the EMD service center 1 when the receiver 201 has been officially registered in the EMD system. The specific processing to be executed here is generally the same as that of step S403 and therefore its description will be skipped. Consequently, the storage module 223 of the receiver 201 stores, as shown in FIG. 52, the delivery keys Kd for 3 months instead of the delivery key Kd for 1 month for the information (refer to FIG. 50) stored before. At the same time, the reference information 201 has "upper limit amount for official registration" set to "Upper Limit Amount of Charging" and "settlement ID of user A" set to "Settlement ID."

Thus, the receiver 201 has been registered in the EMD system with user A as the settlement user. This allows user A to use content at the receiver 201.

Figure 54:
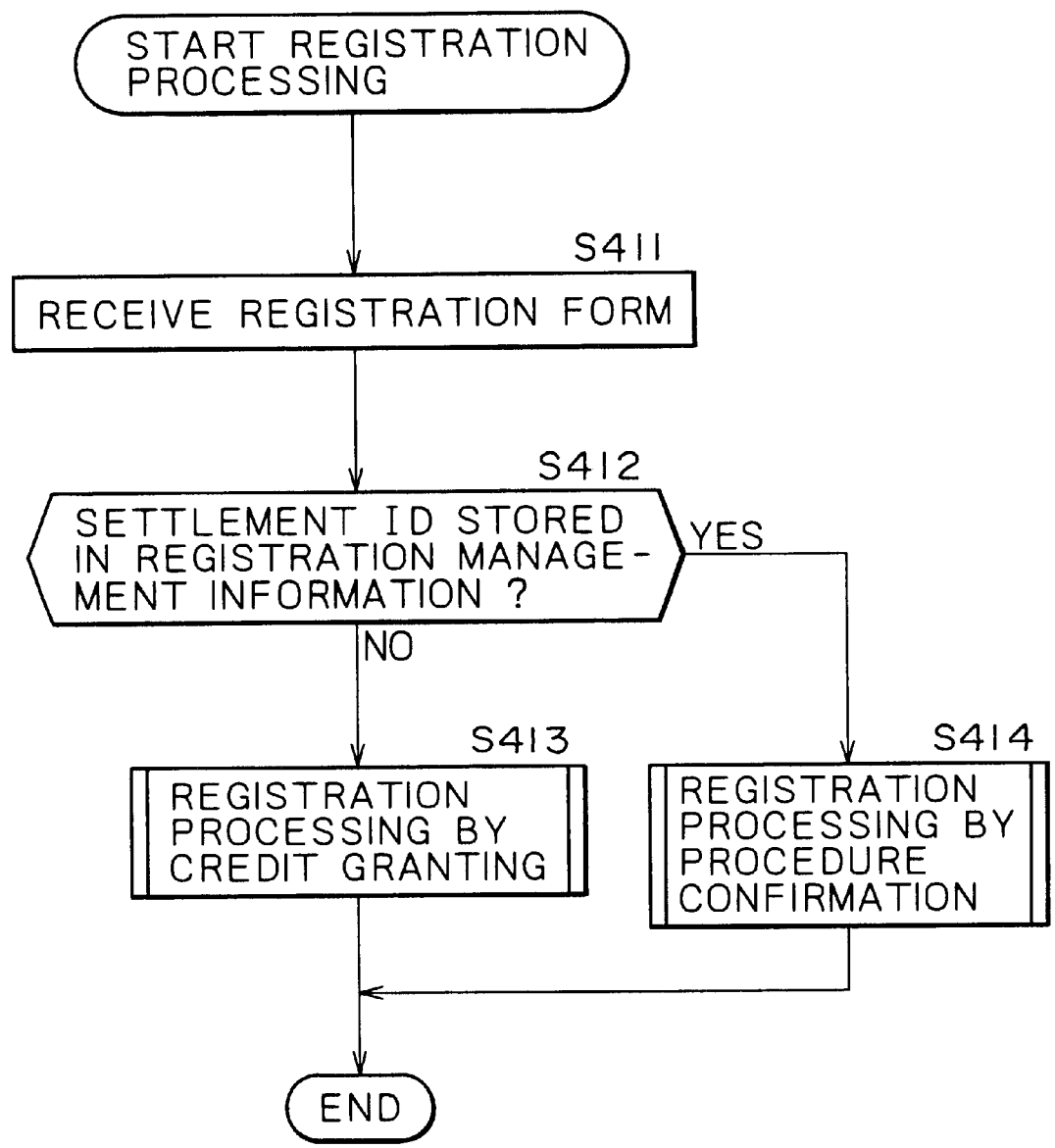
FIG. 54 is another flowchart describing the processing for registering the receiver 201 with user A as a settlement user.

The following describes the processing procedure of the EMD service center 1 for executing the above-mentioned processing, namely, registration of the receiver 201 into the EMD system with user A as the settlement user, with reference to the flowchart shown in FIG. 54.

In step S411, the managing company for managing the EMD service center 1 receives the registration form (refer to S401 of FIG. 48) of user A and inputs the information entered in the registration form into the EMD service center 1. This causes the user general information (name, address, telephone number, settlement organization information, birthday, age, and gender) of user A to be stored in "Settlement User Information" corresponding to the ID of the SAM 212 of the receiver 201 of the system registration information held by the user management block 18 of the EMD service center 1 as shown in FIG. 55.

In step S412, the user management block 18 references the system registration information to check to see if the settlement ID is set to "Settlement ID" corresponding to the ID of the SAM shown in the registration form (in this example, the ID of the SAM 212 of the receiver 201). In the present example, as shown in FIG. 55, nothing is set to this "Settlement ID," so that the user management block 18 determines that no settlement ID is set. Then, the system proceeds to step S413.

Figure 56:
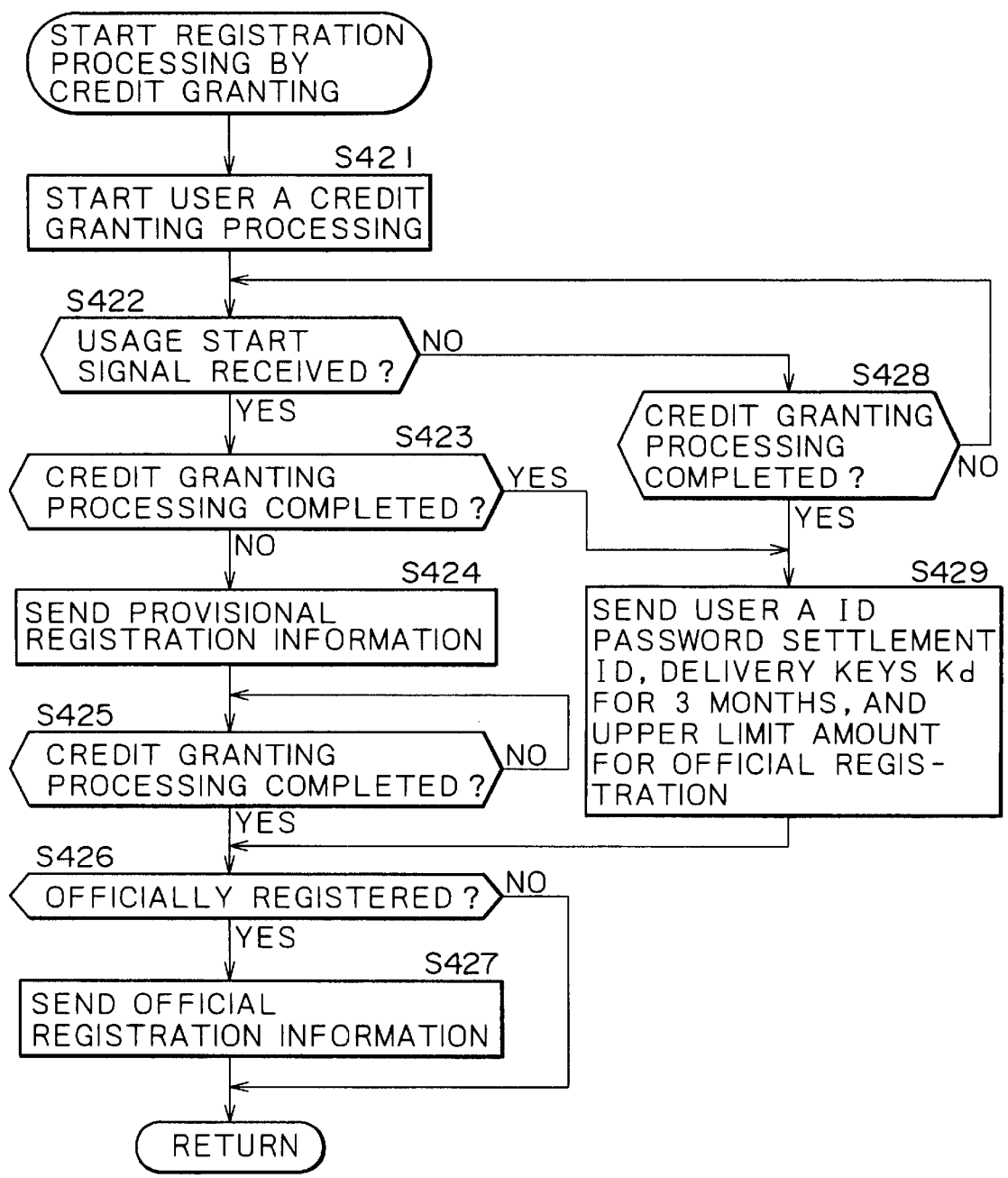
FIG. 56 is a flowchart describing the processing of registration by credit granting.

In step S413, the registration processing by credit granting starts. Details of this processing are shown in the flowchart of FIG. 56. To be more specific, in step S421, the cashier block 20 (refer to FIG. 3) of the EMD service center 1 communicates the settlement organization of user A for example to start the credit granting processing for user A on the basis of the name, address, telephone number, and settlement organization information of the user A entered in the registration form.

In step S422, the user management block 18 determines whether the usage start signal from the receiver 201 (refer to step S402 of FIG. 48) has been received. If the signal is found received, then, in step S423, the user management block 18 determines whether the credit granting processing started in step S421 has been completed.

If the credit granting processing is not completed in step S423, then, in step S424, the user management block 18 assigns the ID and password of user A, sets them to "Settlement User Information" corresponding to the ID of the SAM 212 of the system registration information as shown in FIG. 57, and sends the resultant system registration information to the receiver 201 along with the delivery key Kd for 1 month and the information indicative of the upper limit amount for provisional registration. The receiver 201 receives them (refer to step S403 of FIG. 48). It should be noted that, in this example, the provisional registration information is assumed to be sent to the receiver 201 in several hours after the EMD service center 1 receives the usage start signal.

Next, in step S425, the user management block 18 waits until the credit granting processing started in step S421 has been completed. Upon completion, the user management block 18 determines in step S426 whether the receiver 201 can be officially registered into the EMD system on the basis of the result of the credit granting processing.

In step S426, if the user management block 18 determines that receiver 201 can be officially registered, then the user management block 18 assigns a settlement ID to user A in step S427, sets the assigned settlement ID to "Settlement ID" corresponding to the ID of the SAM 212 of the system registration information as shown in FIG. 58, and sends the system registration information to the receiver 201 along with the delivery keys Kd for 3 months generated in the key server 14 and the information indicative of the upper limit amount for official registration. The receiver 201 receives them (refer to step S404 of FIG. 48). It should be noted that, in the present example, the credit granting processing started in step S421 is completed in about 1 week. Namely, the official registration information is sent to the receiver 201 two weeks after the registration form has been sent to the managing company.

If the usage start signal is found not received in step S422, then the user management block 18 determines in step S428 whether the credit granting processing has been completed. If the credit granting processing is found not completed, the system returns to step S422 to repeat the processing.

If the credit granting processing is found completed in step S428, namely, completed before the usage start signal is received, or if the credit granting processing is found completed in step S423, namely, completed before the provisional registration information is sent, the system proceeds to step S429.

In step S429, the user management block 18 assigns the ID, password, and settlement ID of user A, sets them to "Settlement User Information" corresponding to the ID of the SAM 212, and sends it to the receiver 201 along with the delivery keys Kd for 3 months generated by the key server 14, the information indicative of the upper limit amount for official registration, and the user general information. It should be noted that, with reference to the flowchart of FIG. 48, the credit granting processing has been completed after sending of the provisional registration information to the receiver 201.

If the receiver 201 is found in step S426 not officially registered in the EMD system, the processing of step S427 is skipped, upon which this registration processing ends. It should be noted, if this happens, the user ID, password, and user general information set to the system registration information in step S424 are deleted.

Thus, the provisional registration is provided after the completion of the credit granting processing taking about 1 week and before the official registration. Consequently, user A can use content in several hours after purchasing the receiver 201.

Meanwhile, as described, if, in the registered receiver 201, the added up charges exceeds a predetermined upper limit amount (the upper limit amount for provisional or official registration) or the content key Kco (encrypted by delivery key Kd) cannot be decrypted, namely the version of the delivery key Kd held in the receiver 201 becomes older than the version of the delivery key Kd encrypting the content key Kco, the processing for settling the charges described by the flowchart of FIG. 47 starts. For example, by the processing of step S303 of FIG. 47, the registration list, the information on charges, the version of delivery key Kd, and the encrypted UCP are sent to the EMD service center 1. However, the receiver 201 on which the above-mentioned registration processing has been performed holds no registration list, so that, before starting the settlement processing, the processing for acquiring the registration list is executed. The following describes the procedure of this registration list acquisition processing with reference to the flowchart of FIG. 59.

In step S441, cross-authentication is executed between the cross-authentication module 221 of the receiver 201 and the cross-authentication block 17 of the EMD service center. Then, the SAM 212 of the receiver 201 sends a certificate to the EMD service center 1. In step S442, the SAM 212 of the receiver 201 reads the ID of the SAM 212 from "SAM ID" in the reference information 201 (refer to FIG. 53) stored in the storage module 223, encrypts the ID by temporary key Ktemp, and sends the encrypted ID to the EMD service center 1.

In step S443, the user management block 18 of the EMD service center 1 receives the ID of the SAM 212, decrypts it, and determines whether the ID of SAM 212 is stored in the system registration information (refer to FIG. 58). If the ID is found stored, the system proceeds to step S444. In the present example, this ID is stored in the system registration information.

In step S444, the user management block 18 checks the receiver 201 for any unauthorized action that sets "stop" to "Status Flag" of the registration list.

In step S445, the cashier block 20 of the EMD service center 1 communicates with the settlement organization for example to check to see if the credit granting processing for user A has been completed on the basis of the settlement organization information of user A received in step S442.

Next, in step S446, on the basis of the confirmation results of steps 444 and 445, the user management block 18 sets the registration condition of the receiver 201 and attaches a signature thereto to form the registration list of the receiver 201 as shown in FIG. 60. In the present example, "not limited" is set to "Status Flag" of the registration list.

Figure 61:
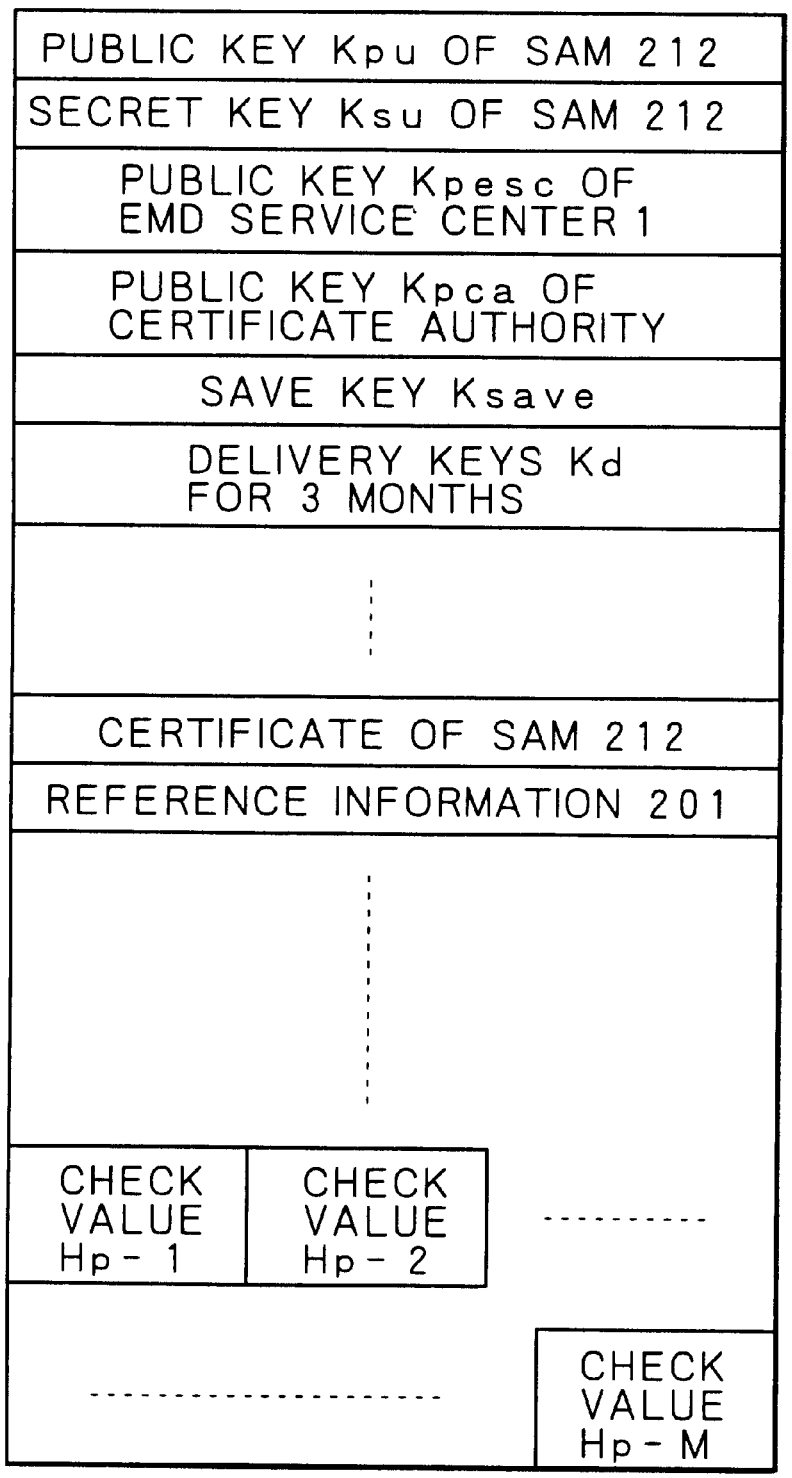
FIG. 61 illustrates still another example of information stored in the storage module 223 of the receiver 201.

In step S447, the user management block 18 encrypts the registration list prepared in step S446 by temporary key Ktemp and sends the encrypted registration list to the receiver 201. In step S448, the SAM 212 of the receiver 201 decrypts the received registration list by temporary key Ktemp and stores the decrypted list into the HDD 202 through the interface 216. Consequently, the receiver 201 holds the various items of information shown in FIG. 61A in the storage module 223 and the registration list in the HDD 202.

In step S443, if the SAM 212 is found not stored in the system registration information, this registration list acquisition processing ends.

Thus, the receiver 201 acquires the registration list as shown in FIG. 60. If, in step S444, an unauthorized action is detected and "stop" is set to "Status Flag" of the registration list, the receiver 201 cannot receive any service from the EMD system even if the receiver 201 has been registered either officially or provisionally.

If, in step S445, the credit granting processing is found not completed and "limited" is set to "Status Flag" of the registration list, the receiver 201 can use already purchased content but cannot purchase new content. Namely, the purchase of content in provisional registration is limited (or suppressed).

The following describes the processing procedure in which a newly fabricated receiver 301 is registered in the EMD system with user A (the settlement user of the receiver 201) as the settlement user. The description starts with an exemplary configuration of the receiver 301 with reference to FIG. 62.

The receiver 301 has a SAM 311 through a communication block 314 which are basically the same in function as the SAM 212 through the communication block 215 of the receiver 201. But the receiver 301 is a portable device which has none of the components corresponding to the communication block 211, the interface 216, the display control block 217, and the input control block 218 of the receiver 201 and is connected to no HDD.

Because the receiver 301 has no capability corresponding to the communication block 211 of the receiver 201, the receiver 301 cannot communicate with the EMD service center 1 and the service provider 3. Besides, because the receiver 301 has none of the capabilities corresponding to the display control block 217 and the input control block 218 of the receiver 201, the receiver 301 cannot output the descriptions of UCP and PT and does not allow the user to select a predetermined usage description from UCP. In other words, the receiver 301 is a subordinate device and therefore its device number is below 100, namely 25 for example. It should be noted that user A can purchase content through the receiver 301 but the charges therefor is processed in the receiver 51. Namely, the receiver 301 has a content purchase capability but has no settlement capability.

Figure 64:
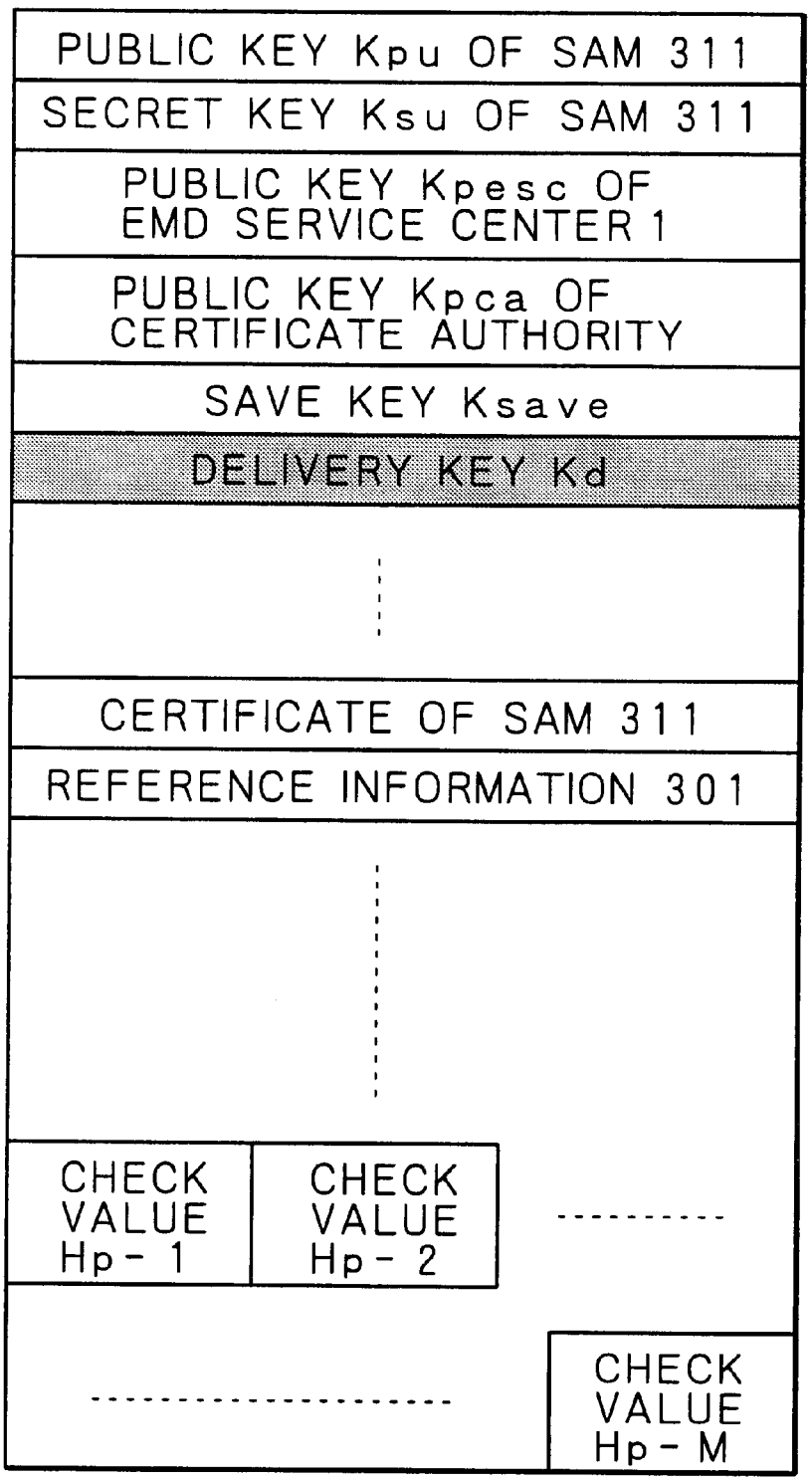
FIG. 64 illustrates an example of information stored in a storage module 323 of the receiver 301.

At this point of time, the receiver 301 has not been registered in the EMD system. Therefore, a storage module 323 of the SAM 311 stores reference information 301 having only the ID of the SAM 311 and the device number (25) of the receiver 301 as shown in FIG. 63, and the public key Kpu of the SAM 311, the secret key Ksu of the SAM 311, the public key Kpesc of the EMD service center 1, the public key of the certificate authority, save key Ksave, the certificate of the SAM 311, and the check values Hp as shown in FIG. 64. In FIG. 64, the delivery key Kd in halftone is not stored.

It should be noted that, at this point of time, the user management block 18 of the EMD service center 1 holds the system registration information to which the SAM 311 of the receiver 301 and its device number (25) are set.

Figure 66:
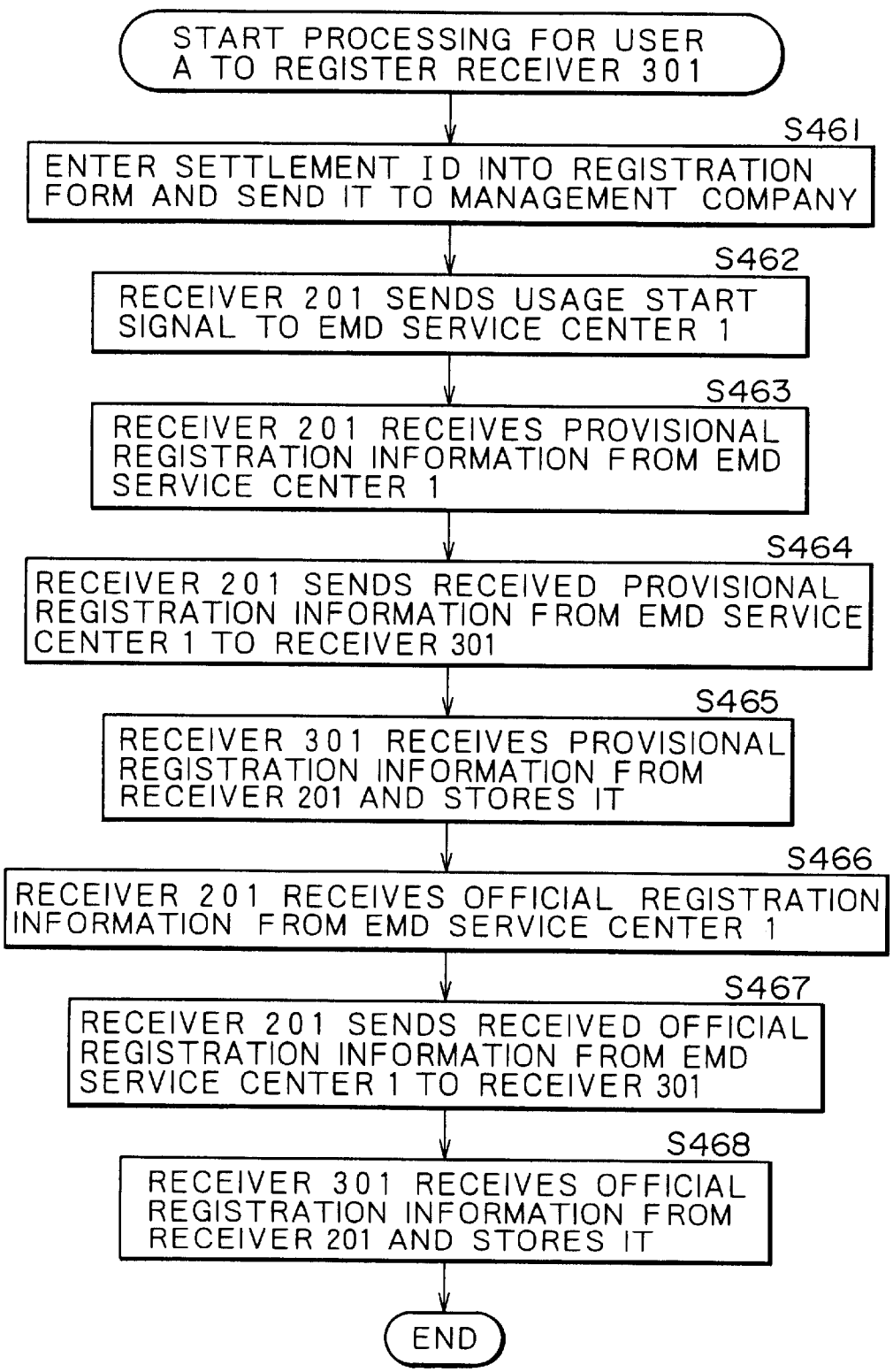
FIG. 66 is a flowchart describing the processing for registering the receiver 301 with user A as a settlement user.

The following describes the processing procedure in which the receiver 301 is registered in the EMD system with user A as a settlement user with reference to the flowchart shown in FIG. 66.

Figure 48:
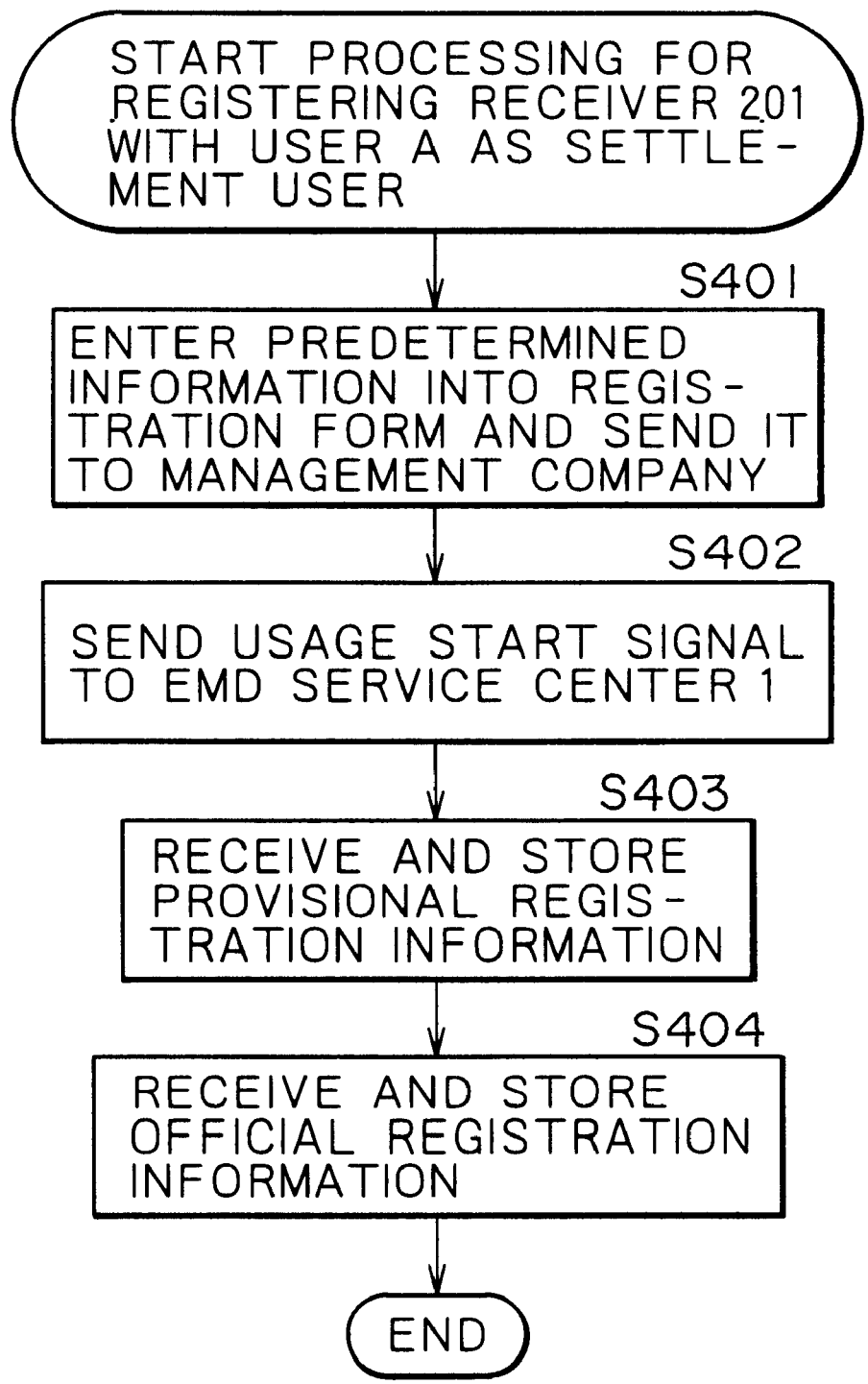
FIG. 48 is a flowchart describing the processing for registering the receiver 201 with user A as a settlement user.

In step S461, user A enters the settlement ID acquired in step S404 of FIG. 48 into a registration form shown in FIG. 67 (having entries for the ID of the SAM 311 of the receiver 301) and sends the completed form to the managing company.

Next, in step S462, user A performs an operation on the receiver 201 for sending to the EMD service center 1 a predetermined usage start signal indicative of the start of using content in the receiver 301. This causes cross-authentication between the cross-authentication module 221 (refer to FIG. 35) of the receiver 201 and the cross-authentication block 17 (refer to FIG. 3) of the EMD service center 1. The usage start signal (with the ID of the SAM 311 set as the usage start request source) is sent to the EMD service center 1 through the communication block 211 of the receiver 201. It should be noted that, in the present example, because the receiver 301 has no capability of communicating with the EMD service center 1, user A operates the receiver 201 instead of the receiver 301.

In step S463, the receiver 201 receives the provisional registration information (the delivery key Kd for 1 month (see FIG. 8), the information indicative of the upper limit amount for provisional registration, and the general information, ID, and password of user A) supplied from the EMD service center 1. To be more specific, before receiving the information supplied from the EMD service center 1, cross-authentication is executed between the cross-authentication module 221 of the receiver 201 and the cross-authentication block 17 of the EMD service center 1 to share temporary key Ktemp. Then, the information from the EMD service center 1 is received through the communication block 211 of the receiver 201. The information received through the communication block 211 is decrypted in the decryption/encryption module 224 of the receiver 201 by the temporary key Ktemp shared by the EMD service center 1 and the decrypted information is temporarily stored by the SAM 212.

Next, in step S464, the receiver 201 sends the provisional registration information received from the EMD service center 1 in step S463 to the receiver 301. To be more specific, before sending the information to the receiver 301, cross-authentication is executed between the cross-authentication module 221 of the receiver 201 and the cross-authentication module 321 (refer to FIG. 62) of the receiver 301 to share temporary key Ktemp. Then, in step S463, the provisional registration information temporarily stored in the SAM 212 of the receiver 201 is encrypted in the decryption/encryption module 224 by the temporary key Ktemp. The encrypted information is sent to the receiver 301 through the communication block 215.

In step S465, the receiver 301 receives and stores the provisional registration information sent from the receiver 201. To be more specific, the provisional registration information is decrypted in the decryption/encryption module 324 of the receiver 301 by the temporary key Ktemp shared by the receiver 201 and the decrypted information is stored in the storage module 323.

Next, in step S466, the receiver 201 receives the official registration information (the delivery keys Kd for 3 months, the upper limit amount for official registration, and the settlement ID of user A) supplied from the EMD service center 1 upon the official registration in the EMD system. The specific processing here is generally the same as that of step S463 and therefore its description will be skipped.

In step S467, the receiver 201 sends the official registration information received in step S466 to the receiver 301. The specific processing here is generally the same as that of step S464 and therefore its description will be skipped.

Figure 68:
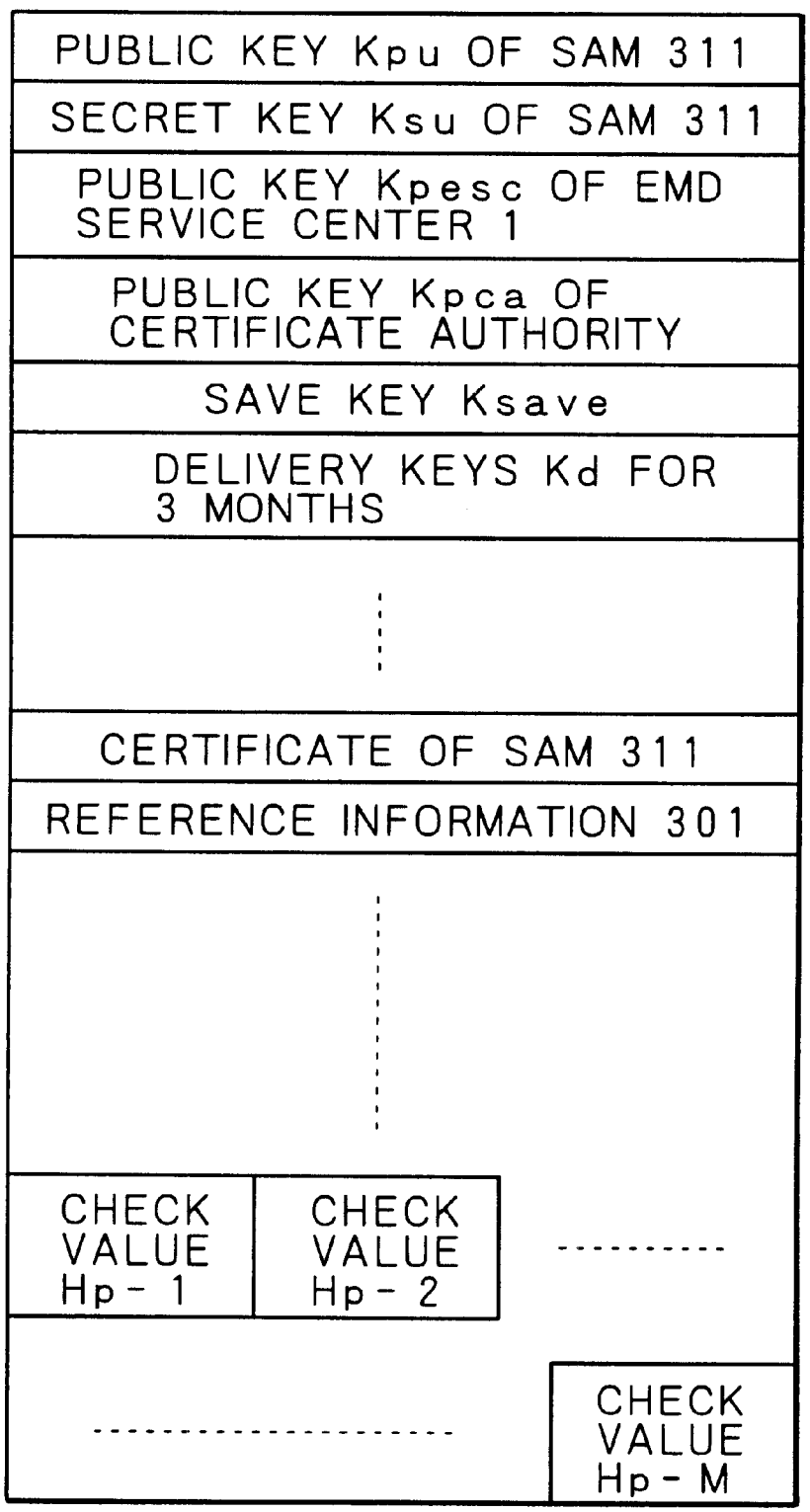
FIG. 68 illustrates another example of information stored in the storage module 323 of the receiver 301.

In step S468, the receiver 301 receives and stores the official registration information. The specific processing here is generally the same as that of step S465 and therefore details thereof will be skipped. Thus, the storage module 323 of the receiver 301 stores the delivery keys Kd for 3 months as shown in FIG. 68, the settlement ID of user A in "Settlement ID," the information indicative of the upper limit amount for official registration in "Upper Limit Amount of Charging," and the reference information 301 in which the general information, ID and password of user A are set to "Settlement User Information" as shown in FIG. 69.

Thus, the receiver 301 is registered in the EMD system with user A as the settlement user. It should be noted that, in this state, the receiver 301 holds no registration list. Therefore, registration list acquisition processing such as described with reference to the flowchart of FIG. 59 must also be executed in the receiver 301 before starting the settlement processing.

The following describes the processing procedure of the EMD service center 1 in executing the above-mentioned processing of registering the receiver 301 with user A as registered user, with reference to the flowchart of FIG. 54.

In steps S411 and S412, generally the same processing as registering the receiver 201 with user A as a settlement user and therefore details thereof will be skipped. In this case, the user management block 18 of the EMD service center 1 determines in step S412 that the settlement ID of user A entered in the registration form (as shown in step S461 of FIG. 66) is stored in the system registration information (refer to FIG. 65) (in this case, this settlement ID is stored in correspondence with the ID of the SAM 212), and the processing goes on to step S414.

Figure 70:
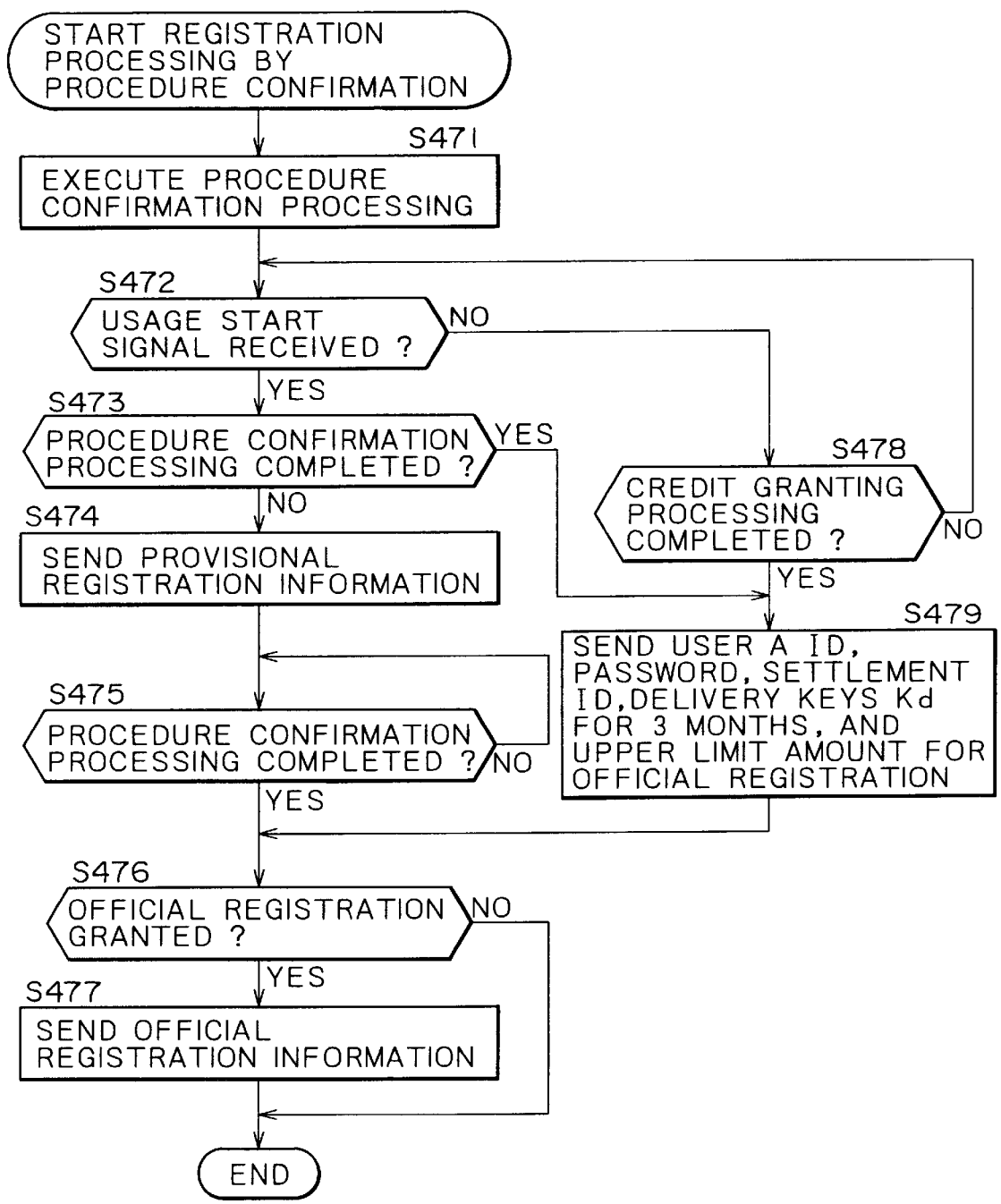
FIG. 70 is a flowchart describing registration processing by procedure confirmation.

In step S414, the registration processing by procedure confirmation is executed. Details of this processing are described with reference to the flowchart of FIG. 70. Namely, in step S471, procedure confirmation processing is executed. To be specific, the managing company of the EMD service center 1 communicates with user A to confirm that the registration form has been sent to user A, for example.

In step S472, the user management block 18 of the EMD service center 1 determines whether the usage start signal (as shown in step S462 of FIG. 66) supplied from the receiver 201 has been received. If the signal is found received, then, in step S473, the user management block 18 determines whether the procedure confirmation processing started in step S471 has been completed.

If, in step S473, the procedure confirmation processing is found not completed, the user management block 18 reads in step S474 the information (the general information, ID, and password of user A) in "Settlement User Information" corresponding to "Settlement ID" having the settlement ID of user A in the system registration information (refer to FIG. 65), sets this information to "Settlement User Information" corresponding to the ID (the ID of the SAM entered in the registration form) of the SAM 311 of the receiver 301 as shown in FIG. 71, and sends the system registration information to the receiver 201 along with the delivery key Kd for 1 month generated by the key server 14 and the information indicative of the upper limit amount for provisional registration. The receiver 201 receives them (refer to step S463 of FIG. 66). It should be noted that, before the provisional registration information of the receiver 301 is sent from the EMD service center 1 to the receiver 201, cross-authentication is executed between the receiver 201 and the EMD service center 1 to share temporary key Ktemp. The information to be sent from the EMD service center 1 to the receiver 201 is encrypted by this temporary key Ktemp.

Next, in step S475, the user management block 18 of the EMD service center 1 waits until the procedure confirmation processing started in step S471 is completed. Upon completion, the user management block 18 determines in step S476 on the basis of the result of the procedure confirmation processing whether the receiver 301 can be officially registered into the EMD system as a settlement user.

If, in step S476, the receiver 301 is found that it can be officially registered, then the user management block 18 reads in step S477 the settlement ID (set to "Settlement ID" corresponding to the ID of the SAM 62) of user A, sets the settlement ID to "Settlement ID" corresponding to the ID of the SAM 311 as shown in FIG. 72, and sends the settlement ID to the receiver 301 along with the delivery keys Kd for 3 months generated by the key server 14 and the information indicative of the upper limit amount for official registration. The receiver 201 receives them (refer to step S466 of FIG. 66). It should be noted that, before the information is sent from the EMD service center 1 to the receiver 201, cross-authentication is executed between the receiver 201 and the EMD service center 1 to share temporary key Ktemp. The official registration information to be sent to the receiver 201 is encrypted by this temporary key Ktemp.

If, in step S472, the usage start signal is found not received, then the user management block 18 determines in step S478 whether the procedure confirmation processing has been completed. If the procedure confirmation processing is found not completed, the system returns to step S472 to repeat the processing mentioned above.

If, in step S478, the procedure confirmation processing is found completed, namely, completed before the usage start signal is received or completed in step S473, namely, completed before the provisional registration information is sent to the receiver 201, then the system proceeds to step S479.

In step S479, the user management block 18 assigns the ID, password and settlement ID of user A, set them to "Settlement User Information" corresponding to the ID of the SAM 212, and sends them to the receiver 201 along with the delivery keys Kd for 3 months and the information indicative of the upper limit amount for official registration. It should be noted that, for the processing described with reference to the flowchart of FIG. 66, the credit granting processing has been completed after sending of the provisional registration information to the receiver 201.

If, in step S476, it was determined that the receiver 301 cannot be officially registered, this registration processing ends. It should be noted that, if this happens, in step S474, the ID, password, and user general information of user A set to the system registration information are deleted.

Thus, the receiver 301 is registered with user A who is the settlement user of the receiver 201 as the settlement user. In this case, instead of the credit granting processing (taking about 2 weeks), the procedure confirmation processing (taking about several days) is performed on user A. Namely, the receiver 301 can be registered (or officially registered) in the EMD system in a relatively brief period of time.

Figure 73:
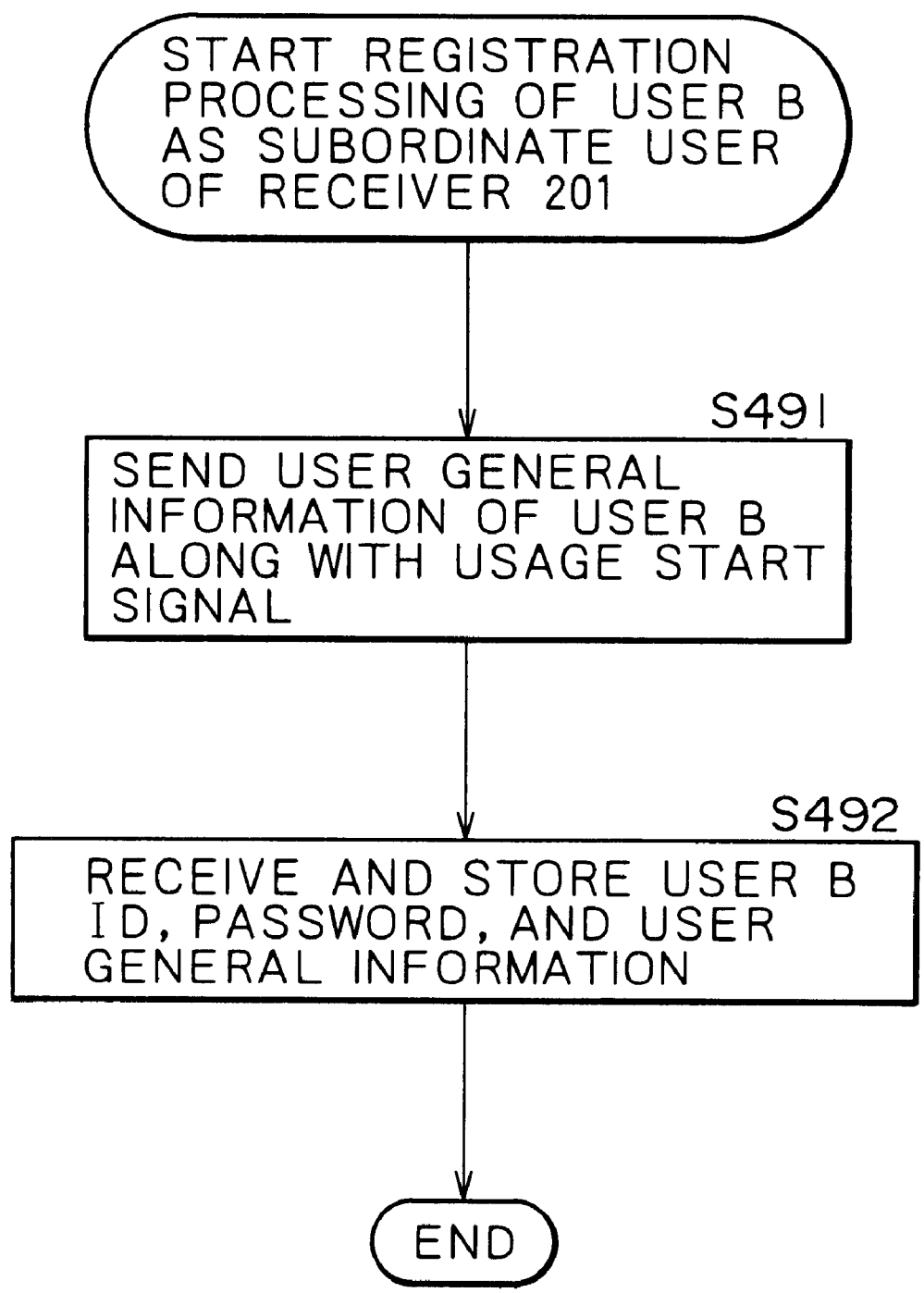
FIG. 73 is a flowchart describing processing for registering user B as a subordinate user of the receiver 201.

The following describes the processing procedure of the receiver 201 in which user B is registered as a subordinate user of the receiver 201 (of which settlement user being user A) with reference to the flowchart shown in FIG. 73.

In step S491, user B performs an operation on the receiver 201 for sending the user generation information (name, address, telephone number, birthday, age, and gender) of user B to the EMD service center 1 along with a usage start signal indicative that usage of content starts in the receiver 201. Then, cross-authentication is executed between the cross-authentication module 221 (refer to FIG. 35) of the receiver 201 and the cross-authentication block 17 (refer to FIG. 3) of the EMD service center 1. When the cross-authentication has been completed, the user general information and the usage start signal (the ID of the SAM 212 of the receiver 201 is set as the usage start request source) are sent to the EMD service center 1 through the communication block 211 of the receiver 201.

Next, in step S492, the SAM 212 of the receiver 201 receives the ID, password, and user general information of user B sent from the EMD service center 1, set them to the reference information 201 as shown in FIG. 74, and stores it into the storage module 223.

The following describes the processing procedure of the EMD service center 1 for executing the above-mentioned processing of registering user B as a subordinate user of the receiver 201 with reference to the flowchart shown in FIG. 75.

In step S501, the user management block 18 of the EMD service center 1 receives the usage start signal (refer to step S491 of FIG. 73) accompanied by the user general information of user B supplied from the receiver 201.

Next, in step S502, the user management block 18 determines whether the information attached to the usage start signal includes the information equivalent to user ID. In the present example, only the user general information of user B is attached to the usage start signal, so that the information equivalent to user ID is determined not included, and then the processing proceeds to step S503.

In step S503, the user management block 18 assigns the ID and password of user B, sets them to "Subordinate User Information" corresponding to the ID of the SAM 212 of the receiver 201 of the system registration information as shown in FIG. 76 along with the user general information of user B attached to the usage start signal, and stores these items of information. In step S504, the user management block 18 sends the information stored in step S503 to the receiver 201, the request source of usage start. The receiver 201 receives the information (refer to step S492 of FIG. 73).

The processing of steps 505 and 506 will be described later.

The following describes the processing procedure of the receiver 201 and the receiver 301 in which user B (the subordinate user of the receiver 201) is registered as a subordinate user of the receiver 301 with reference to the flowchart shown in FIG. 77.

In step S511, user B performs an operation on the receiver 201 for sending the usage start signal indicative of the receiver 301 as the usage start request source to the EMD service center 1 along with the ID (assigned in step S492 of FIG. 73) of user B. Then, cross-authentication is executed between the cross-authentication module 221 (refer to FIG. 35) of the receiver 201 and the cross-authentication block 17 (refer to FIG. 3) of the EMD service center 1. When the cross-authentication has been completed, the usage start signal (having the ID of the SAM 311 of the receiver 301 as the usage start request source) accompanied with the ID of user B is sent to the EMD service center 1 through the communication block 211 of the receiver 201.

Next, in step S512, the receiver 201 receives the user general information, ID, and password of user B from the EMD service center 1. The specific processing here is generally the same as that of step S463 of FIG. 66 and therefore its description will be skipped.

In step S513, the receiver 201 sends the information supplied from the EMD service center 1 to the receiver 301. The specific processing here is generally the same as that of step S464 of FIG. 66 and therefore its description will be skipped. Next, in step S514, the receiver 301 receives and stores the information supplied from the receiver 201. The specific processing here is generally the same as that of step S465 of FIG. 66 and therefore its description will be skipped. Thus, the storage module 323 of the receiver 301 stores the reference information 301 with the user general information, ID, and password of user B set to "Subordinate User Information" as shown in FIG. 78.

The following describes the processing procedure of the EMD service center 1 for executing the above-mentioned processing of registering user B as the subordinate user of the receiver 301 with reference to the flowchart shown in FIG. 75 again.

In step S501, when the user management block 18 receives the usage start signal (the usage start request source being the receiver 301 as shown in step S511 of FIG. 77) accompanied by the ID of user B from the receiver 201, the user management block 18 determines in step S502 that the information (the ID of user B) equivalent to user ID is included in this signal. The processing then proceeds to step S505.

In step S505, the user management block 18 determines whether the received ID of user B in step S501 is set to the system registration information (refer to FIG. 76). If the ID is found set, the user management block 18 reads the description from "Subordinate User Information" corresponding to the ID of the SAM (in this case, the description of "Subordinate User Information" corresponding to the ID of the SAM 212 of the receiver 201), sets the description to "Subordinate User Information" corresponding to the ID of the SAM 311 of the receiver 301, which is source of usage start request, as shown in FIG. 79, and sends it to the receiver 201 in step S506. The receiver 201 receives it (refer to step S513 of FIG. 77). If the ID of user B is found not set to the system registration information, this registration processing ends.

Thus, if user B has acquired the ID of his or her own, user B is registered as the subordinate user of the receiver 301 without being assigned with the ID and password of user B.

In the above examples, the ID of the SAM of each device is included in the usage start signal. It will be apparent that this ID may be sent separately in correspondence with the usage start signal. In the above examples, the user general information and user IDs are sent in accompaniment with the usage start signal. It will be apparent that they may be sent separately in correspondence with the usage start signal.

It should be noted that the system referred to herein denotes an entire apparatus composed of two or more devices.

Information providing media for providing a computer program for executing the above-mentioned processing operations to the user include information recording media such as a magnetic disc, a CD-ROM, and a solid memory as well as communication media such as a network and a communication satellite.

As described and according to an information processing apparatus recited in claim 1 appended hereto, an information processing method recited in claim 4 appended hereto, and an information providing medium recited in claim 5 appended hereto, after registration application information is supplied to a management apparatus, a usage start signal indicative of start of use of information and a corresponding identification of the information processing apparatus are sent to this management apparatus. Consequently, the information processing apparatus can receive a key usable only for a first period of time for decrypting encrypted information before receiving a key usable only for a second period of time for decrypting encrypted key corresponding to the registration application information.

As described and according to a management apparatus recited in claim 6 appended hereto, a managing method recited in claim 10 appended hereto, and an information providing medium recited in claim 11 appended hereto, a predetermined usage start signal supplied from a predetermined apparatus and a corresponding identification of the predetermined apparatus are received by the management apparatus. Consequently, the management apparatus can receive a predetermined key usable only for a first period of time for decrypting encrypted information before receiving a key usable only for a second period of time for decrypting encrypted key corresponding to a result of the first registration confirmation processing.

While the preferred embodiments of the present invention have been described using specific terms, such description is for illustrative purposes only, and it is to be understood that changes and variations may be made without departing from the spirit or scope of the appended claims.

What is claimed is:

1. An information processing apparatus managed by a management apparatus to decrypt encrypted information to use resultant decrypted information, comprising:

first sending means for sending a usage start signal indicative of start of use of said encrypted information to said management apparatus after predetermined registration application information including an identification of said information processing apparatus is supplied to said management apparatus;

second sending means for sending said identification to said management apparatus in correspondence with said usage start signal sent by said first sending means;

first storage means for receiving and storing said usage start signal supplied from said management apparatus through said first sending means, a predetermined key usable for decrypting said encrypted information only for a first period of time, said predetermined key corresponding to said identification supplied from said second sending means, and first upper limit information indicative of a predetermined upper limit amount of first charges;

second storage means for receiving and storing a predetermined key usable for decrypting said encrypted information only for a second period of time, said predetermined key corresponding to said registration application information supplied from said management apparatus, second upper limit information indicative of a predetermined upper limit amount of second charges, and a predetermined settlement identification;

third storage means for receiving and storing a predetermined registration condition supplied from said management apparatus; and control means for controlling an operation of said information processing apparatus on the basis of said registration condition stored in said third storage means.

2. The information processing apparatus according to claim 1, further comprising: third sending means for sending user general information to said management apparatus in correspondence with said usage start signal supplied from said first sending means; wherein said first storage means further receives and stores a user identification supplied from said management apparatus.

3. The information processing apparatus according to claim 2, further comprising: fourth sending means for sending a user identification to said management apparatus in correspondence with said usage start signal supplied from said first sending means.

4. An information processing method for an information processing apparatus managed by a management apparatus to decrypt encrypted information to use resultant decrypted information, said method comprising:

a first sending step of sending a usage start signal indicative of start of use of said encrypted information to said management apparatus after predetermined registration application information including an identification of said information processing apparatus is supplied to said management apparatus;

a second sending step of sending said identification to said management apparatus in correspondence with said usage start signal sent in the first sending step;

a first storage step of receiving and storing said usage start signal supplied from said management apparatus in the first sending step, a predetermined key usable for decrypting said encrypted information only for a first period of time, said predetermined key corresponding to said identification supplied in the second sending step, and first upper limit information indicative of a predetermined upper limit amount of first charges;

a second storage step of receiving and storing a predetermined key usable for decrypting said encrypted information only for a second period of time, said predetermined key corresponding to said registration application information supplied from said management apparatus, second upper limit information indicative of a predetermined upper limit amount of second charges, and a predetermined settlement identification;

a third storage step of receiving and storing a predetermined registration condition supplied from said management apparatus; and a control step of controlling an operation of said information processing apparatus on the basis of said registration condition stored in the third storage step.

5. An information providing medium for providing a computer program for making an information processing apparatus managed by a management apparatus to decrypt encrypted information to use resultant decrypted information execute processing, said processing comprising:

a first sending step of sending a usage start signal indicative of start of use of said encrypted information to said management apparatus after predetermined registration application information including an identification of said information processing apparatus is supplied to said management apparatus;

a second sending step of sending said identification to said management apparatus in correspondence with said usage start signal sent in the first sending step;

a first storage step of receiving and storing said usage start signal supplied from said management apparatus in the first sending step, a predetermined key usable for decrypting said encrypted information only for a first period of time, said predetermined key corresponding to said identification supplied in the second sending step, and first upper limit information indicative of a predetermined upper limit amount of first charges;

a second storage step of receiving and storing a predetermined key usable for decrypting said encrypted information only for a second period of time, said predetermined key corresponding to said registration application information supplied from said management apparatus, second upper limit information indicative of a predetermined upper limit amount of second charges, and a predetermined settlement identification;

a third storage step of receiving and storing a predetermined registration condition supplied from said management apparatus; and a control step of controlling an operation of said information processing apparatus on the basis of said registration condition stored in the third storage step.

6. A management apparatus for managing a predetermined apparatus that decrypts encrypted information to use resultant decrypted information, said management apparatus comprising:

first execution means for executing first registration confirmation processing on the basis of predetermined user general information supplied in correspondence with an identification of said predetermined apparatus;

first receiving means for receiving a predetermined usage start signal supplied from said predetermined apparatus;

second receiving means for receiving said identification of said predetermined apparatus supplied therefrom in correspondence with said usage start signal received by said first receiving means;

first sending means for sending a predetermined key usable only for a first period of time for decrypting said encrypted information, and first upper limit information indicative of an upper limit amount of first charges to said predetermined apparatus after said first receiving means receives said usage start signal and said second receiving means receives said identification of said predetermined apparatus;

first assignment means for assigning a predetermined settlement identification according to a result of said first registration confirmation processing executed by said first execution means;

registration means for registering, in correspondence to said result of said first registration confirmation processing executed by said first execution means, said settlement identification assigned by said first assignment means in correspondence with said identification of said predetermined apparatus received by said second receiving means;

second sending means for sending said registered settlement identification registered by said registration means, a predetermined key usable only for a second period of time for decrypting said encrypted information, and second upper limit information indicative of a predetermined upper limit amount of second charges to said predetermined apparatus; and third sending means for generating and sending a registration condition of said predetermined apparatus on the basis of a result of said first registration confirmation processing executed by said first execution means.

7. The management apparatus according to claim 6, further comprising: second execution means for executing second registration confirmation processing when said settlement identification is supplied; wherein said second sending means sends said predetermined key usable only for said second period of time for decrypting said encrypted information and said second upper limit information to said predetermined apparatus in correspondence with a result of said second registration confirmation processing executed by said second execution means.

8. The management apparatus according to claim 6, further comprising: in correspondence with said usage start signal, third receiving means for receiving user generation information supplied from said predetermined apparatus; and second assignment means for assigning a user identification; wherein said registration means registers said user identification assigned by said second assignment means and said user general information in correspondence with said identification of said predetermined apparatus received by said second receiving means and said first sending means sends said user identification registered by said registration means to said predetermined apparatus.

9. The management apparatus according to claim 8, further comprising: fourth receiving means for receiving said user identification supplied from said predetermined apparatus in correspondence with said usage start signal; and confirmation means for confirming whether said user identification received by said fourth receiving means has been registered by said registration means; wherein said registration means, in corresponding to a result of confirmation by said confirmation means, registers said user identification received by said fourth receiving means and said user general information registered in correspondence with said user identification, in correspondence with said identification of said predetermined apparatus received by said second receiving means.

10. A managing method for a management apparatus for managing a predetermined apparatus that decrypts encrypted information to use resultant decrypted information, said managing method comprising:

a first execution step of executing first registration confirmation processing on the basis of predetermined user general information supplied in correspondence with an identification of said predetermined apparatus;

a first receiving step of receiving a predetermined usage start signal supplied from said predetermined apparatus;

a second receiving step of receiving said identification of said predetermined apparatus supplied therefrom in correspondence with said usage start signal received in the first receiving step;

a first sending step of sending a predetermined key usable only for a first period of time for decrypting said encrypted information, and first upper limit information indicative of an upper limit amount of first charges to said predetermined apparatus after in the first receiving step said usage start signal is received, and in the second receiving step said identification of said predetermined apparatus is received;

a first assignment step of assigning a predetermined settlement identification according to a result of said first registration confirmation processing executed in the first execution step;

a registration step of registering, in correspondence to said result of said first registration confirmation processing executed in the first execution step, said settlement identification assigned in the first assignment step in correspondence with said identification of said predetermined apparatus received in the second receiving step;

a second sending step of sending said registered settlement identification registered in said registration step, a predetermined key usable only for a second period of time for decrypting said encrypted information, and second upper limit information indicative of a predetermined upper limit amount of second charges to said predetermined apparatus; and a third sending step of generating and sending a registration condition of said predetermined apparatus on the basis of a result of said first registration confirmation processing executed in the first execution step.

11. An information providing medium for providing a computer program for making a management apparatus for managing a predetermined apparatus for decrypting encrypted information and using resultant decrypted information execute processing, said processing comprising:

a first execution step of executing first registration confirmation processing on the basis of predetermined user general information supplied in correspondence with an identification of said predetermined apparatus;

a first receiving step of receiving a predetermined usage start signal supplied from said predetermined apparatus;

a second receiving step of receiving said identification of said predetermined apparatus supplied therefrom in correspondence with said usage start signal received in the first receiving step;

a first sending step of sending a predetermined key usable only for a first period of time for decrypting said encrypted information, and first upper limit information indicative of an upper limit amount of first charges to said predetermined apparatus after in the first receiving step said usage start signal is received, and in the second receiving step said identification of said predetermined apparatus is received;

a first assignment step of assigning a predetermined settlement identification according to a result of said first registration confirmation processing executed in the first execution step;

a registration step of registering, in correspondence to said result of said first registration confirmation processing executed in the first execution step, said settlement identification assigned in the first assignment step in correspondence with said identification of said predetermined apparatus received in the second receiving step;

a second sending step of sending said registered settlement identification registered in said registration step, a predetermined key usable only for a second period of time for decrypting said encrypted information, and second upper limit information indicative of a predetermined upper limit amount of second charges to said predetermined apparatus; and a third sending step of generating and sending a registration condition of said predetermined apparatus on the basis of a result of said first registration confirmation processing executed in the first execution step.

* * * * *